(12) United States Patent
Mori

(10) Patent No.: US 9,291,142 B2
(45) Date of Patent: Mar. 22, 2016

(54) IGNITION CONTROL DEVICE FOR INTERNAL COMBUSTION ENGINE

(75) Inventor: Sachio Mori, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 180 days.

(21) Appl. No.: 14/345,068

(22) PCT Filed: Sep. 14, 2011

(86) PCT No.: PCT/JP2011/071038
§ 371 (c)(1),
(2), (4) Date: Mar. 14, 2014

(87) PCT Pub. No.: WO2013/038530
PCT Pub. Date: Mar. 21, 2013

(65) Prior Publication Data
US 2014/0345565 A1 Nov. 27, 2014

(51) Int. Cl.
| F02P 15/10 | (2006.01) |
| F02P 5/145 | (2006.01) |
| F02P 17/12 | (2006.01) |
| F02P 15/08 | (2006.01) |
| F02D 41/00 | (2006.01) |

(Continued)

(52) U.S. Cl.
CPC ............. *F02P 5/145* (2013.01); *F02P 15/08* (2013.01); *F02P 17/12* (2013.01); *F02D 41/0027* (2013.01); *F02P 5/005* (2013.01); *F02P 9/002* (2013.01)

(58) Field of Classification Search
CPC .......... F02P 5/145; F02P 15/08; F02P 17/12; F02P 9/002; F02P 9/007; F02P 3/02

USPC ............ 123/406.12, 601, 605, 606, 618, 634, 123/636

See application file for complete search history.

(56) References Cited

U.S. PATENT DOCUMENTS

| 5,170,760 A | 12/1992 | Yamada et al. |
| 6,085,733 A | 7/2000 | Motoyama et al. |

(Continued)

FOREIGN PATENT DOCUMENTS

| EP | 1 195 517 A2 | 4/2002 |
| EP | 2 325 476 A1 | 5/2011 |

(Continued)

OTHER PUBLICATIONS

International Search Report Issued Dec. 13, 2011 in PCT/JP11/071038 Filed Sep. 14, 2011.

*Primary Examiner* — Hai Huynh
(74) *Attorney, Agent, or Firm* — Oblon, McClelland, Maier & Neustadt, L.L.P.

(57) ABSTRACT

An ignition control device is applied to an engine configured to generate one or more discharges within an ignition period. Regarding the device, a discharge voltage within first period or an amount of fuel included in the gas is referred to as a first parameter, which first period is from a discharge start timing to an intermediate timing after and near the discharge start timing, a discharge voltage within second period or a flow rate of the gas near the discharge is referred to as a second parameter, which second period is from the intermediate timing to a discharge end timing, and it is determined whether to start another discharge following the discharge within the ignition period based on at least the second parameter among the first and second parameters. Furthermore, the another discharge is started with an ignition unit when being determined to start the another discharge.

14 Claims, 21 Drawing Sheets

(51) Int. Cl.
*F02P 5/00* (2006.01)
*F02P 9/00* (2006.01)

(56) References Cited

U.S. PATENT DOCUMENTS

2002/0043255 A1 4/2002 Kameda et al.
2009/0114188 A1 5/2009 Peters et al.

FOREIGN PATENT DOCUMENTS

| GB | 2 392 955 A | 3/2004 |
| JP | 5 164033 | 6/1993 |
| JP | 2002 106455 | 4/2002 |
| JP | 2003 184723 | 7/2003 |
| JP | 2009 287521 | 12/2009 |
| JP | 2010 112209 | 5/2010 |
| JP | 2011-064191 A | 3/2011 |
| JP | 2012 177310 | 9/2012 | ent
IGNITION CONTROL DEVICE FOR INTERNAL COMBUSTION ENGINE

TECHNICAL FIELD

This invention relates to an ignition control device applied to an internal combustion engine that includes an ignition means to ignite gas in a combustion chamber of the engine by electric discharge.

BACKGROUND ART

Internal combustion engines having the above ignition means (i.e., spark-ignited internal combustion engines) are conventionally designed. In general on this kind of internal combustion engines, ignition means (for example, spark plugs) generate electric discharge in gas in a combustion chamber and ignite the gas by heat due to the electric discharge.

One of conventional ignition control device applied to internal combustion engine having spark plugs (hereinafter referred to as "conventional device"), for example, is designed to generate electric discharges multiple times in gas in a combustion chamber within a predetermined ignition period in a cycle including intake stroke, compression stroke, power stroke and exhaust stroke. In particular, the conventional device focuses on the first discharge among the multiple discharges and determines whether or not the first discharge is normally generated. The conventional device immediately stops the first discharge in the case of determining that the first discharge is not normally generated, and then starts charging for use in the second discharge to generate the second discharge as soon as possible. As a result, the conventional device reduces the degree of negative effects on the ignition of the gas in the combustion chamber (e.g., lack of stability of output torque of the engine caused by the abnormal ignition of the gas) as a result of the abnormal first discharge (for example, see the patent literature 1). As described above, an appropriate ignition of gas in combustion chambers is required.

CITATION LIST

Patent Literature 1: JP 2009-287521 A

SUMMARY OF INVENTION

The conventional device is designed to control the ignition of the gas in the combustion chamber by generating the multiple discharges in consideration of the condition of the first discharge. The conventional device performs this ignition control based on an assumption that "the device generates the multiple discharges for every ignition regardless of whether or not the gas in the combustion chamber is actually ignited." In other words, the conventional device is not designed to consider whether or not the multiple discharges are needed.

In the case that the multiple discharges are generated, the gas in the combustion chamber can be more reliably ignited due to an increase in the number of release of energy (e.g., heat) into the gas in the combustion chamber. The above assumption employed in the conventional device is hence appropriate in view of the reliability of the ignition of the gas in the combustion chamber (that is, the prevention of so-called mis-ignition in the cycle).

It is supposed, however, that the gas can be ignited even in the middle of the multiple discharges as long as a sufficient amount of energy is released into the gas in the combustion chamber from the previous discharge(s). Hence, in the case that the gas in the combustion chamber is ignited in the middle of the multiple discharges in the conventional device, one or more discharges that do not contribute to the gas ignition would continue even after the gas is ignited. Hence, it is generally thought that the degree of negative effects on the spark plug caused by the discharges (e.g., fatigue or deterioration of members exposed to the discharges) escalates with increasing number of the discharges at the spark plug. Consequently, it is undesirable to generate excessive numbers of discharges in view of decreasing the degree of the negative effects caused by the discharges as far as possible.

In view of the above technical problems, it is an object of the present invention to provide an ignition control device that can surely ignite gas in a combustion chamber and decrease the degree of negative effects on ignition means caused by the discharge(s) as far as possible.

The ignition control device of the present invention, for solving the above technical problem, is applied to an internal combustion engine comprising at least one "ignition means" for igniting gas in a combustion chamber of the internal combustion engine by generating discharge in the gas. This engine is configured to generate one or more discharges within an "ignition period" for igniting the gas.

The "gas in a combustion chamber" may be gas that can be ignited with the discharge for operating the engine, and is not specifically limited. Examples of the gas in the combustion chamber include a mixed gas of air and fuel (for example, mixed gas generated outside of the combustion chamber by mixing air and fuel and then guided into the combustion chamber, or mixed gas generated inside of the combustion chamber by mixing air and fuel).

The "ignition means" may be a means having a configuration to enable the generation of discharge in the gas by using supplied energy to the ignition means, and is not specifically limited. Examples of the ignition means include a member to generate discharges (for example, a spark plug), a combination of the member to generate discharges and a member to supply energy for the discharges (for example, a high-voltage generator).

Furthermore, the engine may include "at least one" ignition means, and it is not specifically limited in the number and the location of the ignition means or the embodiments of discharge with the ignition means. For example, the engine may include one or more ignition means each having one part to generate discharges (for example, a spark plug having one pair of electrodes), one or more ignition means each having multiple parts to generate discharges (for example, a spark plug having a part to generate multiple discharges arranged in a circular pattern), or an ignition means having a combined configuration of the above ignition means.

The "ignition period" may be an appropriate period in view of operating the engine by igniting the gas in the combustion chamber, and is not specifically limited. Examples of the ignition period include a predetermined period included in the compression stroke and the power stroke of the cycle including the intake stroke, the compression stroke, the power stroke and the exhaust stroke, a predetermined period in which the piston of the engine exists near the top dead center, and a predetermined period determined in consideration of the output power of the engine and the amount of various matters (e.g., NOx) included in the gas exhausted from the combustion chamber (exhaust gas). One or more discharges are generated in the gas in the combustion chamber within such ignition period (in other words, for example, while the cycle is executed once).

In the ignition control device of the present invention applied to an engine having the above configuration, in consideration of the ignitability of the gas in the combustion chamber due to a discharge with the at least one ignition means, it is determined "whether to start another discharge following the discharge within the ignition period." In other words, it is determined whether or not multiple discharges need to be generated within one ignition period. After that, the another discharge is started in the case of determining "to start the another discharge within the ignition period." The ignition control executed in the ignition control device of the present invention will be described below in the order of the following items 1 to 3.

1. A relationship between discharge voltage and ignitability of gas
 2. Ignition control in the present invention
 3. Embodiments 1. A Relationship Between Discharge Voltage and Ignitability of Gas The following is a brief description of a principle of the ignition of the gas in the combustion chamber with the discharge.

The gas in the combustion chamber has generally a large electric resistivity, and hence the gas is substantially an insulator. However, it is known that the gas generally includes a small amount of electron due to natural radiation, and when a sufficiently strong electric field is impressed in the gas, the phenomenon in which the electric resistivity of the gas decreases (so-called insulation breakdown) occurs since electrons accelerated by the electric field hit molecules constituting the gas to result the ionization of molecules one after another. When the electric resistivity of the gas decreases due to the insulation breakdown, the gas may pass through current therein due to the electric field. That is, a "discharge" is generated in the gas.

When the discharge is generated in the gas, energy (e.g., heat) is released in the gas via the discharge. Flame kernels are generated near the discharge in the gas due to chemical reactions started and stimulated by the released energy in the gas. When a sufficient amount of energy is supplied to the flame kernels, the flame kernels are developed into the flame enable to propagate peripherally by itself without being supplied energy from the discharge. That is, the gas is "ignited."

As described above, the gas is ignited when the discharge is generated in the gas and the sufficient amount of energy is released into the gas.

The above is the descriptions regarding the brief description of the principle of the ignition of the gas with the discharge.

The difference in electric potential between both ends of the discharge is referred to as "discharge voltage." Furthermore, the energy released into the gas via the discharge is referred to as "released energy." Additionally, the degree of certainty of the ignition of the gas is referred to as "ignitability." The phrase "the ignitability is sufficient" represents that the gas is surely ignited.

The amount of the released energy is considered to affect the ignitability of the gas, as is clear from the above. The released energy is considered to have the following features.

Feature (1):

The amount of the released energy generally corresponds to "a value obtained by temporally integrating the product of the amount of the discharge voltage and the amount of the current through the discharge within the period required for the discharge."

Feature (2):

The "amount of the released energy" generally relates to "the path length of the discharge" and "the value of electric resistance of the gas per unit path length (the electric resistivity)."

In particular for "the electric resistivity of the gas", the discharge is generated so as to pass through the gas on which the insulation breakdown occurs as described above. Consequently, the amount of the discharge voltage increases with increasing amount of the electric resistivity of the gas on which the insulation breakdown occurs and through which the discharge passes, assuming the other conditions are equal. In addition, the electric resistivity of the gas after the occurrence of the insulation breakdown changes depending on constituents included in the gas before the insulation breakdown occurs. For example, in the case that mixed gas including air and fuel is employed as the gas, the electric resistivity of the gas decreases with increasing amount of fuel include in the gas since the electric resistivity of fuel is smaller than that of air in general.

Next, in particular for "the path length of the discharge", the electric resistivity of the gas on which the insulation breakdown occurs may be deemed to be substantially the same regardless of location and time while the discharge continues, since the discharge generally continues for extremely short time. Furthermore, the cross-sectional area of the path of the discharge may be deemed to be substantially the same while the discharge continues. Consequently, the amount of the discharge voltage increases with increasing length of the path of the discharge, assuming the other conditions are equal. In addition, the ignition means generally has a predetermined amount of internal resistance, and the amount of the internal resistance is constant regardless of the path length of the discharge. Furthermore, the internal resistance and the path of the discharge are connected in series.

As a result, the amount of the voltage through the path of the discharge (that is, the discharge voltage) changes depending on the path length of the discharge and the electric resistivity of the gas (that is, the amount of electric resistivity of the path), when the amount of energy supplied to the ignition means for the discharge (hereinafter referred to as "supplied energy." In other words, voltage of the power source) is the same. In addition, as same as the above, the amount of "current" through the discharge changes depending on the path length of the discharge and the electric resistivity of the gas.

Feature (3):

"The path length of the discharge" of the above feature (2) relates to "flux of the gas on which the insulation breakdown occurs." In particular, the form of the path of the discharge changes when the gas flows, since the discharge is generated so as to pass through the gas on which the insulation breakdown occurs. The path length of the discharge then changes when the form of the path of the discharge changes. In addition, the degree of change in the form of the discharge changes depending on the degree of the flux of the gas (for example, the flow rate of the gas near the discharge) while the discharge continues.

Feature (4)

"The path length of the discharge" of the above feature (2) itself affects the ignitability of the gas. In particular, the amount of the area on which the discharge contacts the gas changes when the path length of the discharge changes. Consequently, the efficiency of energy transfer from the discharge to the gas (hereinafter referred to as "transmission efficiency of the released energy") increases with increasing length of the path of the discharge, assuming the other conditions are equal. In other words, the amount of the released energy (total energy) increases with increasing length of the path of the discharge since the amount of energy of the discharge per unit path length is deemed to be approximately the same. Thereby, the ignitability of the gas is enhanced.

The inventor(s) conducts various sorts of experiments and discussions in consideration of the features (1) to (4). Following points were found through the experiments and discussions by the inventor(s).

First, a discharge is generally generated so as to pass through the path having the shortest length among possible paths at or around the time at which the discharge starts (hereinafter referred to as "early phase of the discharge"). Hence, in the early phase of the discharge, the flux of the gas has a small impact on the discharge voltage, and the electric resistivity of the gas mainly affects the discharge voltage. That is, the amount of the discharge voltage in the early phase increases with increasing amount of the electric resistivity of the gas.

Next, the path length of the discharge changes when the form of the discharge changes due to the flux of the gas in a time at which the discharge continues after the early phase (hereinafter referred to as "late phase of the discharge"). Hence, in the late phase of the discharge, not only the electric resistivity of the gas but also the flux of the gas affects the discharge voltage. That is, the amount of the discharge voltage in the late phase increases with increasing amount of the flux of the gas and the electric resistivity of the gas.

Furthermore, the time length of the early phase of the discharge is generally longer than that of the late phase (for example, see FIG. 3. In FIG. 3, the period from the time t1 to the time ta corresponds to the early phase, and the period after the time ta corresponds to the late phase). Hence, the amount of the discharge voltage in the early phase has a larger impact on the released energy than that in the late phase. The amount of the discharge voltage in the "late phase" consequently has a "direct" impact on the amount of the released energy. On the other hand, the amount of the discharge voltage in the early phase has a correlation with that in the late phase (that is, the discharge voltage in the early phase and the late phase increases with increasing amount of the electric resistivity of the gas), and consequently the amount of the discharge voltage in the "early phase" has a "indirect" impact on the amount of the released energy. The ignitability of the gas then enhances with increasing amount of the released energy.

As a result, the parameters relevant to the discharge voltage in the early phase of the discharge (for example, the discharge voltage itself and the resistivity of the gas in the early phase) and the parameters relevant to the discharge voltage in the late phase (for example, the discharge voltage itself and the resistivity of the gas in the late phase) can be serve as a barometer for the ignitability of the gas.

In particular, the total of the released energy through the whole process of the discharge (hereinafter referred to as "total released energy") can be estimated based on both of the parameters relevant to the discharge voltage in the early phase and those in the late phase. On the other hand, the total released energy can be approximately estimated only based on the parameters relevant to the discharge voltage in the late phase. Then, the ignitability of the gas then can be measured based on the total released energy.

In addition, the above description does not deny the possibility that the amount of the discharge voltage changes for other reasons than the electric resistivity and the flux of the gas. However, the other reasons has a negligible small impact on the discharge voltage compared with that of the electric resistivity and the flux of the gas, in consideration of the above description that the discharge continues in an extremely short time.

The above is the descriptions regarding the relationship between the discharge voltage and the ignitability of gas.

2. Ignition Control in the Present Invention

The inventor(s) conducts various sorts of discussions on an ignition control device to solve the above problem in consideration of the relationship between the discharge voltage and the ignitability of gas. The discussions by the inventor(s) found that the degree of the negative effects on the ignition means caused by the discharges can be decreased while keeping the ignitability of gas by measuring the ignitability of gas based on at least the parameters relevant to the discharge voltage in the late phase among the parameters relevant to the discharge voltage in the early phase and the late phase.

In view of the above, the ignition control device of the present invention comprises a configuration:

to refer "first parameter" relevant to discharge voltage and "second parameter" relevant to discharge voltage, when a discharge generated with the at least one ignition means continues for a period from a "discharge start timing" to a "discharge end timing", on which references the discharge start timing is a timing to start the discharge, the discharge end timing is a timing to end the discharge for the first time after the discharge start timing, the first parameter is a discharge voltage within first period or an amount of fuel included in the gas, the second parameter is a discharge voltage within second period or a flow rate of the gas near the discharge, the discharge voltage is an difference in electric potential between both ends of the discharge, the "first period" is from the discharge start timing to an intermediate timing after and near the discharge start timing, the "second period" is from the intermediate timing to the discharge end timing;

to determine whether to start another discharge following the discharge within the ignition period based on at least the second parameter among the first parameter and the second parameter; and to start the another discharge with the at least one ignition means in the case of determining to start the another discharge within the ignition period.

The following is reasons that the ignition control device of the present invention employs the above control.

The minimum energy required for igniting the gas in the combustion chamber (hereinafter referred to as "minimum ignition energy") generally varies depending on substances constituting the gas and the amount of the substances included in the gas. On the other hand, the energy to ignite the gas in the combustion chamber is released into the gas via the discharge (that is, the released energy) as described above. After that, when the amount of the released energy (the total released energy) is larger than the minimum ignition energy, the gas is ignited.

As described above, the amount of the released energy can be measured based on both of the parameter relevant to the discharge voltage in the early phase (the first parameter relevant to the discharge voltage), which phase corresponds to the first period, and the parameter relevant to the discharge voltage in the late phase (the second parameter relevant to the discharge voltage), which phase corresponds to the second period, or approximately only based on the parameter relevant to the discharge voltage in the late phase (the second parameter).

Hence, for example, the ignitability of gas can be measured in consideration of "only the second parameter" among the first parameter and the second parameter. Furthermore, for example, the ignitability of gas can be measured more approximately in consideration of "both" of the first parameter and the second parameter compared with in consideration of only the second parameter.

Consequently, the ignition control device of the present invention measures the ignitability of gas (that is, whether or not the another discharge following the discharge should be started) based on at least the second parameter among the first parameter and the second parameter. After that, the another discharge is started at the ignition means (an ignition means at which the discharge started, or other ignition means) when it is determined that "the another discharge should be started within the ignition period."

Thereby, the ignitability of gas can be appropriately measured based on as-needed parameter(s), and hence the gas in the combustion chamber can be surely ignited. Furthermore, along with the appropriate measurement of the ignitability of gas in the combustion chamber, the negative effects of the discharge on the ignition means can be reduced as far as possible due to the prevention of unnecessary discharges that do not contribute to the ignition of the gas in the combustion chamber.

The above is the descriptions regarding the reasons that the ignition control device of the present invention employs the above controls As is clear from the above, the parameter(s) used for measuring the ignitability of gas (both of the first parameter and the second parameter, or only the second parameter) may be chose as necessary (for example, in consideration of the minimum ignition energy of the gas, the condition of the released energy in the first period and the second period, and required accuracy of the measurement).

Furthermore, the determination whether or not "the another discharge should be started within the ignition period" may be executed in consideration of the points such that whether or not the gas in the combustion chamber is appropriately ignited (or not ignited). The phrase "the gas in the combustion chamber is not appropriately ignited" represents that no flame kernel is generated in the gas, the flame kernels are not developed into the flame enable to propagate peripherally, or the flame disappears while the flame propagates peripherally.

The above "discharge voltage within the first period" may be a discharge voltage at any time within the first period, and is not specifically limited. Furthermore, the above "discharge voltage within the second period" may be a discharge voltage at any time within the second period, and is not specifically limited. Specific Examples of the discharge voltage within the first period and the second period will be described below as several embodiments of the ignition control device of the present invention.

In addition, the "discharge (by which the ignitability is measured)" is not limited the first-time discharge. For example, when second-time discharge is generated as the result of the determination on the first-time discharge and then the determination on the second-time discharge is further executed, the above "discharge" represents the second-time discharge. That is, the ignition control device of the present invention determines, based on the first parameter and the second parameter regarding arbitrary time discharge (n-th time discharge), whether or not a discharge (n+1-th time discharge) following the discharge should be started.

Furthermore, the "another discharge" may be generated with the ignition means with which the discharge (by which the ignitability of the gas is measured) or other ignition means.

3. Embodiments

The following is several embodiments (first embodiment to fourteenth embodiment) of the ignition control device of the present invention.

First Embodiment

For example, as the "amount of fuel included in the gas", fuel concentration in the gas or air-fuel ratio of the gas may be employed. Methods for obtaining the amount of fuel included in the gas are not specially limited.

For example, as the amount of fuel included in the gas, "a value obtained based on the discharge voltage within the first period" or "a value independently obtained from the discharge voltage within the first period" may be employed.

In the case that the amount of fuel in the gas is "a value obtained based on the discharge voltage", the amount of fuel may be obtained by applying an actual value of the discharge voltage to a relationship (e.g., maps) between the discharge voltage and the amount of fuel included in the gas, which relationship is defined in advance by experiments. On the other hand, in the case that the amount of fuel in the gas is "a value independently obtained from the discharge voltage", the amount of fuel may be obtained based on various sorts of operation parameters of the engine (such as fuel injection amount, engine rotational speed, and intake air amount).

Second Embodiment

Methods for obtaining "the flow rate of the gas near the discharge" are also not specially limited.

For example, as the flow rate of the gas near the discharge, "a value obtained based on the discharge voltage within the second period" or "a value independently obtained from the discharge voltage within the second period" may be employed.

In the case that the flow rate of the gas is "a value obtained based on the discharge voltage", the flow rate may be obtained by applying an actual value of the discharge voltage to a relationship (e.g., maps) between the discharge voltage and the flow rate of the gas, which relationship is defined in advance by experiments. On the other hand, in the case that the flow rate of the gas is "a value independently obtained from the discharge voltage", the flow rate may be obtained based on the form of the combustion chamber, the position of the ignition means, the fluid characteristics of the gas in the combustion chamber, and various sorts of operation parameters of the engine (such as engine rotational speed and intake air amount).

Third Embodiment

Regarding the transition of the discharge voltage within the first period, the absolute value of the discharge voltage (the difference between two points through which the discharge is generated) generally rises until the insulation breakdown in the gas occurs after the energy for discharging is start to be supplied to the ignition means, and drops when the electric resistivity of the gas decreases after the insulation breakdown in the gas occurs. On the other hand, regarding the transition of the discharge voltage within the second period, the absolute value of the discharge voltage generally rises with increasing length of the path of the discharge by the flux of the gas, and drops with increasing energy expended in the ignition means.

In view of the transitions of the discharge, for example, the discharge voltage at an appropriate time in view of the accuracy of the measurement of the ignitability of the gas may be employed as the first parameter relevant to the discharge voltage and the second parameter relevant to the discharge voltage.

For example, in the case that the discharge voltage undergoes the above transition, as the first parameter, the discharge voltage at "a time before an absolute value of the discharge voltage is the maximum value" within the first period may be employed. Furthermore, in the case of the above, as the second parameter, the discharge voltage at "a time before an absolute value of the discharge voltage is the maximum value" within the second period may be employed.

Fourth Embodiment

Furthermore, in the case that the discharge voltage undergoes the above transition, as the first parameter, the discharge voltage at a time when an absolute value of the discharge voltage is the maximum value (that is, the maximum value of the absolute value of the discharge voltage) within the first period may be employed.

Fifth Embodiment

Additionally, in the case that the discharge voltage undergoes the above transition, as the second parameter, the discharge voltage at a time when an absolute value of the discharge voltage is the maximum value (that is, the maximum value of the absolute value of the discharge voltage) within the second period may be employed.

Regarding the third embodiment to the fifth embodiment, the device determines "whether or not the another discharge should be started within the ignition period" based on the maximum value of the absolute value of the discharge voltage or the transition of the discharge voltage until the absolute value of the discharge voltage becomes the maximum value, which have strong correlation with the ignitability of the gas. Hence, the ignitability of the gas can be measured accurately. In particular, regarding the fourth embodiment and the fifth embodiment (in consideration of the maximum value of the absolute value of the discharge voltage), the accuracy of the measurement of the ignitability of the gas can be maintained compared with the cases in which values other than the maximum value is used even when the transition of the discharge voltage changes due to aged deteriorations of the ignition means.

Sixth Embodiment

In the second period, the discharge voltage may change due to the flux of the gas, as described above. In other words, the transition of the discharge voltage in the second period reflects the degree of the flux of the gas. For example, the flow rate of the gas increases with increasing degree of rise of the discharge voltage within the second period. That is, the "change rate" of the amount of the discharge voltage in the second period reflects the flow rate of the gas (for example, whether the flow rate of the gas increases or decreases). Furthermore, the degree of the flux of the gas has an impact on not only the ignitability of the gas due to "the discharge (by which the ignitability of the gas is measured)" but also the ignitability of the gas due to the "another discharge."

In the case of the above, "a time to start the another discharge" may be set to be an "earlier" time with "increasing" degree of rise of a change rate of the discharge voltage within the second period, when the change rate "increases" within the second period. On the other hand, a time to start the another discharge may be set to be a "later" time with "decreasing" degree of drop of a change rate of the discharge voltage within the second period, when the change rate "decreases" within the second period.

When the change rate of the discharge voltage "increases", the flow rate of the gas near the discharge rises (gains its speed). In this case, the operation condition of the engine changes (for example, the speed of pistons rises), which condition has an impact on the flux of the gas, and hence it is desirable to start the another discharge at a time depending on the operation condition. In view of the above, in this case, the start time of the another discharge is set to be an earlier timing, and thus the difference (the difference in combustion timing) between the combustion timing in the case of igniting the gas by the discharge (by which the ignitability is measured) and the combustion timing in the case of igniting the gas by the another discharge can be decreased. Thereby, for example, the device can reduce the instability of output torque of the engine caused by the change of the combustion timing of the gas.

On the other hand, when the change rate of the discharge voltage "decreases", the flow rate of the gas near the discharge drops (reduces its speed).

In general, the discharge is generated before the piston of the engine reaches to the top dead center in view of enhancing the heat efficiency of the engine. Hence, in this case, the start time of the another discharge is set to be an earlier timing, and thus the another discharge can be generated in a condition that the temperature of the gas and the density of the gas are high due to the compression of the gas in the combustion chamber. Thereby, for example, the device can more surely ignite the gas in the combustion chamber.

Seventh Embodiment

When the degree of the flux of the gas within the second period is excessively large, the discharge may end before all of the energy supplied to the ignition means (the supplied energy) is expended since the discharge is cut because of the interception with the gas on which insulation breakdown does not occur (hereinafter referred to as "the discharge is blown out").

In view of the above, when the engine repeatedly executes the cycle including the ignition period, the device may employ, as the second parameter, the discharge voltage at a time set to be an "earlier" time with increasing amount of engine rotation speed that is a number of the cycles executed per unit time.

The flow rate of the gas near the discharge generally increases with increasing amount of the engine rotational speed. Furthermore, there is a higher possibility that the discharge is blown out at an earlier timing when the flow rate of the gas is large compared with the case in which the flow rate of the gas is small. Hence, the second parameter is set to employ the discharge voltage at an "earlier" time with increasing amount of engine rotation speed, and thus the second parameter can be set so as to be a discharge voltage before the discharge is blown out. Thereby, the ignitability of the gas can be measured more appropriately.

Eighth Embodiment

The path length of the discharge changes (increases) until the discharge is blown out even in the case that the discharge is blown out in the second period, as same as the case in which the discharge is not blown out. Hence, the device may employ, as the second parameter, the discharge voltage at an appropriate time in view of accuracy of the measurement the ignitability of the gas, as same as the third embodiment to the fifth embodiment.

For example, the device may employ, as the second parameter, the discharge voltage at "a time before the discharge end timing", when the discharge is started at the discharge start timing by starting a supply of a predetermined amount of energy to the at least one ignition means, and the discharge is ended at the discharge end timing for the first time before all of the energy is used for the discharge.

In the above configuration, the device determines "whether or not the another discharge should be started within the ignition period" based on the discharge voltage before the discharge is blown out (the discharge end timing). Thereby, the ignitability of the gas can be accurately measured, and the accuracy of the measurement on the ignitability of the gas can be maintained even when aged deteriorations occurs on the ignition means.

The "time before the discharge end timing" may be any timing at which the ignitability of the gas can be accurately measured, and is not specifically limited. Examples of the time before the discharge end timing include the discharge end timing, or a timing right before the discharge end timing.

Ninth Embodiment

Furthermore, when the engine repeatedly executes the cycle including the ignition period, the device may employ, as the second parameter, the discharge voltage at a time determined based on an "average value" of the discharge voltages within the second period in a plurality of the cycles.

Methods to obtain the "average value of the discharge voltages" are not specifically limited. The device may employ "a method in which the average value of the discharge voltages are calculated by obtaining the discharge voltage at multiple timings in each cycle (for example, at timing a, timing b, timing c . . . ), and calculating the average values of the discharge voltages for each timing, and then obtaining an approximate curve to connect the average values on each timing." In this method, the discharge voltages at multiple timings (at timing a, timing b, timing c . . . ) are obtained in each cycle.

On the other hand, the device may employ "a method in which the average value of the discharge voltages are calculated by obtaining the discharge voltage at a certain timing (time a) over multiple cycles, and calculating the average value of the discharge voltages at the certain timing, and calculating the average values at other timings (time b, time c . . . ) in the same manner, and then obtaining an approximate curve to connect the average values on each timing." In this method, the average values of the discharge voltage can be obtained more easily compared with the above method.

The above configuration can reduce the impact on the measurement of the ignitability of the gas due to the instability of the discharge voltage (noise) caused by various kinds of disturbances.

Tenth Embodiment

Regarding specific examples of the first period and the second period, the device may employ, as the first period, a period in which the discharge voltage changes at least due to "the amount of fuel included in the gas", and as the second period, a period in which the discharge voltage changes at least due to "the amount of fuel included in the gas" and "the flow rate of the gas near the discharge."

Eleventh Embodiment

Furthermore, regarding specific examples of the first period and the second period, the device may have a configuration in which:

the engine further comprises an ignition coil, the ignition means is an ignition means enable to generate capacitive discharge and inductive discharge (the capacitive discharge is a discharge due to electrostatic energy with the ignition coil, and the inductive discharge is a discharge due to electromagnetic energy with the ignition coil), the device may employ, as the first period, a period to generate the capacitive discharge with the ignition means, and the device may employ, as the second period, a period to generate the inductive discharge with the ignition means.

Twelfth Embodiment

In the ignition control device of the present invention, it is not limited in types, characteristics, numbers and positions of the member to supply the energy for the discharge to the ignition means (for example, ignition coil).

For example, the ignition control device of the present invention may have a configuration in which:

the engine comprises "a plurality of ignition coils", a charge of energy for the another discharge is began, "before" starting the discharge generated by a supply of energy charged in one ignition coil among the plurality of ignition coils to at least one ignition means, so as to charge the energy to other ignition coil different from the one ignition coil, the energy charged in the other ignition coil is supplied to the at least one ignition means "within the ignition period" when being determined to start the another discharge within the ignition period, and the energy charged in the other ignition coil is supplied to the at least one ignition means "after the ignition period" when not being determined to start the another discharge within the ignition period.

Due to the above configuration, the another discharge with sufficient energy can be immediately started when it is determined that "the another discharge should be started within the ignition period", since the energy is charged in the another ignition coil earlier compared with the case that the charge of energy is started "after" the start of the discharge. Thereby, the difference in the combustion timing of the gas can be reduced. Furthermore, the impact on the ignition means by the discharge can be reduced compared with the case that the discharge is generated within the ignition period, since the energy is supplied to the ignition means after the ignition period (for example, after the combustion of the gas. More specifically, when the piston exists at a position of 60 degrees or more after the compression top dead center) "in the case that it is not determined to start the another discharge within the ignition period."

Thirteenth Embodiment

Furthermore, for example, the ignition control device of the present invention may have a configuration in which:

the engine comprises a plurality of ignition coils, in the case that the discharge is started by a supply of energy from one ignition coil among the plurality of ignition coils to at least one ignition means and the another discharge is started by a supply of energy from other ignition coil different from the one ignition coil to at least one ignition means, an amount of energy supplied to the at least one ignition means from the other ignition coil is "larger" than an amount of energy supplied to the at least one ignition means from the one ignition coil.

Due to the above configuration, the difference in the combustion timing of the gas can be reduced, since the combustion of the gas by the another discharge proceeds more quickly than that by the discharge (by which the ignitability of the gas is measured). Thereby, for example, the device can reduce the instability of output torque of the engine caused by the change of the combustion timing of the gas. Furthermore, for example, the device can prevent the increase of the amount of substances such as nitrogen oxide (NOx) included in the combustion gas (the exhaust gas), since the combustion timing of the gas can be shifted to the best timing in view of decreasing the substances included in the combustion gas, and the instability of the combustion timing of the gas can be reduced.

DESCRIPTION OF EMBODIMENTS

Figure 1:
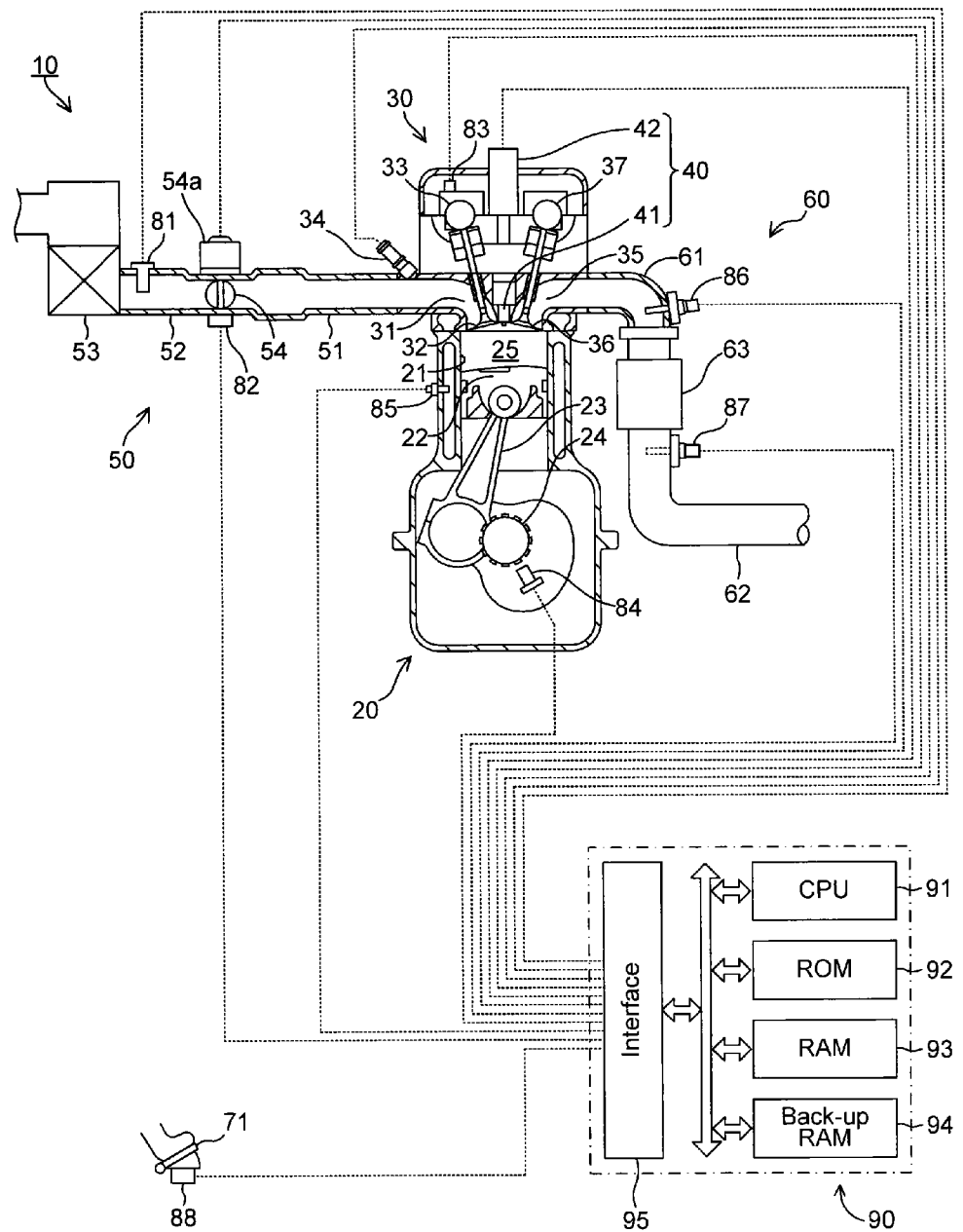
FIG. 1 is a schematic diagram of an internal combustion engine to which an ignition control device according to an embodiment of the invention is applied.

Hereinafter, embodiments of the ignition control device of the present invention (the first embodiment to the twelfth embodiment) will be described by referring to the drawings.
(First Embodiment)
<Outline of Device>

FIG. 1 illustrates a schematic configuration of a system in which the ignition control device according to the first embodiment of the present invention (hereinafter referred to as "first device") is applied to an internal combustion engine 10. The internal combustion engine 10 is a four-cycle spark-ignited multi-cylinder (four cylinders) engine. Other cylinders include the same configuration as this cylinder. The internal combustion engine 10 is hereinafter simply referred to as "engine 10" for the sake of convenience.

The engine 10 includes a cylinder block part 20, a cylinder head part 30 fixed on the upper part of the cylinder block part 20, an ignition control system 40 installed in the cylinder head part 30, an intake system 50 to guide air-fuel mixture into the cylinder block part 20, an exhaust system 60 to discharge gas from the cylinder block part 20 (exhaust gas), an acceleration pedal 71, various types of sensors 81-88, and an electronic control device 90.

The cylinder block part 20 includes a cylinder 21, a piston 22, a con rod 23, and a crankshaft 24. The piston 22 moves back and forth in the cylinder 21, and the back-and-forth motion of the piston 22 is transmitted to the crankshaft 24 via the con rod 23, and thereby the crankshaft 24 rotates. An inner surface of the cylinder 21, an upper surface of the piston 22 and a bottom surface of the cylinder head part 30 defines combustion chamber 25.

The cylinder head part 30 includes an intake port 31 connected to the combustion chamber 25, an intake valve 32 to open and close the intake port 31, an intake camshaft 33 to drive the intake valve 32, an injector 34 to inject fuel into the intake port 31, an exhaust port 35 connected to the combustion chamber 25, an exhaust valve 36 to open and close the exhaust port 35, and an exhaust camshaft 37 to drive the exhaust valve 36. Fuel injected from the injector 34 and air passed through the intake system 50 are mixed, and the mixed gas (the air-fuel mixture) is guided to the combustion chamber 25.

The ignition control system 40 includes a spark plug 41 which is an ignition means to ignite the air-fuel mixture in the combustion chamber 25 by generating electric discharge in the mixture, and an igniter 42 that supplies energy for discharge toward the spark plug 41 and controls the discharge. One spark plug 41 is installed on the combustion chamber 25 as illustrated in FIG. 1.

Figure 2:
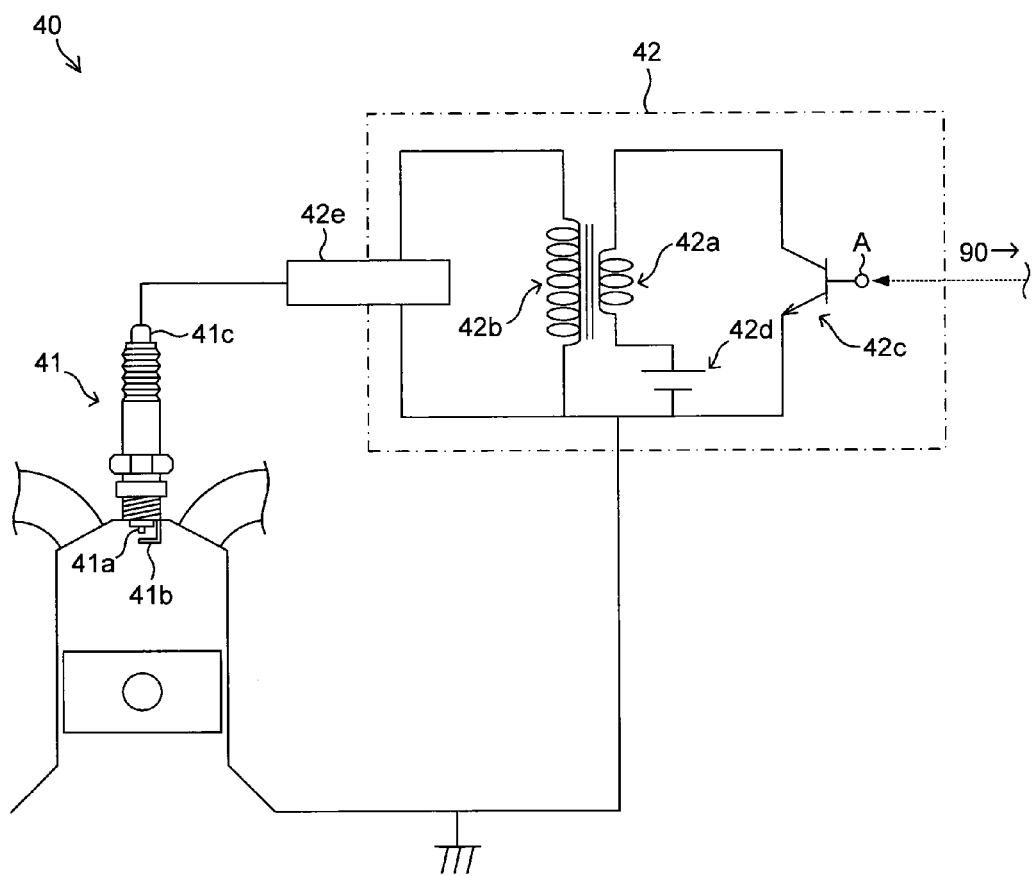
FIG. 2 is a conceptual diagram illustrating a configuration of an igniter that is connected to a spark plug.

The configuration of the ignition control system 40 is described in detail by referring to FIG. 2.

FIG. 2 is a conceptual diagram illustrating a configuration of the igniter 42 connected to the spark plug 41. The spark plug 41 includes a center electrode 41a, an earth electrode 41b, and a terminal nut 41c. The igniter 42 includes, on a conceptual basis, a primary coil 42a, a secondary coil 42b, a transistor 42c, a power source 42d, and an output part 42e. The power source 42d is not necessarily installed inside of the igniter 42 although it is illustrated in the igniter 42 for the sake of convenience, but may be supplied from outside of the igniter 42.

The primary coil 42a and the secondary coil 42b constitute so-called transformer (electric transformer). That is, the number of turns of the primary coil 42a is larger than that of the secondary coil 42b (for example, the turn ratio between them is around several hundred times), and thereby input voltage from the side of the primary coil 42a is transformed depending on the turn ratio and output to the side of the secondary coil 42b. In particular, the transistor 42c, which is installed on the side of the primary coil 42a, switches the current from the emitter to the collector on and off depending on instruction signals that the base electrode A receives from the electronic control device 90. In the case that the transistor 42c receives the instruction from the electronic control device 90 to allow the current flow, the current depending on the power source 42d (hereinafter referred to as "primary current") flows so as to pass through the primary coil 42a and the transistor 42c. Next, in the case that the transistor 42c receives the instruction from the electronic control device 90 to block the current flow, the primary current drops exponentially. Then, the number of the interlinkage magnetic flux in the primary coil 42a changes along with the change of the primary current, and thereby the secondary coil 42b generates the induced voltage due to the mutual induction depending on the change of the number of the interlinkage magnetic flux. The induced voltage corresponds to the product of the voltage input to the side of the primary coil 42a (the voltage of the power source 42d) and the turn ratio. That is, the voltage of the power source 42d is transformed depending on the turn ratio.

As described above, the transformed voltage is output from the side of secondary coil 42b depending on the instruction signals from the electronic control device 90. This voltage is applied to the terminal nut 41c of the spark plug 41 via the output part 42e. The terminal nut 41c is connected to the center electrode 41a through the spark plug 41. The transformed voltage is hence finally applied between the center electrode 41a and the earth electrode 41b. When the insulation brakedown, which is described above, occurs in the air-fuel mixture between the center electrode 41a and the earth electrode 41b, the electric discharge occurs between those electrodes. Furthermore, the current depending on the voltage (hereinafter referred to as "secondary current") flows so as to pass through the secondary coil 42b, the output part 42e, the terminal nut 41c, the center electrode 41a and the earth electrode 41b.

The "discharge voltage", which is described above, corresponds to the voltage applied between the center electrode 41a and the earth electrode 41b (that is, the difference in electric potentials between the both end of the discharge) when the discharge occurs. The discharge starts due to the instruction to the transistor 42c from the electronic control device 90 so as to block the primary current, as is clear from the above. In view of the above, the instruction is referred to as "discharge starting instruction."

In addition, the earth electrode 41b, the secondary coil 42b and the power source 42d are grounded via the body of the engine 10. Furthermore, regarding the engine 10 to which the first device is applied, the ignition control system 40 is designed so that the electric potential of the center electrode 41a is "positive" in reference to the electric potential of the earth electrode 41b (zero).

The output part 42e is grounded via the body of the engine 10 to obtain the discharge voltage. In other words, the output part 42e obtains the difference in electric potentials between the electric potential of one end of the secondary coil 42b (which potential corresponds to the electric potential of the earth electrode 41b, since the one end is grounded as described above.) and the electric potential of the other end thereof (which potential corresponds to the electric potential of the center electrode 41a connected thereto via the terminal nut 41c). The discharge voltage Vig is obtained based on the difference in electric potentials.

Referring back to FIG. 1, the intake system 50 includes an intake manifold 51 connected to each cylinder via the intake port 31, an intake pipe 52 connected to the collecting area located upstream of the intake manifold 51, an air cleaner 53 installed at the one end of the intake pipe 52, a throttle valve (intake throttling valve) 54 capable of changing the opening area (the opening cross-sectional area) of the intake pipe 52, and a throttle valve actuator 54a rotatory driving the throttle valve 54 depending on the instruction signals. The intake port 31, intake manifold 51 and the intake pipe 52 constitute the intake passage.

The exhaust system 60 includes the exhaust manifold 61 connected to each cylinder via the exhaust port 35, an exhaust pipe 62 connected to the collecting area located downstream of the exhaust manifold 61, and a catalyst 63 installed on the exhaust pipe 62 to purify the exhaust gas. The exhaust port 35, exhaust manifold 61 and the exhaust pipe 62 constitute the exhaust passage.

The acceleration pedal 71 is provided outside of the engine 10 to input a required torque and a request to increase speed. The acceleration pedal 71 is controlled by operators of the engine 10.

Furthermore in particular regarding the sensors 81-88, the first device includes an air flow meter 81, a throttle valve position sensor 82, a cam position sensor 83, a crank position sensor 84, a coolant water temperature sensor 85, an upstream oxygen concentration sensor 86, a downstream oxygen concentration sensor 87, and an acceleration pedal position sensor 88.

The air flow meter 81 is installed on the intake passage (the intake pipe 52). The air flow meter 81 outputs signals depending on the amount of intake air (i.e., the mass of intake air to the engine 10) which is the mass flow rate of intake air flowed in the intake pipe 52. The intake air amount Ga is obtained based on the signals.

The throttle valve position sensor 82 is installed near the throttle valve 54. The throttle valve position sensor 82 outputs signals corresponding to the opening degree of the throttle valve 54. The throttle valve position is obtained based on the signals.

The cam position sensor 83 is installed near the intake camshaft 33. The throttle valve position sensor 82 outputs signals that has one pulse with every 90 degrees rotation of the intake camshaft 33 (in other words, with every 180 degrees rotation of the crankshaft 24). The rotational position of the intake camshaft 33 (the cam position) is obtained based on the signals.

The crank position sensor 84 is installed near the crankshaft 24. The crank position sensor 84 outputs signals that has a narrow pulse with every 10 degrees rotation of the crankshaft 24 and a wide pulse with every 360 degrees rotation of the crankshaft 24. The number of rotations of the crankshaft 24 per unit time (hereinafter referred to as "engine rotational speed NE") is obtained based on the signals.

The coolant water temperature sensor 85 is installed on a coolant passage in the cylinder 21. The coolant water temperature sensor 85 outputs signals corresponding to the temperature of the coolant. The temperature of the coolant is obtained based on the signals.

The upstream oxygen concentration sensor 86 and the downstream oxygen concentration sensor 87 are installed on the upstream and the downstream of the catalyst 63 on the exhaust passage. The upstream oxygen concentration sensor 86 and the downstream oxygen concentration sensor 87 output signals corresponding to the oxygen concentration of the exhaust gases that is flowed in and discharged from the catalyst 63 respectively.

The acceleration pedal position sensor 88 is installed on the acceleration pedal 71. The acceleration pedal position sensor 88 outputs signals depending on the position of the acceleration pedal 71. The acceleration pedal position Accp is obtained based on the signals.

The engine 10 further includes the electronic control device 90.

The electronic control device 90 includes a CPU 91, a ROM 92 storing in advance programs, tables (maps) and constant numbers used in the operation of the CPU 91, a RAM 93 in which the CPU 91 temporarily stores data as necessary, a back-up RAM 94 storing data when the power is on and keeping the stored data even while the power is off, and an interface 95 including an AD converter. The CPU 91, the ROM 92, the RAM 93, the back-up RAM 94 and the interface 95 are connected each other via buses.

The interface 95 is connected to the above sensors and transmits signals from the sensors to the CPU 91. Furthermore, the interface 95 is connected to members such as the injector 34 and the ignition control system 40 (the base electrode A of the transistor 42c) and sends instruction signals thereto depending on the instructions from the CPU 91.

<Transition of Discharge Voltage>

Next, the transition of discharge voltage on the engine 10, which has the above configuration, will be described by referring to FIG. 3 and FIG. 4, before specific descriptions on operations of the first device.

Case 1: Path Length of Discharge does not Change

Figure 3:
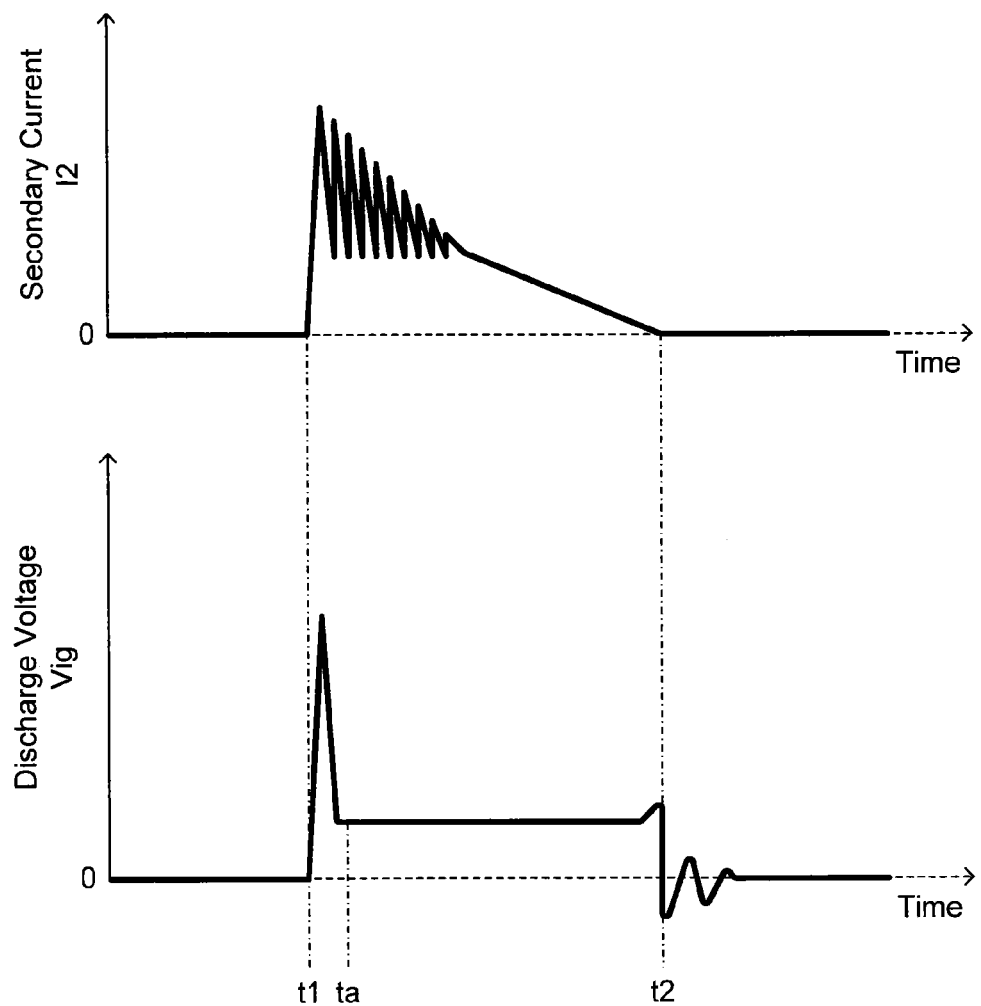
FIG. 3 is a time chart as a reference example illustrating a relationship between discharge voltage and secondary current.

First, the following is one example of the transition of discharge voltage in the case that a path length of a discharge does not change (in other words, under the assumption that flux of the air-fuel mixture has no effect on the path length) referring to the time chart illustrated in FIG. 3 as a reference example. FIG. 3 is a time chart illustrating an example of transitions of discharge voltage Vig and secondary current I2 in the period from the start to the end of discharging: FIG. 3 illustrates simplified forms of actual waveforms of respective values for the sake of convenience. In addition, scales of the vertical axis and the horizontal axis in FIG. 3 are arbitrarily enlarged or reduced for convenience.

In the example illustrated in the time chart, the igniter 42 receives the "discharge starting instruction" at the time t1. In particular, the voltage transformed with the igniter 42 (so that the electric potential of the center electrode 41a is positive, as described above) is applied between the center electrode 41a and the earth electrode 41b of the spark plug 41 at time t1. The insulation breakdown then occurs in the air-fuel mixture between the center electrode 41a and the earth electrode 41b due to the voltage. The voltage corresponds to the "supplied energy" as described above.

An extremely short time length is generally required from the time at which the igniter 42 receives the discharge starting instruction (the time t1) to the time at which the insulation breakdown occurs in the air-fuel mixture (in other words, the time at which a discharge substantially starts). Consequently, the time t1 and the time at which a discharge starts are considered as the substantially same time. Then the following will be described with the assumption that a discharge starts at time t1.

When a discharge starts at time t1, the electrostatic energy is discharged within a relatively short time, which energy is charged in a specific capacitance (parasitic capacitance) existed in the circuits belonging to the secondary coil 42b. That is, so-called capacitive discharge starts. It is generally thought that the capacitive discharge occurs in the form of spark discharge, which is a discontinuous transitional discharge. When the capacitive discharge occurs, the discharge voltage Vig rises until the insulation breakdown of the air-fuel mixture and drops after the insulation breakdown since the electric resistivity of the air-fuel mixture become reduced due to the insulation breakdown.

The capacitive discharge is considered to occur so as to pass through the pathway having the shortest path length among multiple pathways through which the discharge can pass through (which shortest one is generally the pathway corresponding to the shortest distance between the center electrode 41a and the earth electrode 41b of the spark plug 41). Consequently, the "electric resistivity of the air-fuel mixture" is considered to affect mainly the discharge voltage Vig at and around the time t1 (which corresponds to the first period described above). In other words, the first period corresponds to the period in which the discharge voltage Vig changes depending on the electric resistivity of the air-fuel mixture (which resistivity corresponds to an amount of fuel included in the mixture, for instance) or the period in which the spark plug 41 generates the capacitive discharge.

Furthermore, at or after the time to which is a time after a predetermined time has passed since the time t1, the capacitive discharge is followed by the discharge of the electromagnetic energy within a relatively long time, which energy is charged in the secondary coil 42b. That is, so-called inductive discharge starts. It is generally thought that the inductive discharge occurs in the form of arc discharge or glow discharge, which is a continuous discharge. In addition, the continuing time length of the inductive discharge is longer than that of the capacitive discharge.

The supplied energy is gradually expended while the inductive discharge continues. Then, at the time t2, which is a time after a predetermined time has passed since the time at which the inductive discharge started, all of the supplied energy is expended and the inductive discharge stops. That is, the discharge started with the discharge starting instruction finishes.

In addition, the secondary current I2 becomes the largest at the time t1 at which the discharge starts, and gradually drops over time to be zero at the time t2 at which the discharge finishes. The secondary current I2 can be measured with a current measuring device (not illustrated in the figure).

The series of discharges release energy (e.g., heat) into the air-fuel mixture, and thereby the air-fuel mixture is ignited. The energy corresponds to the "released energy" described above.

Case 2: Path Length of Discharge Changes

Figure 4:
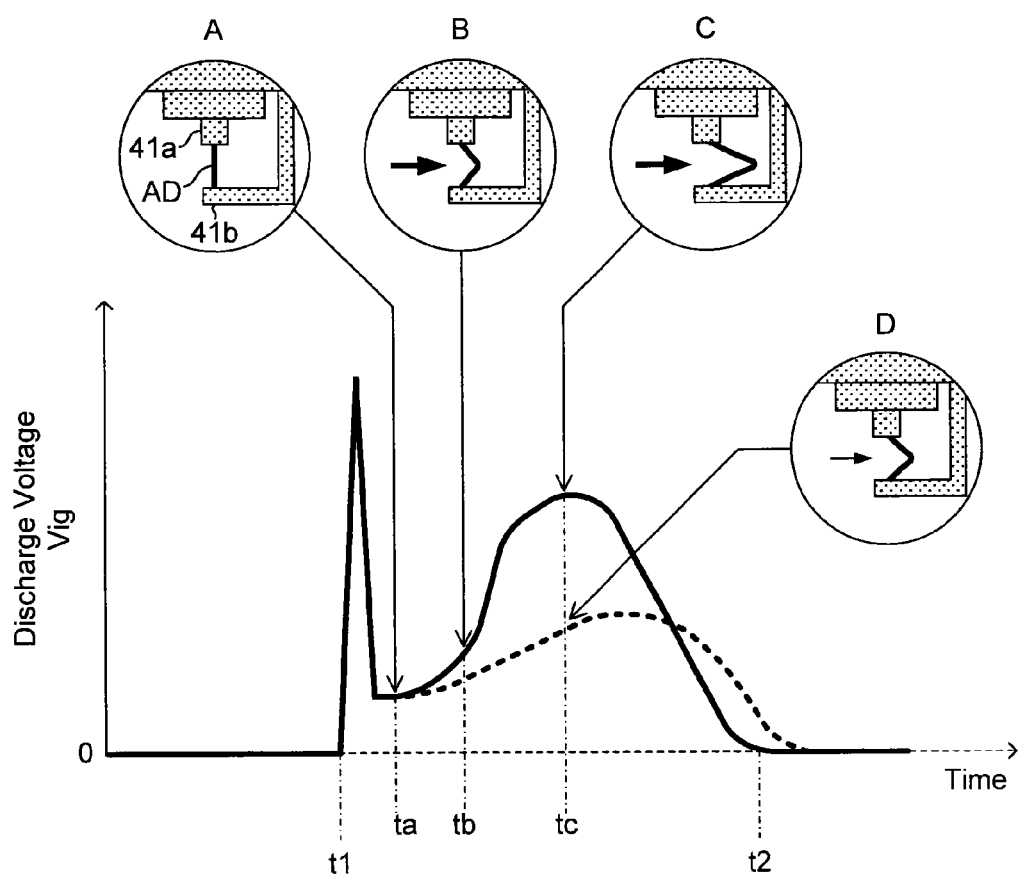
FIG. 4 is a time chart illustrating a transition of discharge voltage in the case that a path length of a discharge changes.

Next, the following is one example of the transition of discharge voltage in the case that a path length of a discharge changes due to the flux of the air-fuel mixture by referring to the time chart illustrated in FIG. 4. FIG. 4 is a time chart illustrating the transitions of discharge voltage Vig in the case that a path length of a discharge changes. FIG. 4 also illustrates simplified forms of actual waveforms of discharge voltages for the sake of convenience. In addition, scales of the vertical axis and the horizontal axis in FIG. 4 are also arbitrarily enlarged or reduced for convenience. The transition of secondary current I2 is omitted.

In the first example illustrated in the time chart (see solid line in the figure), a discharge starts at time t1 as same as the above. In this example, at the time ta (corresponding to the intermediate time described above) which is a time after a predetermined time has passed since the time t1, the inductive discharge starts to generate the discharge (e.g., arc discharge AD) between the center electrode 41a and the earth electrode 41b as illustrated in the partial view A. The length of the discharge at the time ta is nearly equal to the distance between the center electrode 41a and the earth electrode 41b of the spark plug 41 (so-called plug gap).

Next, as illustrated in the partial view B in FIG. 4, at the time tb which is a time after a predetermined time has passed since the time ta, the form of the discharge path changes due to the flux of the air-fuel mixture near the discharge AD (see the arrow in the partial view B). In particular, the path length of the discharge AD is extended in this example as illustrated in the partial view B. The discharge voltage Vig rises when the path length of the discharge extends, as described above.

Furthermore, as illustrated in the partial view C in FIG. 4, at the time tc, which is a time after a predetermined time has passed since the time tb, the path length of the discharge AD is further extended. The discharge voltage Vig then further rises. After the time tc, the discharge voltage Vig gradually drops since the energy charged in the secondary coil 42b is expended. The discharge voltage Vig becomes zero at the time t2 at which the discharge finishes.

The path length of the discharge changes depending on the degree of the flux of the air-fuel mixture, and then the discharge voltage Vig also changes, as is clear from the above. For example, the second example in the time chart in FIG. 4 (see the broken line in the figure) illustrates the transition of the discharge voltage Vig in the case that the degree of the flux of the air-fuel mixture is "smaller" than that in the first example (see solid line in the figure). As illustrated in the partial view D in FIG. 4, the path length of the discharge AD at the time tc is shorter than that at the same time tc in the first example. The discharge voltage Vig in the second example is consequently smaller compared with that in the first example.

As described above, the path length of the inductive discharge is considered to change depending on the flux of the air-fuel mixture while the discharge continues. Consequently, not only the "electric resistivity of the air-fuel mixture" but also the "flux of the air-fuel mixture" is considered to affect the discharge voltage Vig from the time ta to the time t2 (which corresponds to the second period described above). In other words, the second period corresponds to the period in which the discharge voltage Vig changes depending on the electric resistivity of the air-fuel mixture (which resistivity corresponds to an amount of fuel included in the mixture, for instance) and the degree of the flux of gas near the discharge (which degree corresponds to a speed of flow of the gas, for instance), or the period in which the spark plug 41 generates the inductive discharge.

In addition, the series of discharges including both of the capacitive discharge and the inductive discharge may be referred to as "discharge", or either one of the capacitive discharge and the inductive discharge may be referred to as "discharge", in the present invention.

<Overview of Operation of Device>

Figure 5:
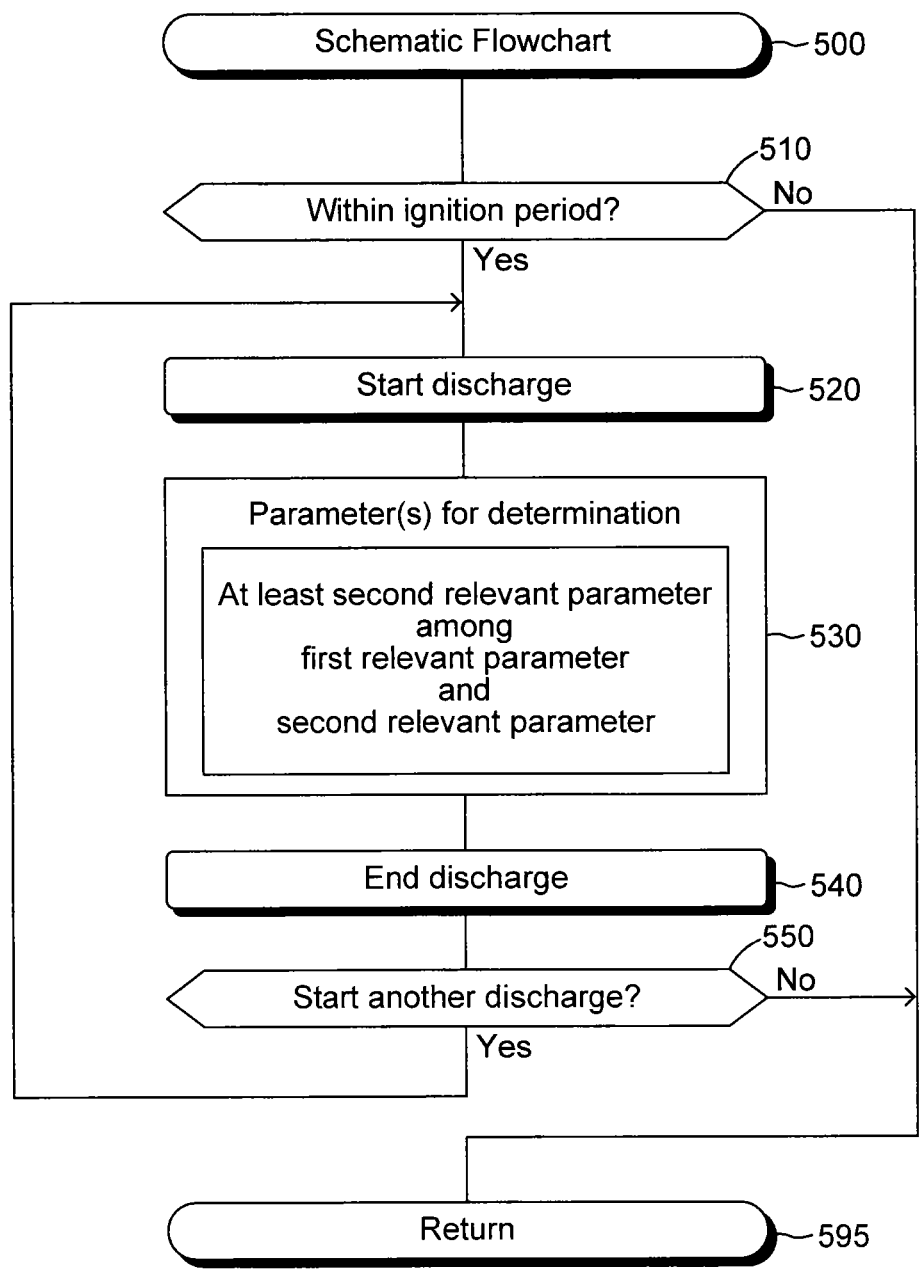
FIG. 5 is a schematic flowchart illustrating the way of the control executed by the ignition control device according to the first embodiment of the invention.

The following is the overview of an operation of the first device applied to the engine 10 referring to FIG. 5. FIG. 5 is a "schematic flowchart" illustrating the overview of an operation of the first device.

The first device determines, when a certain discharge is generated with the spark plug 41, "whether or not another discharge following the certain discharge should be started within the ignition period" based on at least the second parameter relevant to discharge voltage among the first parameter relevant to discharge voltage and the second parameter relevant to discharge voltage. After that, the first device allows the another discharge when determining that "the another discharge following the certain discharge should be started within the ignition period."

In particular, at step 510 in FIG. 5, the first device determines whether or not the present time is within an ignition period. When the present time is within the ignition period, the first device determines as "Yes" at step 510 and then proceeds to step 520 to start a certain discharge with the spark plug 41. This discharge is kept within a period from the start of the discharge to the end thereof at step 540.

Next, at step 530, the first device uses "at least the second parameter relevant to discharge voltage among the first parameter relevant to discharge voltage and the second parameter relevant to discharge voltage" as a parameter for the above determination. When the first device determines that "the another discharge following the certain discharge should be started within the ignition period" on the above determination based on the parameter, the first device determines as "Yes" at step 550 after the certain discharge is ended at step 540. After that, the first device proceeds to step 520 to start another discharge.

On the other hand, when the first device does not determine that "the another discharge following the certain discharge should be started within the ignition period", the first device determines as "No" at step 550. The certain discharge within the ignition period is then ended. In addition, when the present time is not within the ignition period, the first device determines as "No" at step 510 and then does not start the certain discharge.

The determination whether or not "another discharge following a certain discharge should be started within an ignition period" is hereinafter referred to as "determination on re-discharge." Furthermore, the "another discharge" is referred to as "re-discharge."

As described above, the first device performs the determination on re-discharge based on at least the second parameter among the first parameter and the second parameter, which parameters relevant to voltage for discharging. The first device can thereby measures the ignitability of the gas in the combustion chamber appropriately, and consequently can surely ignite the gas in the combustion chamber. Furthermore, the first device can prevent unnecessary discharges that do not contribute to the ignition of the gas in the combustion chamber, and consequently can reduce the negative effects of the unnecessarily discharges on the spark plug as far as possible.

The above is the descriptions regarding the first device. Several embodiments of the actual operation of the first device will be described below.

(Second Embodiment)

The following is an embodiment in which "the determination on re-discharge is made based on both of the first parameter and the second parameter" as one embodiment of the first device.

The control device according to this embodiment (hereinafter referred to as "second device") is applied to an engine that has the same configuration as that of the first device (see FIG. 1. Hereinafter referred to as "engine 10" for convenience).

<Method for Determination on Re-discharge>

The following is the method for determination on re-discharge regarding the second device.

The second device employs the "discharge voltage itself within the first period" as the first parameter relevant to discharge voltage and the "discharge voltage itself within the second period" as the second parameter relevant to discharge voltage. In addition, the engine 10 to which the second device is applied has "one" "spark plug 41" as the ignition means.

The determination on re-discharge is made based on the above parameters.

In particular, the second device determines that the ignitability of the air-fuel mixture is not sufficient and then allows the another discharge (re-discharge) in the case that the discharge voltage Vig at a predetermined time within the first period is larger than a threshold voltage Vigth1 (that is, the amount of fuel included in the air-fuel mixture is smaller than a predetermined amount, in other words, the air-fuel ratio of the air-fuel mixture is larger (i.e., more lean) than a predetermined value) and the discharge voltage Vig at a predetermined time within the second period is smaller than a threshold voltage Vigth2 (that is, the amount of the released energy is smaller than a predetermined amount). On the other hand, the second device does not allow the re-discharge in the case other than the above case.

The second device can set the air-fuel ratio of the air-fuel mixture (the target air-fuel ratio abyftgt) at a large ratio (a lean ratio) due to the re-discharge under the above condition as far as the accuracy of the determination on re-discharge can be ensured. The second device can thereby reduce the amount of the emissions and costs required for the catalyst to purify the exhaust gas.

The above is the method for determination on re-discharges regarding the second device.

<Actual Operation>

An actual operation of the second device will be described below.

Figure 6:
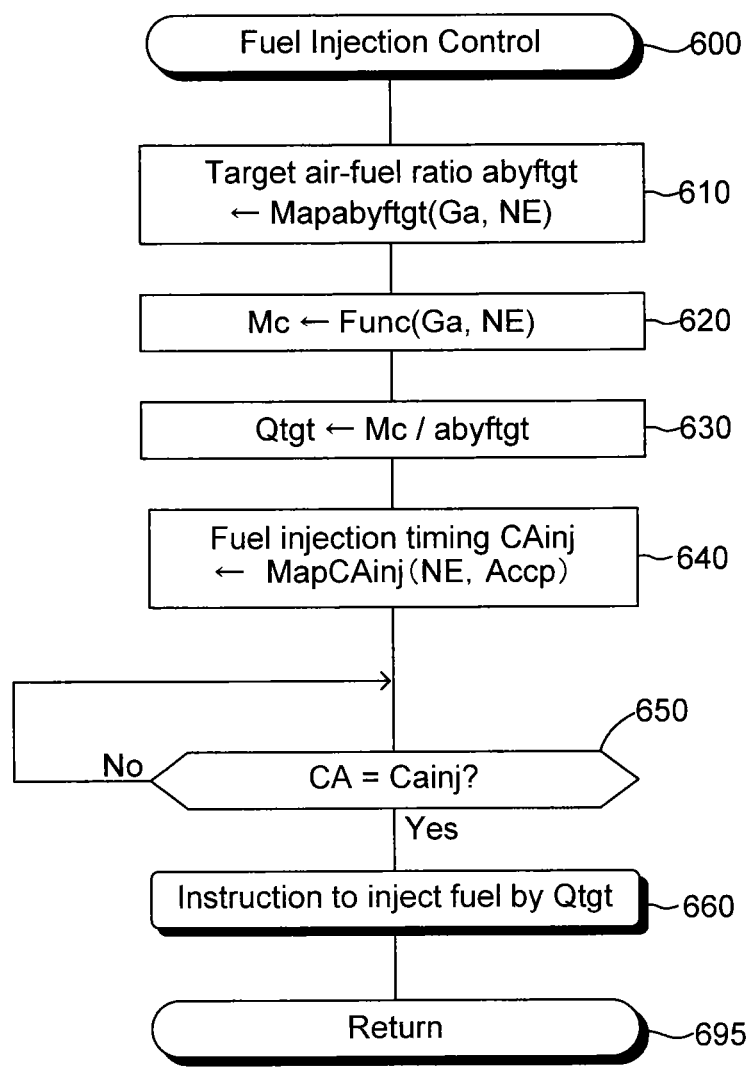
FIG. 6 is a flowchart illustrating a routine executed by a CPU of an ignition control device according to the second embodiment of the invention.
Figure 7:
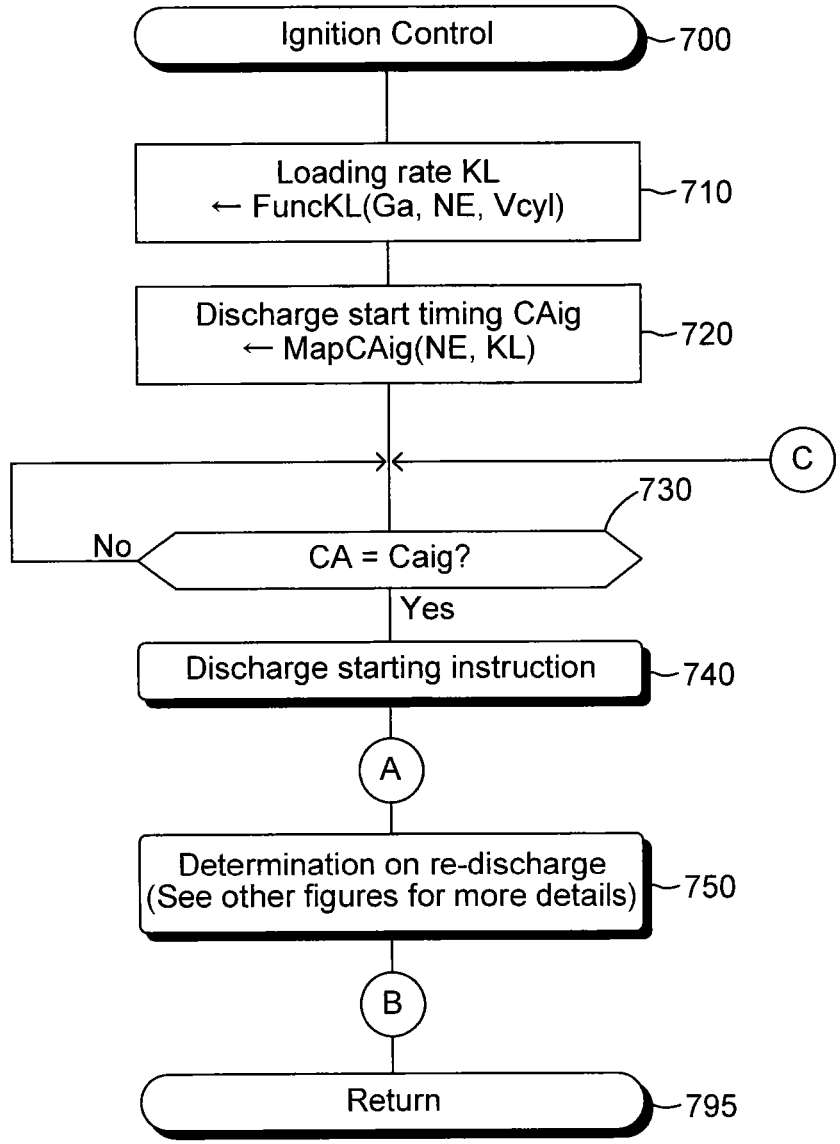
FIG. 7 is a flowchart illustrating a routine executed by a CPU of an ignition control device according to the second embodiment of the invention.
Figure 8:
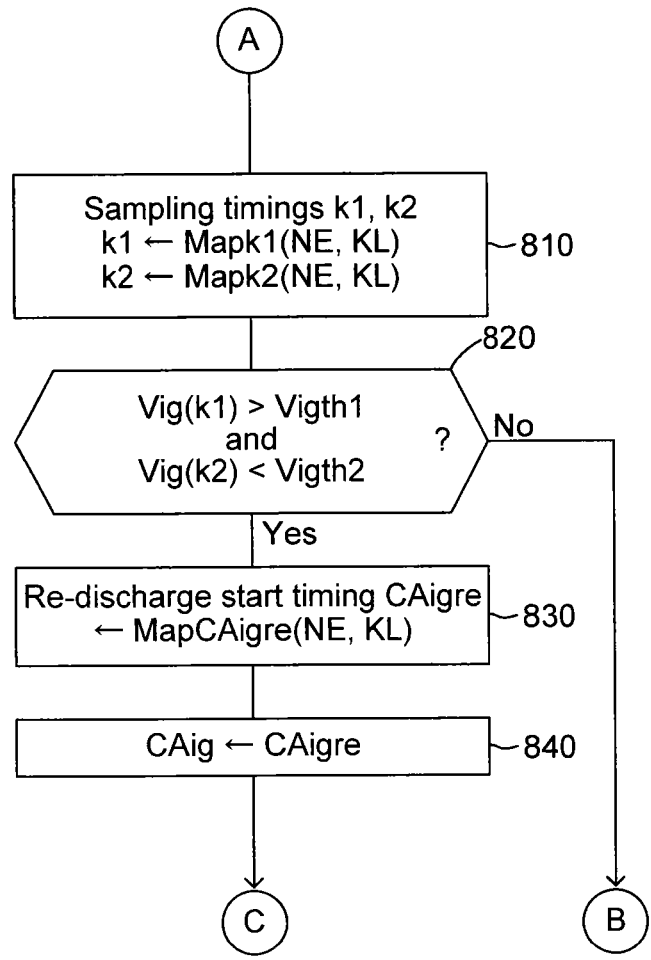
FIG. 8 is a flowchart illustrating a routine executed by a CPU of an ignition control device according to the second embodiment of the invention.

In the second device, the CPU 91 executes the respective routines in FIG. 6 for fuel injection control, FIG. 7 for ignition control, and FIG. 8 for determination on re-discharge at every predetermined time. Hereinafter, the respective routines performed in the CPU 91 will be described in detail.

The CPU 91 repeatedly executes the "fuel injection control routine", which is indicated by the flowchart in FIG. 6, every time the crank angle of arbitrary cylinder becomes equal to a predetermined crank angle of before the intake stroke (for example, the crank angle of 90 degrees before the exhaust top dead center). By this routine, the CPU 91 sets the target air-fuel ratio abyftgt, determines the target value Qtgt of the fuel injection amount, and sends an instruction to the injector 34 to inject fuel into the cylinder in the amount of the target value Qtgt. Hereinafter, the cylinder where the crank angle is equal to the predetermined crank angle θf before the intake stroke is referred to as "fuel injection cylinder".

In particular, the CPU 91 starts a process at step 600 in FIG. 6 and then proceeds to step 610 at a predetermined time. The CPU 91 determines the target air-fuel ratio abyftgt at step 610 by applying an intake air amount Ga and an engine rotational speed NE at this moment to a table Mapabyftgt(Ga, NE) for defining the target air-fuel ratio, which table defines "the relationship between the intake air amount Ga, the engine rotation speed NE, and the target air-fuel ratio abyftgt" in advance.

Regarding this table Mapabyftgt(Ga, NE) for defining the target air-fuel ratio, the target air-fuel ratio abyftgt is determined to be an appropriate value that is set depending on a required torque for the engine 10, the fuel consumption rate, the purification efficiency for exhaust gas on the catalyst 53, and etc.

Next, the CPU 91 proceeds to step 620. The CPU 91 determines the intake amount of air Mc into the cylinder at step 620 by applying an intake air amount Ga and an engine rotational speed NE at this moment to a function FuncMc(Ga, NE) for defining the intake amount of air, which function defines "the relationship between the intake air amount Ga, the engine rotation speed NE, and the intake amount of air Mc."

Next, the CPU 91 proceeds to step 630. The CPU 91 determines the target value Qtgt of the fuel injection amount at step 630 by deviding the intake air amount Ga by the target air-fuel ratio abyftgt.

Next, the CPU 91 proceeds to step 640. The CPU 91 determines the fuel injection timing CAinj at step 640 by applying an engine rotational speed NE and an acceleration pedal position Accp at this moment to a table MapCAinj(NE, Accp) for defining the fuel injection timing, which table defines "the relationship between the engine rotation speed NE, the acceleration pedal position Accp, and the fuel injection timing CAinj" in advance.

Regarding this table MapCAinj(NE, Accp) for defining the fuel injection timing, the fuel injection timing CAinj is determined to be an appropriate value that is set depending on the amount of various matters included in exhaust gas (the amount of emissions), and the output power of the engine 10, and etc.

Next, the CPU 91 proceeds to step 650 to determine whether or not the crank angle CA at this moment is equal to the fuel injection timing CAinj. When it is assumed that the present time is "before the crank angle CA reaches to the fuel injection timing CAinj", the CPU 91 determines as "No" at step 650. After that, the CPU 91 repeatedly executes the process of step 650 until the crank angle CA reaches to the fuel injection timing CAinj. As a result, the fuel injection is not done.

After that, when the crank angle CA reaches to the "fuel injection timing CAinj", the CPU 91 determines as "Yes" at step 650 to proceed to step 660. At step 660, the CPU 91 sends an instruction to the injector 34 corresponding to the fuel injection cylinder so as to inject fuel in the amount of the target value Qtgt. The fuel of the target value Qtgt is then injected. After that, the CPU 91 proceeds to step 695 to end this routine once.

Furthermore, the CPU 91 repeatedly executes the "ignition control routine", which is indicated by the flowchart in FIG. 7, every time the crank angle of arbitrary cylinder becomes equal to a predetermined crank angle θf before the intake stroke (for example, the crank angle of 45 degrees before the exhaust top dead center). By this routine, the CPU 91 determines the discharge start timing CAig, and sends an instruction (the discharge starting instruction) to the ignition control system 40 so as to start to generate a discharge with the spark plug 41 at the discharge start timing CAig.

In particular, the CPU 91 starts a process at step 700 in FIG. 7 and then proceeds to step 710 at a predetermined time. The CPU 91 determines the loading rate KL at step 710 by applying an intake air amount Ga and an engine rotational speed NE at this moment, and the maximum volume Vcyl of the fuel injection cylinder which volume is stored in the ROM 92 to a function FuncKL(Ga, NE, Vcyl) for defining the loading rate, which table defines "the relationship between the intake air amount Ga, the engine rotation speed NE, the maximum volume Vcyl, and the loading rate KL" in advance.

The loading rate KL is calculated as a value that represents the rate of the amount of the air-fuel mixture actually existed in the combustion chamber with respect to the maximum amount thereof enable to exist in the combustion chamber (the maximum volume Vcyl), which maximum amount can be calculated based on the intake air amount Ga and the engine rotational speed NE. On the other hand, the loading rate KL may be obtained one of the known air models that describe the behavior of air.

Next, the CPU 91 proceeds to step 720. The CPU 91 determines the discharge start timing CAig at step 720 by applying an engine rotational speed NE and the loading rate KL at this moment to a table MapCAig(Ga, KL) for defining the discharge start timing, which table defines "the relationship between the intake air amount Ga, the loading rate KL, and the discharge start timing CAig" in advance.

Regarding this table MapCAig(Ga, KL) for defining the discharge start timing, the discharge start timing CAig is determined to be an appropriate value that is set depending on the amount of emissions, and the output power of the engine 10, and etc. In other words, the discharge start timing CAig is set as a certain time within the appropriate period in view of igniting the air-fuel mixture to drive the engine 10 (which period corresponds to the ignition period).

Next, the CPU 91 proceeds to step 730 to determine whether or not the crank angle CA at this moment is equal to the discharge start timing CAig. When it is assumed that the present time is "before the crank angle CA reaches to the discharge start timing CAig", the CPU 91 determines as "No" at step 730. After that, the CPU 91 repeatedly executes the process of step 730 until the crank angle CA reaches to the discharge start timing CAig. As a result, the ignition is not done.

After that, when the crank angle CA reaches to "the discharge start timing CAig", the CPU 91 determines as "Yes" at step 730 to proceed to step 740. At step 740, the CPU 91 sends an instruction (the discharge starting instruction) to the ignition control system 40 so as to start to generate a discharge with the spark plug 41. The discharge is then generated in the air-fuel mixture in the fuel injection cylinder.

Next, the CPU 91 proceeds to step 750 through the connection mark A. The CPU 91 executes "the routine in FIG. 8" at step 750. By this routine, the CPU 91 determines whether or not the re-discharge (another discharge) is needed in consideration of the ignitability of the air-fuel mixture.

In particular, the CPU 91 starts a process at the connection mark A in FIG. 8 and then proceeds to step 810. The CPU 91 determines the sampling timings k1 and k2 at step 810, at which sampling timings the parameters used for measuring the ignitability of the air-fuel mixture (the discharge voltage) are obtained. The sampling timing k1 is within the first period, and the sampling timing k2 is within the second period.

In particular, the CPU 91 determines the sampling timing k1 by applying an engine rotational speed NE and the loading rate KL at this moment to a table Mapk1(NE, KL) for defining the sampling timing, which table defines "the relationship between the engine rotation speed NE, the loading rate KL, and the sampling timing k1" in advance. Furthermore, the CPU 91 determines the sampling timing k2 by applying an engine rotational speed NE and the loading rate KL at this moment to a table Mapk2(NE, KL) for defining the sampling timing, which table defines "the relationship between the engine rotation speed NE, the loading rate KL, and the sampling timing k2" in advance.

Regarding this table Mapk1(NE, KL) and Mapk2(NE, KL) for defining the sampling timing, the sampling timings k1 and k2 are determined to be an appropriate value in view of measuring the ignitability of the air-fuel mixture. The sampling timings k1 and k2 are defined as the elapsed time with reference to the time at which the discharge starting instruction is sent.

Next, the CPU 91 proceeds to step 820. The CPU 91 determines at step 820 whether or not the re-discharge is needed based on the discharge voltages at the sampling timing k1 and the sampling timing k2.

In particular, the CPU 91 obtains the discharge voltage when an elapsed time from the time of the discharge starting instruction becomes the sampling timing k1, and then stores the discharge voltage in the RAM 93 as Vig(k1). Furthermore, the CPU 91 obtains the discharge voltage when an elapsed time from the time of the discharge starting instruction becomes the sampling timing k2, and then stores the discharge voltage in the RAM 93 as Vig(k2). The CPU 91 determines whether or not the discharge voltage Vig(k1) and the discharge voltage Vig(k2) satisfy both the following conditions (a) and (b). In the following conditions (a) and (b), Vigth1 and Vigth2 each represent predetermined threshold values.

$$Vig(k1) > Vigth1 \quad (a)$$

$$Vig(k2) < Vigth2 \quad (b)$$

Regarding the conditions (a) and (b), the threshold voltage Vigth1 is set to be an appropriate value so that it is determined that "when the discharge voltage Vig is larger than the threshold voltage Vigth1, the air-fuel ratio of the air-fuel mixture is lean (that is, the minimum ignition energy of the air-fuel mixture is large), and consequently the discharge voltage within the second period is preferably considered in order to appropriately measure the ignitability of the air-fuel mixture." Furthermore, the threshold voltage Vigth2 is set to be an appropriate value so that it is determined that "when the discharge voltage Vig is smaller than the threshold voltage Vigth2, the released energy from the discharge is not equal to or larger than the minimum ignition energy of the air-fuel mixture." When the both of the conditions (a) and (b) are satisfied, it is determined that the ignitability of the air-fuel mixture is not sufficient. In other words, it is determined that the re-discharge is needed.

When the both of the conditions (a) and (b) are satisfied at this moment, the CPU 91 determines as "Yes" at step 820 to proceed to step 830. The CPU 91 determines the re-discharge start timing CAigre at step 830 by applying an engine rotational speed NE and the loading rate KL at this moment to a table MapCAigre(Ga, KL) for defining the re-discharge start timing, which table defines "the relationship between the intake air amount Ga, the loading rate KL, and the re-discharge start timing CAigre" in advance.

Regarding this table MapCAigre(Ga, KL) for defining the re-discharge start timing, the re-discharge start timing CAigre is determined to be an appropriate value that is set depending on the combustion timing of the air-fuel mixture, the amount of emissions and the output power of the engine 10, and etc. In other words, the re-discharge start timing CAigre is set as a certain time within the appropriate period in view of igniting the air-fuel mixture to drive the engine 10 (which period corresponds to the ignition period), as same as the discharge start timing CAig.

Next, the CPU 91 proceeds to step 840. The CPU 91 stores the re-discharge start timing CAigre into the discharge start timing CAig at step 840. After that, the CPU 91 returns to the routine in FIG. 7 through the connection mark C.

When returning to the routine in FIG. 7, the CPU 91 repeatedly executes the process of step 730 until the crank angle CA reaches to the discharge start timing CAig (actually, the re-discharge start timing CAigre) as same as the above. After that, when the crank angle CA reaches to the discharge start timing CAig (the re-discharge start timing CAigre), the CPU 91 proceeds to step 740 to send the discharge starting instruction to the ignition control system 40. The re-discharge (another discharge) is then generated in the air-fuel mixture in the fuel injection cylinder.

After that, the CPU 91 proceeds to the routine in FIG. 8 through the connection mark A to determine whether or not the re-discharge is needed. That is, the CPU 91 proceeds to step 820 through step 810 to determine whether or not the both of the conditions (a) and (b) are satisfied. When at least one of the conditions (a) and (b) is not satisfied at this moment (in other words, when the re-discharge is not needed), the CPU 91 determines as "No" at step 820 to return to the routine in FIG. 7 through the connection mark B. When returning to the routine in FIG. 7, the CPU 91 proceeds to step 795 to end this routine once. In this case, the re-discharge is not generated.

As above, the CPU 91 controls the ignition so that the re-discharges are repeatedly generated until being determined that the re-discharge is not needed, when a discharge is started at a certain time within the ignition period by executing the routine in FIG. 7 on a certain cycle. The CPU 91 waits until the routine in FIG. 7 is executed again on the next cycle without starting new discharge when being determined that the re-discharge is not needed. That is, the CPU 91 controls the ignition so as to generate discharge(s) once or multiple times as necessary within a predetermined ignition period.

As described above, the second device measures the ignitability of the air-fuel mixture based on the both of the first parameter relevant to discharge voltage (the discharge voltage Vig(k1)) and the second parameter relevant to discharge voltage (the discharge voltage Vig(k2)) when the discharge is started at a predetermined timing.

The above is the descriptions regarding the second device.

(Third Embodiment)

Next, the following is an embodiment in which "the determination on re-discharge is made based on only the second parameter" as other embodiment of the first device.

The control device according to this embodiment (hereinafter referred to as "third device") is applied to an engine that has the same configuration as that of the first device (see FIG. 1. Hereinafter referred to as "engine 10" for convenience).

<Method for Determination on Re-discharge>

The third device employs "the discharge voltage itself within the second period" as the second parameter relevant to discharge voltage, as same as the second device.

The determination on re-discharge is made based on the above parameter. In this regard, however, the determination on re-discharge is made only based on the second parameter unlike with the second device.

In particular, the third device determines that the ignitability of the air-fuel mixture is not sufficient and then allows the re-discharge in the case that the discharge voltage Vig at a predetermined time within the second period is smaller than a threshold voltage Vigth2. On the other hand, the third device does not allow the re-discharge in the case other than the above case.

The above is the method for determination on re-discharges regarding the third device.

<Actual Operation>

An actual operation of the third device will be described below.

Figure 9:
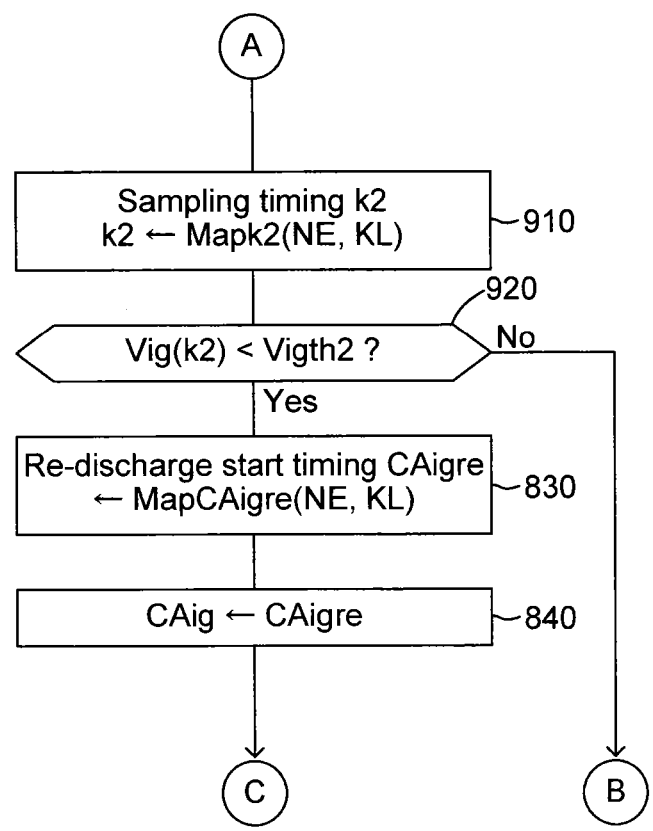
FIG. 9 is a flowchart illustrating a routine executed by a CPU of an ignition control device according to the third embodiment of the invention.

In the third device, the CPU 91 executes the respective routines in FIG. 6 for fuel injection control, FIG. 7 for ignition control, and FIG. 9 for determination on re-discharge at every predetermined time.

The third device is different from the second device only in that the CPU 91 executes the flowchart in "FIG. 9" in place of that in FIG. 8. The following descriptions will be mainly concerned this difference.

The CPU 91 repeatedly executes the routine in FIG. 6 every predetermined time to determine the target value Qtgt of the fuel injection amount, and to inject fuel into the cylinder in the amount of the target value Qtgt, as same as the second device. Furthermore, the CPU 91 repeatedly executes the routine in FIG. 7 every predetermined time to determine the discharge start timing CAig, and to start to generate a discharge at the discharge start timing CAig, as same as the second device.

In particular, when starting to generate a discharge (step 740) in FIG. 7, the CPU 91 proceeds to step 750 through the connection mark A to execute "the routine in FIG. 9". By this routine in FIG. 9, the CPU 91 determines whether or not the re-discharge is needed in consideration of the ignitability of the air-fuel mixture.

The routine in FIG. 9 is different from that in FIG. 8 only in that step 810 is replaced with step 910 and step 820 is replaced with step 920. The other steps in FIG. 9 for executing the same processing as those steps in FIG. 8 are attached with the same step-numbers as those steps in FIG. 8. Detailed description is omitted regarding these steps.

In particular, the CPU 91 starts a process at the connection mark A in FIG. 9 and then proceeds to step 910 to determine the sampling timing k2 by applying an engine rotational speed NE and the loading rate KL at this moment to the table Mapk2(Ga, KL) for defining the sampling timing, which table is the same table in step 810. Next, the CPU 91 proceeds to step 920 to determine whether or not the discharge voltage Vig(k2) satisfies the same condition (b) as in step 820. As above, the CPU 91 determines whether or not the re-discharge is needed only based on the discharge voltage within the second period.

When the condition (b) is satisfied at this moment, the CPU 91 determines as "Yes" at step 920. After that, the CPU 91 returns to the routine in FIG. 7 through step 830, step 840 and the connection mark C to start the re-discharge at the discharge start timing CAig (see step 730 and step 740).

On the other hand, when the condition (b) is not satisfied at this moment, the CPU 91 determines as "No" at step 920. After that, the CPU 91 returns to the routine in FIG. 7 through the connection mark B to end this routine once (see step 795).

As described above, the third device measures the ignitability of the air-fuel mixture based on the second parameter relevant to discharge voltage (the discharge voltage Vig(k2)) when the discharge is started at a predetermined timing.

The above is the descriptions regarding the third device.

(Fourth Embodiment)

Next, the ignition control device according to the fourth embodiment (hereinafter referred to as "fourth device") will be described.

The fourth device is different from the second device or the third device only in that "the amount of fuel in the air-fuel mixture" is employed as the first parameter relevant to discharge voltage and "the flow rate of the air-fuel mixture near the discharge" is employed as the second parameter relevant to discharge voltage.

<Method for Determination on Re-discharge>

The fourth device employs "the amount of fuel in the air-fuel mixture" as the first parameter and "the flow rate of the air-fuel mixture near the discharge" as the second parameter. "The amount of fuel in the air-fuel mixture" is obtained based on the discharge voltage within the first period, and "the flow rate of the air-fuel mixture near the discharge" is obtained based on the discharge voltage within the second period.

The amount of fuel in the air-fuel mixture is hereinafter referred to as "concentration of the air-fuel mixture", and the flow rate of the air-fuel mixture near the discharge is hereinafter referred to as "flow rate of the air-fuel mixture."

The determination on re-discharge is made based on the above parameters. The following is an example in which the method for determination on re-discharge of the fourth device is applied to "the second device" for convenience (in which device the determination on re-discharge is made based on the both of the first parameter and the second parameter).

In particular, the fourth device obtains the concentration Cg of the air-fuel mixture based on the discharge voltage Vig at a predetermined time within the first period, and the flow rate FRg of the air-fuel mixture at a predetermined time within the second period. The CPU 91 determines that the ignitability of the air-fuel mixture is not sufficient and then allows the another discharge (re-discharge) in the case that the concentration Cg of the air-fuel mixture is smaller than a predetermined threshold concentration Cgth and the flow rate FRg of the air-fuel mixture is smaller than a predetermined threshold flow rate FRgth. On the other hand, the fourth device does not allow the re-discharge in the case other than the above case.

The above is the method for determination on re-discharges regarding the fourth device.

<Actual Operation>

An actual operation of the fourth device will be described below.

Figure 10:
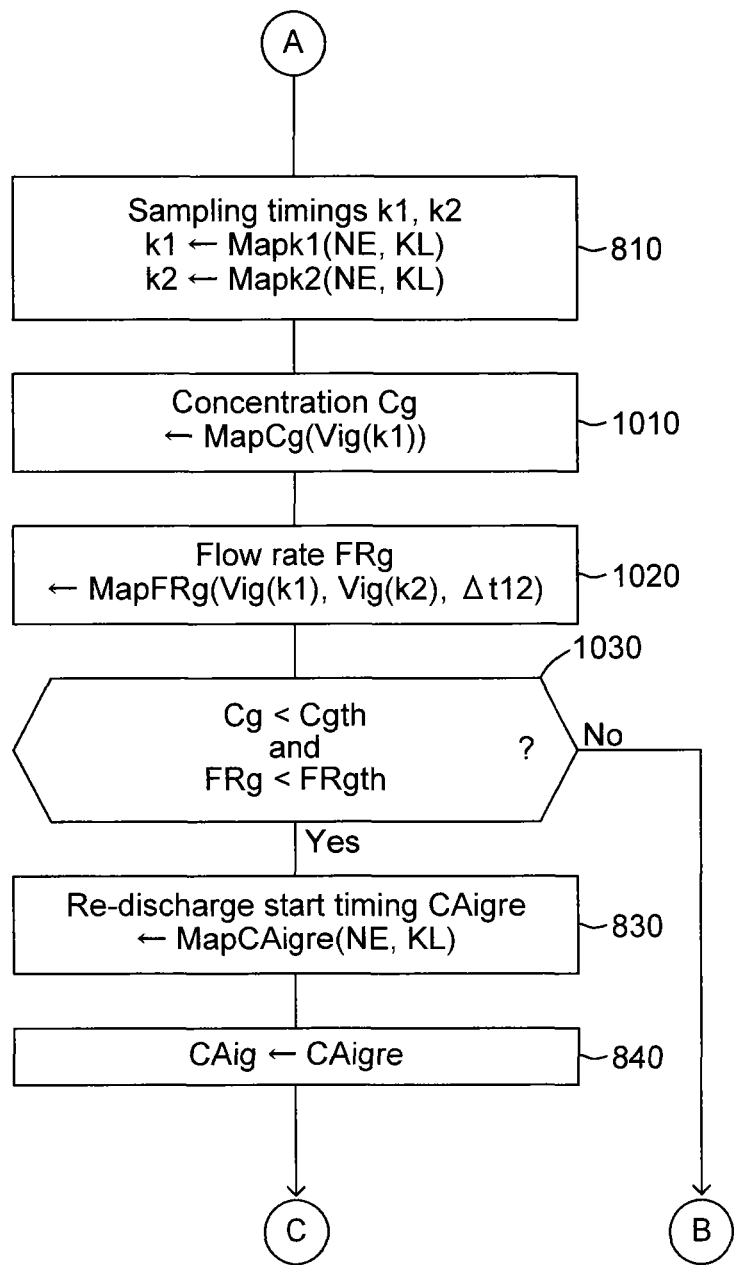
FIG. 10 is a flowchart illustrating a routine executed by a CPU of an ignition control device according to the fourth embodiment of the invention.

In the fourth device, the CPU 91 executes the respective routines in FIG. 6 for fuel injection control, FIG. 7 for ignition control, and FIG. 10 for determination on re-discharge at every predetermined time.

The fourth device is different from the second device only in that the CPU 91 executes the flowchart in "FIG. 10" in place of that in FIG. 8. The following descriptions will be mainly concerned this difference.

The CPU 91 repeatedly executes the routine in FIG. 6 every predetermined time to determine the target value Qtgt of the fuel injection amount, and to inject fuel into the cylinder in the amount of the target value Qtgt, as same as the second device. Furthermore, the CPU 91 repeatedly executes the routine in FIG. 7 every predetermined time to determine the discharge start timing CAig, and to start to generate a discharge at the discharge start timing CAig, as same as the second device.

In particular, when starting to generate a discharge (step 740) in FIG. 7, the CPU 91 proceeds to step 750 through the connection mark A to execute "the routine in FIG. 10". By this routine in FIG. 10, the CPU 91 determines whether or not the re-discharge is needed in consideration of the ignitability of the air-fuel mixture.

The routine in FIG. 10 is different from that in FIG. 8 only in that step 1010 and step 1020 are added, and step 820 is replaced with step 1030. The other steps in FIG. 10 for executing the same processing as those steps in FIG. 8 are attached with the same step-numbers as those steps in FIG. 8. Detailed description is omitted regarding these steps.

In particular, the CPU 91 starts a process at the connection mark A in FIG. 10 and then proceeds to step 810 to determine the sampling timings k2 and k2. Next, the CPU 91 proceeds to step 1010. The CPU 91 determines (estimates) the concentration Cg near the discharge at step 1010 by applying the discharge voltage Vig(k1) to the table MapCg(Vig(k1)) for defining the concentration of the air-fuel mixture, which table defines "the relationship between the discharge voltage Vig (k1) at the sampling timing k1 and the concentration Cg in advance.

Regarding this table MapCg(Vig(k1)) for defining the concentration of the air-fuel mixture, the concentration Cg of the air-fuel mixture is set to be decreased with increasing discharge voltage Vig(k1). This is because it is generally thought that the electric resistivity of the air-fuel mixture increases with decreasing amount of fuel in the air-fuel mixture.

Next, the CPU 91 proceeds to step 1020. The CPU 91 determines (estimates) the flow rate FRg near the discharge at step 1020 by applying the discharge voltage Vig(k1) as Vig1, the discharge voltage Vig(k2) as Vig2 and the duration Δt12 between the sampling timing k1 and the sampling timing k2 to the table MapFRg(Vig1, Vig2, Δt12) for defining the flow rate of the air-fuel mixture, which table defines "the relationship between the discharge voltages Vig1 and Vig2 at two separate timings, the duration Δt between these timings, and the flow rate FRg in advance.

Regarding this table MapFRg(Vig1, Vig2, Δt) for defining the flow rate of the air-fuel mixture, the flow rate FRg of the air-fuel mixture is set to be increased with increasing value of "the difference between the discharge voltage Vig2 and the discharge voltage Vig1 (Vig(k2)−Vig(k1))" with respect to "the duration Δt between these timings (from the sampling timing k1 to the sampling timing k2)." This is because it is generally thought that the degree of deformation of the discharge in the duration Δt12 increases (that is, the path length of the discharge increases) and then the difference in discharge voltage between the two timings increases, with increasing flow rate FRg of the air-fuel mixture.

Next, the CPU 91 proceeds to step 1030. The CPU 91 determines at step 1030 whether or not the re-discharge is needed based on the concentration Cg and the flow rate FRg of the air-fuel mixture. In particular, the CPU 91 determines whether or not the concentration Cg and the flow rate FRg of the air-fuel mixture satisfy both of the following conditions (c) and (d). In the following conditions (c) and (d), Cgth and FRgth each represent predetermined threshold values.

$$Cg < Cgth \quad (c)$$

$$FRg < FRgth \quad (d)$$

Regarding the conditions (c) and (d), the threshold concentration Cgth is set to be an appropriate value so that it is determined that "when the concentration Cg of the air-fuel mixture is smaller than the threshold concentration Cgth, the air-fuel ratio of the air-fuel mixture is lean (that is, the minimum ignition energy of the air-fuel mixture is large), and consequently the flow rate FRg of the air-fuel mixture is preferably considered in order to appropriately measure the ignitability of the air-fuel mixture." Furthermore, the threshold flow rate FRgth is set to be an appropriate value so that it is determined that "when the flow rate FRg of the air-fuel mixture is smaller than the threshold flow rate FRgth, the released energy from the discharge is not equal to or larger than the minimum ignition energy of the air-fuel mixture." When the both of the conditions (c) and (d) are satisfied, it is determined that the ignitability of the air-fuel mixture is not sufficient. In other words, it is determined that the re-discharge is needed.

When the both of the conditions (c) and (d) are satisfied at this moment, the CPU 91 determines as "Yes" at step 1030. After that, the CPU 91 returns to the routine in FIG. 7 through step 830, step 840 and the connection mark C to start the re-discharge at the discharge start timing CAig (see step 730 and step 740).

On the other hand, when at least one of the conditions (c) and (d) is not satisfied at this moment, the CPU 91 determines as "No" at step 1030 in FIG. 10. After that, the CPU 91 returns to the routine in FIG. 7 through the connection mark B to end this routine once (see step 795).

As described above, the fourth device obtains the first parameter (the concentration Cg of the air-fuel mixture) and the second parameter (the flow rate FRg of the air-fuel mixture) based on the discharge voltage when the discharge is started at a predetermined timing. The fourth device then measures the ignitability of the air-fuel mixture based on the both of the first parameter (the concentration Cg) and the second parameter (the flow rate FRg).

The above is the descriptions regarding the fourth device.

(Fifth Embodiment)

Next, the ignition control device according to the fifth embodiment (hereinafter referred to as "fifth device") will be described.

The fifth device is different from the second device or the third device only in that "the amount of fuel in the air-fuel mixture" is employed as the first parameter relevant to discharge voltage and "the flow rate of the air-fuel mixture near the discharge" is employed as the second parameter relevant to discharge voltage. Furthermore, the fifth device is different from the fourth device in that the amount of fuel in the air-fuel mixture is "independently obtained from the discharge voltage", and the flow rate of the air-fuel mixture is "independently obtained from the discharge voltage."

<Method for Determination on Re-discharge>

The fifth device employs "the amount of fuel in the air-fuel mixture" as the first parameter and "the flow rate of the air-fuel mixture near the discharge" as the second parameter. "The amount of fuel in the air-fuel mixture" and "the flow rate of the air-fuel mixture near the discharge" are obtained based on the operating condition of the engine 10.

The determination on re-discharge is made based on the above parameters. The following is an example in which the method for determination on re-discharge of the fifth device is applied to "the second device" for convenience (in which device the determination on re-discharge is made based on the both of the first parameter and the second parameter).

In particular, the fifth device obtains the concentration Cg of the air-fuel mixture and the flow rate FRg of the air-fuel mixture based on the operating condition of the engine 10. The CPU 91 determines that the ignitability of the air-fuel mixture is not sufficient and then allows the another discharge (re-discharge) in the case that the concentration Cg is smaller than a predetermined threshold concentration Cgth and the flow rate FRg is smaller than a predetermined threshold flow rate FRgth. On the other hand, the fifth device does not allow the re-discharge in the case other than the above case.

The above is the method for determination on re-discharges regarding the fifth device.

<Actual Operation>

An actual operation of the fifth device will be described below.

Figure 11:
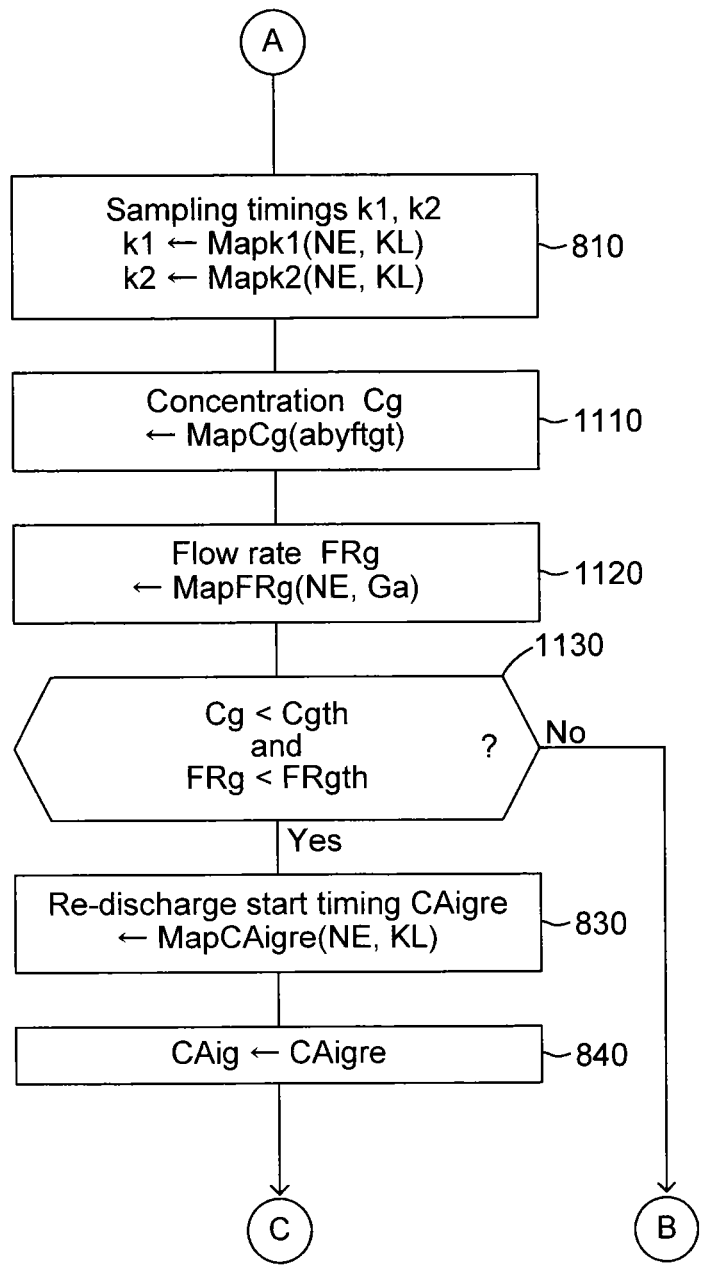
FIG. 11 is a flowchart illustrating a routine executed by a CPU of an ignition control device according to the fifth embodiment of the invention.

In the fifth device, the CPU 91 executes the respective routines in FIG. 6 for fuel injection control, FIG. 7 for ignition control, and FIG. 11 for determination on re-discharge at every predetermined time.

The fifth device is different from the second device only in that the CPU 91 executes the flowchart in "FIG. 11" in place of that in FIG. 8. The following descriptions will be mainly concerned this difference.

The CPU 91 repeatedly executes the routine in FIG. 6 every predetermined time to determine the target value Qtgt of the fuel injection amount, and to inject fuel into the cylinder in the amount of the target value Qtgt, as same as the second device. Furthermore, the CPU 91 repeatedly executes the routine in FIG. 7 every predetermined time to determine the discharge start timing CAig, and to start to generate a discharge at the discharge start timing CAig, as same as the second device.

When starting to generate a discharge (step 740) in FIG. 7, the CPU 91 proceeds to step 750 through the connection mark A to execute "the routine in FIG. 11". By this routine in FIG. 11, the CPU 91 determines whether or not the re-discharge is needed in consideration of the ignitability of the air-fuel mixture.

The routine in FIG. 11 is different from that in FIG. 8 only in that step 1110 and step 1120 are added, and step 820 is replaced with step 1130. The other steps in FIG. 11 for executing the same processing as those steps in FIG. 8 are attached with the same step-numbers as those steps in FIG. 8. Detailed description is omitted regarding these steps.

The CPU 91 starts a process at the connection mark A in FIG. 11 and then proceeds to step 810 to determine the sampling timings k2 and k2. Next, the CPU 91 proceeds to step 1110. The CPU 91 determines (estimates) the concentration Cg near the discharge at step 1110 by applying the target air-fuel ratio abyftgt to the table MapCg(abyftgt) for defining the concentration of the air-fuel mixture, which table defines "the relationship between the target air-fuel ratio abyftgt and the concentration Cg in advance.

Regarding this table MapCg(abyftgt) for defining the concentration of the air-fuel mixture, the concentration Cg of the air-fuel mixture is set to be decreased with increasing target air-fuel ratio abyftgt. This is because it is generally thought that the amount of fuel included in the air-fuel mixture decreases with increasing amount of target air-fuel ratio abyftgt.

Next, the CPU 91 proceeds to step 1120. The CPU 91 determines (estimates) the flow rate FRg near the discharge at step 1120 by applying the engine rotation speed NE and the intake air amount Ga at this moment to the table MapFRg (NE, Ga) for defining the flow rate of the air-fuel mixture, which table defines "the relationship between the engine rotation speed NE, the intake air amount Ga, and the flow rate FRg in advance.

Regarding this table MapFRg(NE, Ga) for defining the flow rate of the air-fuel mixture, the flow rate FRg of the air-fuel mixture is set to be increased with increasing engine rotation speed NE and to be increased with increasing intake air amount Ga This is because it is generally thought that the degree of flux of the air-fuel mixture in the combustion chamber 25 increases and then the flow rate FRg of the air-fuel mixture increases, with increasing engine rotation speed NE and intake air amount Ga.

Next, the CPU 91 proceeds to step 1130. The CPU 91 determines whether or not the concentration Cg and the flow rate FRg of the air-fuel mixture satisfy both of the same conditions (c) and (d) as the fourth device.

When the both of the conditions (c) and (d) are satisfied at this moment, the CPU 91 determines as "Yes" at step 1130. After that, the CPU 91 returns to the routine in FIG. 7 through step 830, step 840 and the connection mark C to start the re-discharge at the discharge start timing CAig (see step 730 and step 740).

On the other hand, when at least one of the conditions (c) and (d) is not satisfied at this moment, the CPU 91 determines as "No" at step 1130 in FIG. 11. After that, the CPU 91 returns to the routine in FIG. 7 through the connection mark B to end this routine once (see step 795).

As described above, the fifth device obtains the first parameter (the concentration Cg of the air-fuel mixture) and the second parameter (the flow rate FRg of the air-fuel mixture) based on the operating condition of the engine 10 (the target air-fuel ratio abyftgt, the engine rotation speed NE and the intake air amount Ga). The fifth device then measures the ignitability of the air-fuel mixture based on the both of the first parameter (the concentration Cg) and the second parameter (the flow rate FRg).

The above is the descriptions regarding the fifth device.

(Sixth Embodiment)

Next, the ignition control device according to the sixth embodiment (hereinafter referred to as "sixth device") will be described.

The sixth device is different from the second device or the third device only in that "a discharge voltage at a time before the time at which the absolute value of the discharge voltage is the maximum value within the first period" is employed as the first parameter relevant to discharge voltage and "a discharge voltage at a time before the time at which the absolute value of the discharge voltage is the maximum value within the second period" is employed as the second parameter relevant to discharge voltage.

<Method for Determination on Re-Discharge>

The sixth device employs "a discharge voltage at a time before the time at which the absolute value of the discharge voltage is the maximum value within the first period" as the first parameter and "a discharge voltage at a time before the time at which the absolute value of the discharge voltage is the maximum value within the second period" as the second parameter.

The determination on re-discharge is made based on the above parameters. The following is an example in which the method for determination on re-discharge of the sixth device is applied to "the second device" for convenience (in which device the determination on re-discharge is made based on the both of the first parameter and the second parameter).

In particular, the sixth device determines that the ignitability of the air-fuel mixture is not sufficient and then allows the another discharge (re-discharge) in the case that the discharge voltage Vig at a time before the time at which the absolute value of the discharge voltage is the maximum value within the first period is larger than a predetermined threshold voltage Vigth1m and the discharge voltage Vig at a time before the time at which the absolute value of the discharge voltage is the maximum value within the second period is smaller than a predetermined threshold voltage Vigth2m. On the other hand, the sixth device does not allow the re-discharge in the case other than the above case.

The above is the method for determination on re-discharge regarding the sixth device.

<Actual Operation>

An actual operation of the sixth device will be described below.

Figure 12:
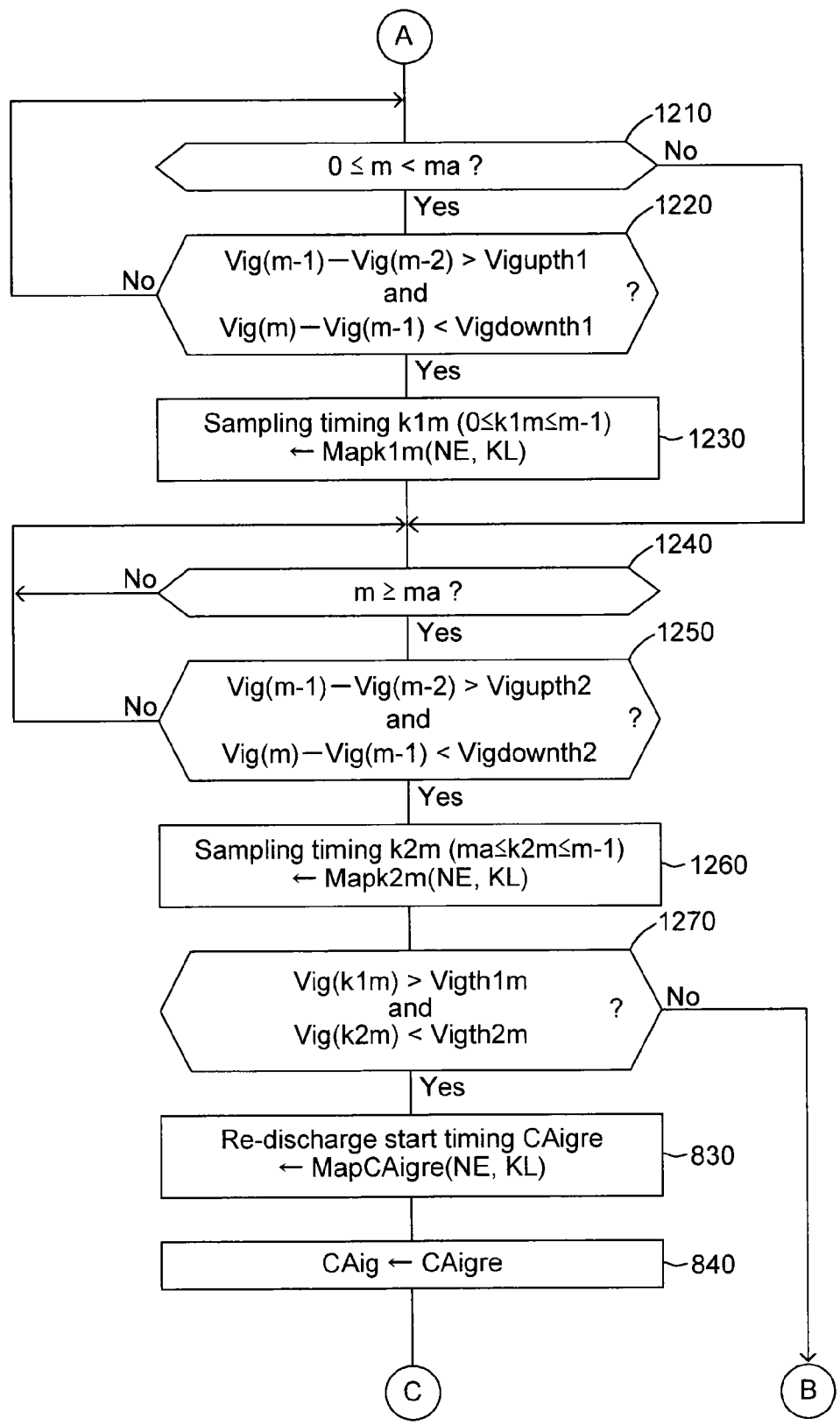
FIG. 12 is a flowchart illustrating a routine executed by a CPU of an ignition control device according to the sixth embodiment of the invention.

In the sixth device, the CPU 91 executes the respective routines in FIG. 6 for fuel injection control, FIG. 7 for ignition control, and FIG. 12 for determination on re-discharge at every predetermined time.

The sixth device is different from the second device only in that the CPU 91 executes the flowchart in "FIG. 12" in place of that in FIG. 8. The following descriptions will be mainly concerned this difference.

The CPU 91 repeatedly executes the routine in FIG. 6 every predetermined time to determine the target value Qtgt of the fuel injection amount, and to inject fuel into the cylinder in the amount of the target value Qtgt, as same as the second device. Furthermore, the CPU 91 repeatedly executes the routine in FIG. 7 every predetermined time to determine the discharge start timing CAig, and to start to generate a discharge at the discharge start timing CAig, as same as the second device.

When starting to generate a discharge (step 740) in FIG. 7, the CPU 91 proceeds to step 750 through the connection mark A to execute "the routine in FIG. 12". By this routine in FIG. 12, the CPU 91 determines whether or not the re-discharge is needed in consideration of the ignitability of the air-fuel mixture.

The routine in FIG. 12 is different from that in FIG. 8 only in that step 1210 to step 1270 are added. The other steps in FIG. 12 for executing the same processing as those steps in FIG. 8 are attached with the same step-numbers as those steps in FIG. 8. Detailed description is omitted regarding these steps.

The CPU 91 starts a process at the connection mark A in FIG. 12 and then proceeds to step 1210. The CPU 91 determines at step 1210 whether or not the present time (the time m) is at or after the time (zero) at which the discharge is started and before a predetermined time (the time ma). The time ma is the time that corresponds to the boundary of the first period and the second period. The CPU 91 hence determines at step 1210 whether or not the present time is within the first period.

When the present time (the time m) is "at or after the time at which the discharge is started and before the above predetermined time ($0 \leq m < ma$)", the CPU 91 determines as "Yes" at step 1210 to proceeds to step 1220. The CPU 91 obtains the time (the time m−1) at which the discharge voltage Vig becomes the maximum value within the first period.

In particular, the CPU 91 continuously stores the discharge voltage Vig associating with time t in the RAM 93 (for example, Vig (0), Vig (1), . . . , Vig (m−2), Vig (m−1), Vig (m), . . . is associated with time t=0, 1, . . . , m−2, m−1, m, . . . ) from the time (zero) at which the discharge starting instruction (step 740) is sent to the ignition control system 40 to the present time (the time m). The CPU 91 then determines whether or not the discharge voltages Vig(m), Vig(m−1) and Vig(m−2) at the present time (the time m) and the points (the time m−1 and the time m−2) right before the present time satisfy both of the following conditions (e) and (f). In the following conditions (e) and (f), Vigupth1 represents the threshold value (positive value) when the discharge voltage rises, and Vigdownth1 represents the threshold value (negative value) when the discharge voltage drops.

$$Vig(m-1)-Vig(m-2)>Vigupth1 \quad (e)$$

$$Vig(m)-Vig(m-1)<Vigdownth1 \quad (f)$$

Regarding the conditions (e) and (f), the threshold values Vigupth1 and Vigdownth1 are set to be an appropriate values so that it is determined that "when the increased amount of the discharge voltage from the time m−2 to the time m−1 is larger than the threshold value Vigupth1 and the decreased amount of the discharge voltage from the time m−1 to the time m is smaller than the threshold value Vigdownth1, the discharge voltage at or around the time m−1 is the maximum value thereof." When the both of the conditions (e) and (f) are satisfied, it is then determined that the discharge voltage became the maximum value at or around the time m−1.

When the both of the conditions (e) and (f) are satisfied at this moment, the CPU 91 determines as "Yes" at step 1220 to proceeds to step 1230. The CPU 91 determines the sampling timing k1m at step 1230. The sampling timing k1m is within the period from the time (zero) at which the discharge is started to the time (the time m−1) at which the discharge voltage became the maximum value, and is determined by applying an engine rotational speed NE and the loading rate KL at this moment to a table Mapk1m(Ga, KL) for defining the sampling timing, which table defines "the relationship between the engine rotation speed NE, the loading rate KL, and the sampling timing k1m" in advance.

Regarding this table Mapk1m(Ga, KL) for defining the sampling timing, the sampling timing k1m is determined to be an appropriate value in view of measuring the ignitability of the air-fuel mixture within the period ($0 \leq k1m \leq m-1$) before the discharge voltage becomes the maximum value.

On the other hand, when at least one of the conditions (e) and (f) is not satisfied at this moment (that is, when the discharge voltage does not yet become the maximum value), the CPU 91 determines as "No" at step 1220. After that, the CPU 91 repeatedly executes the processes of step 1210 and step 1220 until the both conditions (e) and (f) is satisfied.

After the sampling timing k1m is determined at step 1230, the CPU 91 proceeds to step 1240. The CPU 91 determines at step 1240 whether or not the present time (the time m) is after the predetermined time (the time ma). The time ma is the boundary of the first period and the second period. The CPU 91 hence determines at step 1240 whether or not the present time is within the second period.

When the present time (the time m) is before the above predetermined time (for example, within the period from the time at which the sampling timing k1m is obtained at step 1230 to the time ma), the CPU 91 determines as "No" at step 1240. After that, the CPU 91 repeatedly executes the processes of step 1240 until the present time becomes the above predetermined time (the time m).

After that, when the present time becomes the above predetermined time (the time m), the CPU 91 determines as "Yes" at step 1240 to proceeds to step 1250. The CPU 91 obtains the time (the time m−1) at which the discharge voltage Vig becomes the maximum value within the second period.

In particular, the CPU 91 continuously stores the discharge voltage Vig associating with time t in the RAM 93 (for example, Vig (ma), Vig (ma+1), . . . , Vig (m−2), Vig (m−1), Vig (m), . . . is associated with time t=m, m+1, . . . , m−2, m−1, m, . . . ) from the predetermined time (the time ma) to the present time (the time m). The CPU 91 then determines whether or not the discharge voltages Vig(m), Vig(m−1) and Vig(m−2) at the present time (the time m) and the points (the time m−1 and the time m−2) right before the present time satisfy both of the following conditions (g) and (h). In the following conditions (g) and (h), Vigupth2 represents the threshold value (positive value) when the discharge voltage rises, and Vigdownth2 represents the threshold value (negative value) when the discharge voltage drops.

$$Vig(m-1) - Vig(m-2) > Vigupth2 \quad (g)$$

$$Vig(m) - Vig(m-1) < Vigdownth2 \quad (h)$$

Regarding the conditions (g) and (h), the threshold values Vigupth2 and Vigdownth2 are set to be an appropriate values so that it is determined that "when the increased amount of the discharge voltage from the time m−2 to the time m−1 is larger than the threshold value Vigupth2 and the decreased amount of the discharge voltage from the time m−1 to the time m is smaller than the threshold value Vigdownth2, the discharge voltage at or around the time m−1 is the maximum value thereof." When the both of the conditions (g) and (h) are satisfied, it is then determined that the discharge voltage became the maximum value at or around the time m−1.

When the both of the conditions (g) and (h) are satisfied at this moment, the CPU 91 determines as "Yes" at step 1250 to proceeds to step 1260. The CPU 91 determines the sampling timing k2m at step 1260. The sampling timing k2m is within the period from the predetermined time (the time ma) to the time (the time m−1) at which the discharge voltage became the maximum value, and is determined by applying an engine rotational speed NE and the loading rate KL at this moment to a table Mapk2m(Ga, KL) for defining the sampling timing, which table defines "the relationship between the engine rotation speed NE, the loading rate KL, and the sampling timing k2m" in advance.

Regarding this table Mapk2m(Ga, KL) for defining the sampling timing, the sampling timing k2m is determined to be an appropriate value in view of measuring the ignitability of the air-fuel mixture within the period (ma≤k2m≤m−1) before the discharge voltage becomes the maximum value.

On the other hand, when at least one of the conditions (g) and (h) is not satisfied at this moment (that is, when the discharge voltage does not yet become the maximum value), the CPU 91 determines as "No" at step 1250. After that, the CPU 91 repeatedly executes the processes of step 1240 and step 1250 until the both conditions (g) and (h) is satisfied.

After the sampling timing k2m is determined at step 1260, the CPU 91 proceeds to step 1270. The CPU 91 determines at step 1270 whether or not the re-discharge is needed based on the values of the discharge voltage at the sampling timing k1m and the sampling timing k2m.

In particular, the CPU 91 determines whether or not "the discharge voltage Vig(k1m) at the sampling timing k1m" and "the discharge voltage Vig(k2m) at the sampling timing k2m" among discharge voltages, stored in the RAM 93, satisfy both of the following conditions (i) and (j). In the following conditions (i) and (j), Vigth1m and Vigth2m each represent predetermined threshold values.

$$Vig(k1m) < Vigth1m \quad (i)$$

$$Vig(k2m) < Vigth2m \quad (j)$$

Regarding the conditions (i) and (j), the threshold voltage Vigth1m is set to be an appropriate value so that it is determined that "when the discharge voltage Vig is larger than the threshold voltage Vigth1m, the air-fuel ratio of the air-fuel mixture is lean (that is, the minimum ignition energy of the air-fuel mixture is large), and consequently the discharge voltage within the second period is preferably considered in order to appropriately measure the ignitability of the air-fuel mixture." Furthermore, the threshold voltage Vigth2m is set to be an appropriate value so that it is determined that "when the discharge voltage Vig is smaller than the threshold voltage Vigth2m, the released energy from the discharge is not equal to or larger than the minimum ignition energy of the air-fuel mixture." When the both of the conditions (i) and (j) are satisfied, it is determined that the ignitability of the air-fuel mixture is not sufficient. In other words, it is determined that the re-discharge is needed.

When the both of the conditions (i) and (j) are satisfied at this moment, the CPU 91 determines as "Yes" at step 1270. After that, the CPU 91 returns to the routine in FIG. 7 through step 830, step 840 and the connection mark C to start the re-discharge at the discharge start timing CAig (see step 730 and step 740).

On the other hand, when at least one of the conditions (i) and (j) is not satisfied at this moment, the CPU 91 determines as "No" at step 1270 in FIG. 12. After that, the CPU 91 returns to the routine in FIG. 7 through the connection mark B to end this routine once (see step 795).

As described above, the sixth device obtains the first parameter (the discharge voltage Vig(k1m)) obtained before the time at which the discharge voltage becomes the maximum value within the first period and the second parameter (the discharge voltage Vig(k2m)) obtained before the time at which the discharge voltage becomes the maximum value within the second period. The sixth device then measures the ignitability of the air-fuel mixture based on the both of the parameters.

Furthermore, the sixth device determines the sampling timing k1m through the process at step 1220 and step 1230 in FIG. 12. However, in consideration of the fact that the first period ends in a relatively short time, the sampling timing k1m may be "the discharge start timing CAig or a time right after the discharge start timing CAig" in view of the simplicity of the processes executed with the sixth device.

The above is the descriptions regarding the sixth device.
(Seventh Embodiment)

Next, the ignition control device according to the seventh embodiment (hereinafter referred to as "seventh device") will be described.

The seventh device is different from the second device or the third device only in that "a discharge voltage when the absolute value of the discharge voltage becomes the maximum value within the first period" is employed as the first parameter relevant to discharge voltage and "a discharge voltage when the absolute value of the discharge voltage becomes the maximum value within the second period" is employed as the second parameter relevant to discharge voltage.

<Method for Determination on Re-discharge>

The seventh device employs "the maximum discharge voltage within the first period" as the first parameter and "the maximum discharge voltage within the second period" as the second parameter.

The determination on re-discharge is made based on the above parameters. The following is an example in which the method for determination on re-discharge of the seventh device is applied to "the second device" for convenience (in which device the determination on re-discharge is made based on the both of the first parameter and the second parameter).

In particular, the seventh device determines that the ignitability of the air-fuel mixture is not sufficient and then allows the another discharge (re-discharge) in the case that the maximum value Vigmax1 of the discharge voltage within the first period is larger than a threshold voltage Vigth1t and the maximum value Vigmax2 of the discharge voltage within the second period is smaller than a threshold voltage Vigth2t. On the other hand, the seventh device does not allow the re-discharge in the case other than the above case.

The above is the method for determination on re-discharges regarding the seventh device.

<Actual Operation>

An actual operation of the seventh device will be described below.

Figure 13:
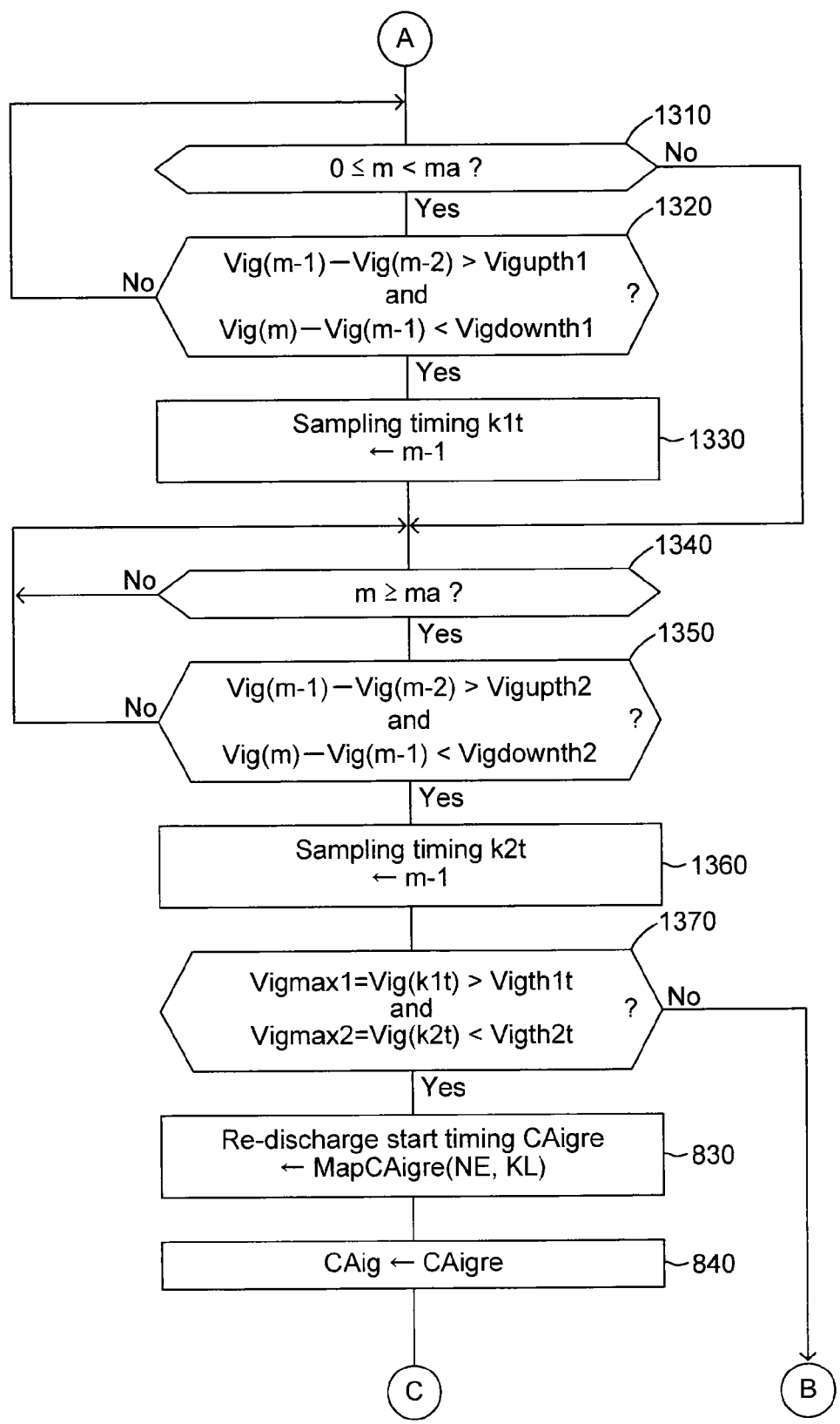
FIG. 13 is a flowchart illustrating a routine executed by a CPU of an ignition control device according to the seventh embodiment of the invention.

In the seventh device, the CPU 91 executes the respective routines in FIG. 6 for fuel injection control, FIG. 7 for ignition control, and FIG. 13 for determination on re-discharge at every predetermined time.

The seventh device is different from the second device only in that the CPU 91 executes the flowchart in "FIG. 13" in place of that in FIG. 8. The following descriptions will be mainly concerned this difference.

The CPU 91 repeatedly executes the routine in FIG. 6 every predetermined time to determine the target value Qtgt of the fuel injection amount, and to inject fuel into the cylinder in the amount of the target value Qtgt, as same as the second device. Furthermore, the CPU 91 repeatedly executes the routine in FIG. 7 every predetermined time to determine the discharge start timing CAig, and to start to generate a discharge at the discharge start timing CAig, as same as the second device.

When starting to generate a discharge (step 740) in FIG. 7, the CPU 91 proceeds to step 750 through the connection mark A to execute "the routine in FIG. 13". By this routine in FIG. 13, the CPU 91 determines whether or not the re-discharge is needed in consideration of the ignitability of the air-fuel mixture.

The routine in FIG. 13 is different from that in FIG. 8 only in that step 1310 to step 1370 are added. The other steps in FIG. 13 for executing the same processing as those steps in FIG. 8 are attached with the same step-numbers as those steps in FIG. 8. Detailed description is omitted regarding these steps.

The CPU 91 starts a process at the connection mark A in FIG. 13 and then executes the processes in step 1310 and step 1320. The processes in step 1310 and step 1320 are the same as the step 1210 and step 1220 in FIG. 12. Detailed description is hence omitted regarding these steps. After that, the CPU 91 proceeds to step 1310. The CPU 91 stores the time (the time m−1) at which the discharge voltage became the maximum value into the sampling timing k1t at step 1310.

Next, the CPU 91 executes the processes in step 1340 and step 1350. The processes in step 1340 and step 1350 are the same as the step 1240 and step 1250 in FIG. 12. Detailed description is hence omitted regarding these steps. After that, the CPU 91 proceeds to step 1320. The CPU 91 stores the time (the time m−1) at which the discharge voltage became the maximum value into the sampling timing k2t at step 1320.

Next, the CPU 91 proceeds to step 1370. The CPU 91 determines at step 1370 whether or not the re-discharge is needed based on the discharge voltages at the sampling timing k1t and the sampling timing k2t.

In particular, the CPU 91 determines whether or not "the discharge voltage Vig(k1t) at the sampling timing k1t" and "the discharge voltage Vig(k2t) at the sampling timing k2t" among discharge voltages, stored in the RAM 93, satisfy both of the following conditions (k) and (l). In the following conditions (k) and (l), Vigth1t and Vigth2t each represent predetermined threshold values. The discharge voltage Vig(k1t) represents the maximum value Vigmax1 of the discharge voltage within the first period, and the discharge voltage Vig(k2t) represents the maximum value Vigmax2 of the discharge voltage within the second period.

$$Vigmax1 = Vig(k1t) > Vigth1t \quad (k)$$

$$Vigmax2 = Vig(k2t) < Vigth2t \quad (l)$$

Regarding the conditions (k) and (l), the threshold voltage Vigth1t is set to be an appropriate value so that it is determined that "when the discharge voltage Vig is larger than the threshold voltage Vigth1t, the air-fuel ratio of the air-fuel mixture is lean (that is, the minimum ignition energy of the air-fuel mixture is large), and consequently the discharge voltage within the second period is preferably considered in order to appropriately measure the ignitability of the air-fuel mixture." Furthermore, the threshold voltage Vigth2t is set to be an appropriate value so that it is determined that "when the discharge voltage Vig is smaller than the threshold voltage Vigth2t, the released energy from the discharge is not equal to or larger than the minimum ignition energy of the air-fuel mixture." When the both of the conditions (k) and (l) are satisfied, it is determined that the ignitability of the air-fuel mixture is not sufficient. In other words, it is determined that the re-discharge is needed.

When the both of the conditions (k) and (l) are satisfied at this moment, the CPU 91 determines as "Yes" at step 1370. After that, the CPU 91 returns to the routine in FIG. 7 through step 830, step 840 and the connection mark C to start the re-discharge at the discharge start timing CAig (see step 730 and step 740).

On the other hand, when at least one of the conditions (k) and (l) is not satisfied at this moment, the CPU 91 determines as "No" at step 1370 in FIG. 13. After that, the CPU 91 returns to the routine in FIG. 7 through the connection mark B to end this routine once (see step 795).

As described above, the seventh device obtains the maximum value Vigmax1 of the discharge voltage within the first period and the maximum value Vigmax2 of the discharge voltage within the second period. The seventh device then measures the ignitability of the air-fuel mixture based on the both of the parameters.

Furthermore, the seventh device determines the sampling timing k1t through the process at step 1320 and step 1330 in FIG. 13. However, the sampling timing k1t may be "the discharge start timing CAig or a time right after the discharge start timing CAig" in view of the simplicity of the processes executed with the seventh device.

The above is the descriptions regarding the seventh device.

(Eighth Embodiment)

Next, the ignition control device according to the eighth embodiment (hereinafter referred to as "eighth device") will be described.

The eighth device is different from the second device or the third device only in that the time at which the re-discharge (another discharge) is started is determined based on the change rate of the discharge voltage within the second period.

<Method for Determination on Re-discharge>

The eighth device employs the "discharge voltage itself within the first period" as the first parameter relevant to discharge voltage and the "discharge voltage itself within the second period" as the second parameter relevant to discharge voltage. Furthermore, "the flow rate of the air-fuel mixture" is employed as a parameter corresponding to the change rate of the discharge voltage within the second period in the eighth device.

The determination on re-discharge is made based on the above parameters. The following is an example in which the method for determination on re-discharge of the eighth device is applied to "the second device" for convenience (in which device the determination on re-discharge is made based on the both of the first parameter and the second parameter).

In particular, the eighth device determines that the ignitability of the air-fuel mixture is not sufficient and then allows the another discharge (re-discharge) in the case that the discharge voltage Vig at a predetermined time within the first period is larger than a threshold voltage Vigth1 and the discharge voltage Vig at a predetermined time within the second period is smaller than a threshold voltage Vigth2. On the other hand, the eighth device does not allow the re-discharge in the case other than the above case.

Furthermore, the CPU 91 determines "the flow rate FRg" based on the discharge voltage within the second period. In the case that the flow rate FRg rises, the CPU 91 sets the re-discharge start timing CAigre to be an earlier time with increasing degree of rise of the flow rate FRg. On the other hand, in the case that the flow rate FRg drops, the CPU 91 sets the re-discharge start timing CAigre to be a later time with increasing degree of drop of the flow rate FRg.

The above is the method for determination on re-discharges regarding the eighth device.

<Actual Operation>

An actual operation of the eighth device will be described below.

Figure 14:
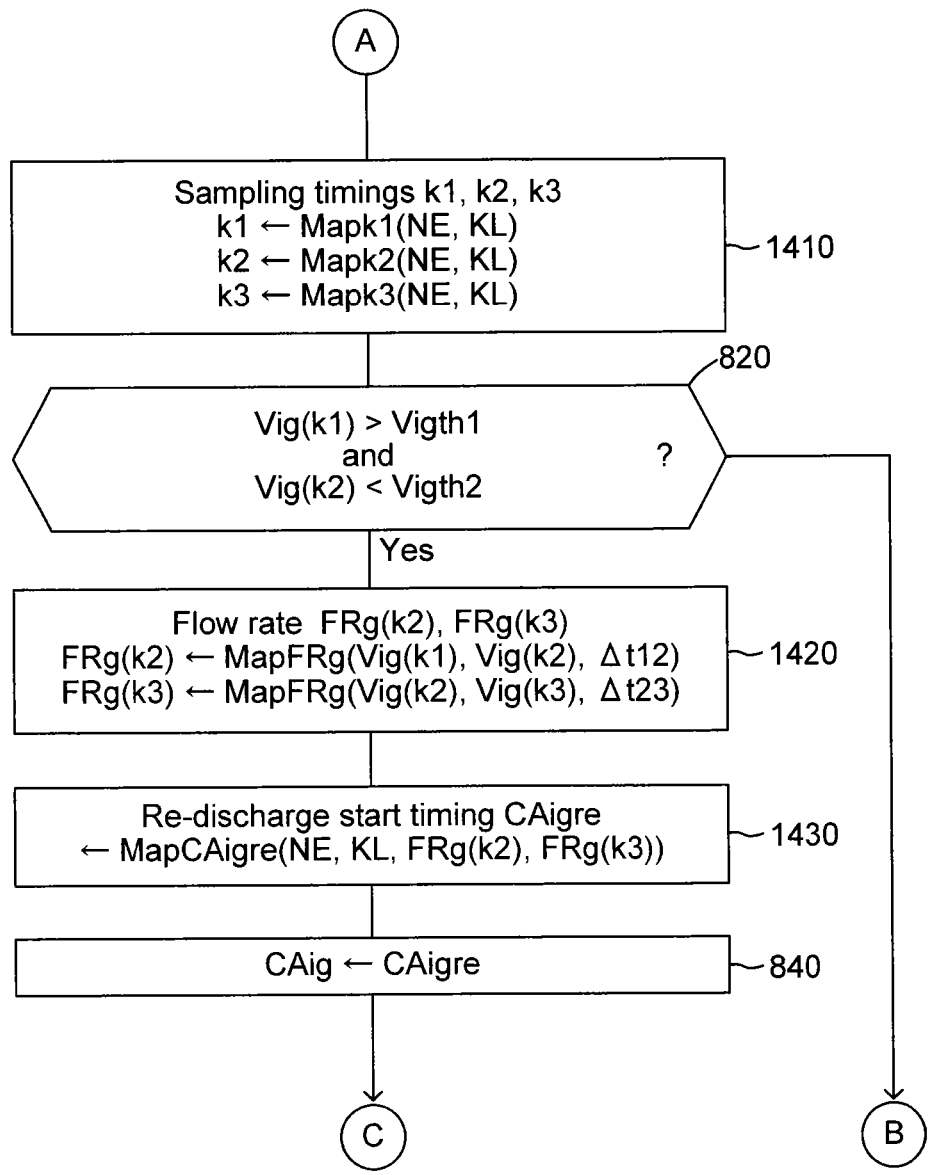
FIG. 14 is a flowchart illustrating a routine executed by a CPU of an ignition control device according to the eighth embodiment of the invention.

In the eighth device, the CPU 91 executes the respective routines in FIG. 6 for fuel injection control, FIG. 7 for ignition control, and FIG. 14 for determination on re-discharge at every predetermined time.

The eighth device is different from the second device only in that the CPU 91 executes the flowchart in "FIG. 14" in place of that in FIG. 8. The following descriptions will be mainly concerned this difference.

The CPU 91 repeatedly executes the routine in FIG. 6 every predetermined time to determine the target value Qtgt of the fuel injection amount, and to inject fuel into the cylinder in the amount of the target value Qtgt, as same as the second device. Furthermore, the CPU 91 repeatedly executes the routine in FIG. 7 every predetermined time to determine the discharge start timing CAig, and to start to generate a discharge at the discharge start timing CAig, as same as the second device.

When starting to generate a discharge (step 740) in FIG. 7, the CPU 91 proceeds to step 750 through the connection mark A to execute "the routine in FIG. 14". By this routine in FIG. 14, the CPU 91 determines whether or not the re-discharge is needed in consideration of the ignitability of the air-fuel mixture.

The routine in FIG. 14 is different from that in FIG. 8 only in that step 810 is replaced with step 1410, and step 830 is replaced with step 1420 and step 1430. The other steps in FIG. 14 for executing the same processing as those steps in FIG. 8 are attached with the same step-numbers as those steps in FIG. 8. Detailed description is omitted regarding these steps.

The CPU 91 starts a process at the connection mark A in FIG. 8 and then proceeds to step 1410. The CPU 91 determines the sampling timings k1, k2 and k3 at step 1410. The sampling timing k1 is within the first period, and the sampling timings k2 and k3 are within the second period. In particular, the CPU 91 determines the sampling timing k1 and the sampling timing k2 based on the table Mapk1(Ga, KL) and the table Mapk2(Ga, KL) each for defining the sampling timing. Furthermore, the CPU 91 determines the sampling timing k3 by applying an engine rotational speed NE and the loading rate KL at this moment to a table Mapk3(Ga, KL) for defining the sampling timing, which table defines "the relationship between the engine rotation speed NE, the loading rate KL, and the sampling timing k3" in advance.

After that, the CPU 91 proceeds to step 820 to determine whether or not the discharge voltage Vig(k1) and the discharge voltage Vig(k2) satisfy both of the conditions (a) and (b), which are same conditions used in the second device.

When the both of the conditions (a) and (b) are satisfied at this moment, the CPU 91 determines as "Yes" at step 820 to proceed to step 1420. At step 1420, the CPU 91 determines the flow rate FRg(k2) and the flow rate FRg(k3) at the sampling timings k2 and k3.

In particular, the CPU 91 determines the flow rate FRg(k2) at the sampling timing k2 by applying the discharge voltage Vig(k1) at the sampling timing k1 and the discharge voltage Vig(k2) at the sampling timing k2 to the table MapFRg(Vig1, Vig2, Δt12) for defining the flow rate of the air-fuel mixture, which table is the same used in the fourth device. Furthermore, the CPU 91 determines (estimates) the flow rate FRg(k3) at the sampling timing k3 by applying the discharge voltage Vig(k2) at the sampling timing k2 and the discharge voltage Vig(k3) at the sampling timing k3 to the same table for defining the flow rate of the air-fuel mixture.

Next, the CPU 91 proceeds to step 1430. The CPU 91 determines the re-discharge start timing CAigre at step 1430 by applying an engine rotational speed NE, the loading rate KL, the flow rate FRg(k2) as FRg1, and the flow rate FRg(k3) as FRg2 at this moment to a table MapCAigre(Ga, KL, FRg1, FRg2) for defining the re-discharge start timing, which table defines "the relationship between the intake air amount Ga, the loading rate KL, the flow rates FRg1 and FRg2 at two separate time, and the re-discharge start timing CAigre" in advance.

Regarding this table MapCAigre(Ga, KL, FRg1, FRg2) for defining the re-discharge start timing, the re-discharge start timing CAigre is determined to be an appropriate value that is set depending on the combustion timing of the air-fuel mixture, the amount of emissions and the output power of the engine 10, and etc. In particular, in the case that the flow rate FRg rises (in the case of FRg(k2)<FRg(k3) in the eighth device), the CPU 91 sets the re-discharge start timing CAigre to be an earlier time with increasing degree of rise of the flow rate FRg (that is, with increasing amount of the difference between FRg(k3) and FRg(k2)). On the other hand, in the case that the flow rate FRg drops (in the case of FRg(k2)>FRg(k3) in the eighth device), the CPU 91 sets the re-discharge start timing CAigre to be a later time with increasing degree of drop of the flow rate FRg (that is, with decreasing amount of the difference between FRg(k3) and FRg(k2)). In addition, in the case that the flow rate FRg does not change (in the case of FRg(k2)=FRg(k3) in the eighth device), the CPU 91 sets the re-discharge start timing CAigre without considering the change of the flow rate of the air-fuel mixture.

After that, the CPU 91 returns to the routine in FIG. 7 through step 830, step 840 and the connection mark C to start the re-discharge at the discharge start timing CAig (see step 730 and step 740).

On the other hand, when at least one of the conditions (a) and (b) is not satisfied at this moment, the CPU 91 determines as "No" at step 820 in FIG. 14. After that, the CPU 91 returns to the routine in FIG. 7 through the connection mark B to end this routine once (see step 795).

As described above, the eighth device measures the ignitability of the air-fuel mixture based on the both of the first parameter relevant to discharge voltage (the discharge voltage Vig(k1)) and the second parameter relevant to discharge voltage (the discharge voltage Vig(k2)) when the discharge is started at a predetermined timing. Furthermore, the eighth device sets the re-discharge start timing CAigre based on the change rate of the discharge voltage within the second period ("the flow rate FRg" corresponding to the change rate, in the eighth device).

In addition, the eighth device sets the re-discharge start timing CAigre based on "the flow rate FRg" corresponding to "the change rate of the discharge voltage within the second period." The eighth device however may be configured to obtain" the change rate of the discharge voltage itself" and set the re-discharge start timing CAigre based on the change rate itself.

The above is the descriptions regarding the eighth device.

(Ninth Embodiment)

Next, the ignition control device according to the ninth embodiment (hereinafter referred to as "ninth device") will be described.

The ninth device is different from the second device or the third device only in that "the discharge voltage at an earlier time with increasing amount of the engine rotational speed" is employed as the second parameter relevant to voltage for discharging.

<Method for Determination on Re-Discharge>

The ninth device employs the "discharge voltage itself within the first period" as the first parameter relevant to discharge voltage and the "discharge voltage itself within the second period" as the second parameter relevant to discharge voltage. In addition, the ninth device employs, as the discharge voltage within the second period, the discharge voltage at an earlier time with increasing amount of the engine rotational speed.

The determination on re-discharge is made based on the above parameters. The following is an example in which the method for determination on re-discharge of the ninth device is applied to "the second device" for convenience (in which device the determination on re-discharge is made based on the both of the first parameter and the second parameter).

In particular, the ninth device determines that the ignitability of the air-fuel mixture is not sufficient and then allows the another discharge (re-discharge) in the case that the discharge voltage Vig at a predetermined time within the first period is larger than a threshold voltage Vigth1 and the discharge voltage Vig at a predetermined time within the second period is smaller than a threshold voltage Vigth2. On the other hand, the ninth device does not allow the re-discharge in the case other than the above case.

The above is the method for determination on re-discharges regarding the ninth device.

<Actual Operation>

An actual operation of the ninth device will be described below.

Figure 15:
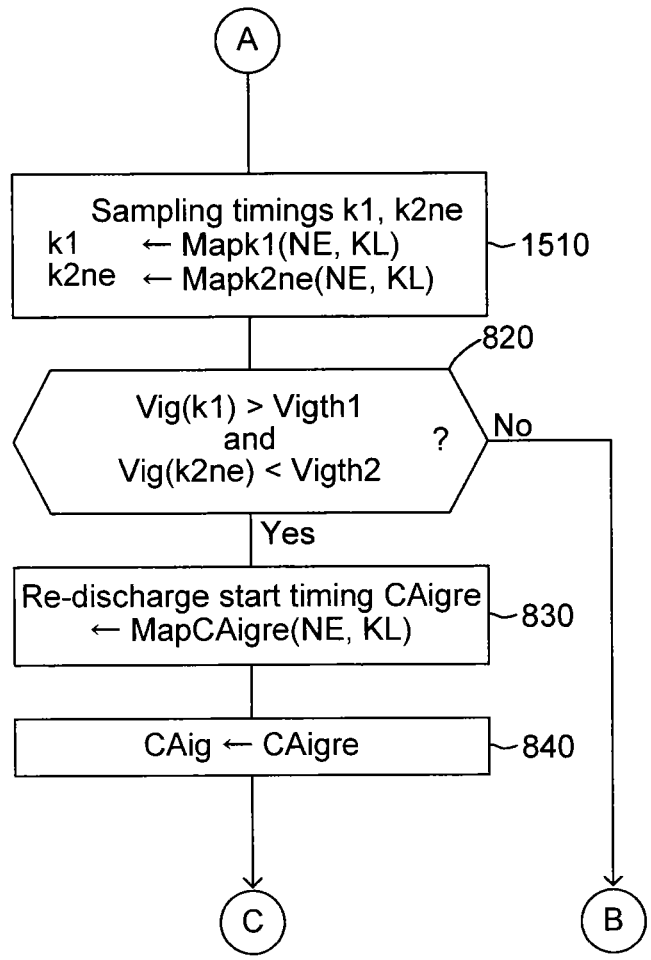
FIG. 15 is a flowchart illustrating a routine executed by a CPU of an ignition control device according to the ninth embodiment of the invention.

In the ninth device, the CPU 91 executes the respective routines in FIG. 6 for fuel injection control, FIG. 7 for ignition control, and FIG. 15 for determination on re-discharge at every predetermined time.

The ninth device is different from the second device only in that the CPU 91 executes the flowchart in "FIG. 15" in place of that in FIG. 8. The following descriptions will be mainly concerned this difference.

The CPU 91 repeatedly executes the routine in FIG. 6 every predetermined time to determine the target value Qtgt of the fuel injection amount, and to inject fuel into the cylinder in the amount of the target value Qtgt, as same as the second device. Furthermore, the CPU 91 repeatedly executes the routine in FIG. 7 every predetermined time to determine the discharge start timing CAig, and to start to generate a discharge at the discharge start timing CAig, as same as the second device.

When starting to generate a discharge (step 740) in FIG. 7, the CPU 91 proceeds to step 750 through the connection mark A to execute "the routine in FIG. 15". By this routine in FIG. 15, the CPU 91 determines whether or not the re-discharge is needed in consideration of the ignitability of the air-fuel mixture.

The routine in FIG. 15 is different from that in FIG. 8 only in that step 810 is replaced with step 1510. The other steps in FIG. 15 for executing the same processing as those steps in FIG. 8 are attached with the same step-numbers as those steps in FIG. 8. Detailed description is omitted regarding these steps.

The CPU 91 starts a process at the connection mark A in FIG. 15 and then proceeds to step 1510. The CPU 91 determines the sampling timings k1 and k2ne at step 1510. The sampling timing k1 is within the first period, and the sampling timing k2ne is within the second period. In particular, the CPU 91 determines the sampling timing k1 based on the table Mapk1(Ga, KL) for defining the sampling timing, as the second device. Furthermore, the CPU 91 determines the sampling timing k2ne by applying an engine rotational speed NE and the loading rate KL at this moment to a table Mapk2ne (Ga, KL) for defining the sampling timing, which table defines "the relationship between the engine rotation speed NE, the loading rate KL, and the sampling timing k2ne" in advance.

Regarding this table Mapk2ne(Ga, KL) for defining the sampling timing, the sampling timing k2ne are determined to be an earlier time with increasing amount of the engine rotational speed NE, which timing is an appropriate value in view of measuring the ignitability of the air-fuel mixture.

After that, the CPU 91 proceeds to step 820 to determine whether or not the discharge voltage Vig(k1) and the discharge voltage Vig(k2ne) satisfy both of the conditions (a) and (b), which are same conditions used in the second device.

When the both of the conditions (a) and (b) are satisfied at this moment, the CPU 91 determines as "Yes" at step 820. After that, the CPU 91 returns to the routine in FIG. 7 through step 830, step 840 and the connection mark C to start the re-discharge at the discharge start timing CAig (see step 730 and step 740).

On the other hand, when at least one of the conditions (a) and (b) is not satisfied at this moment, the CPU 91 determines as "No" at step 820 in FIG. 15. After that, the CPU 91 returns to the routine in FIG. 7 through the connection mark B to end this routine once (see step 795).

As described above, the ninth device measures the ignitability of the air-fuel mixture based on the both of the first parameter relevant to discharge voltage (the discharge voltage Vig(k1)) and the second parameter relevant to discharge voltage (the discharge voltage Vig(k2ne)) when the discharge is started at a predetermined timing. Furthermore, the ninth device employs, as the sampling timing k2ne for the second parameter, an earlier time with increasing amount of the engine rotational speed NE.

The above is the descriptions regarding the ninth device.

(Tenth Embodiment)

Next, the ignition control device according to the tenth embodiment (hereinafter referred to as "tenth device") will be described.

The tenth device is different from the second device or the third device only in that "the discharge voltage at the time before the discharge is blown out" is employed as the second parameter relevant to voltage for discharging.

Figure 16:
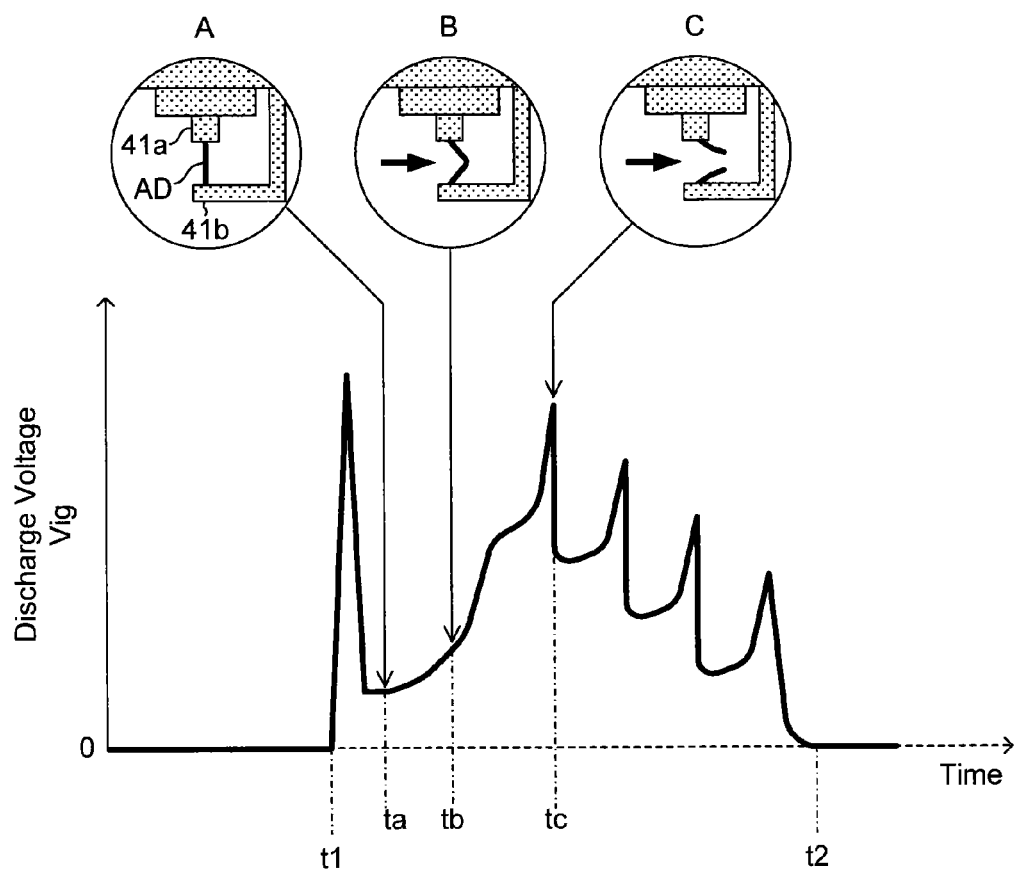
FIG. 16 is a time chart illustrating a transition of discharge voltage in the case that a discharge is blown out.

The following is the transition of discharge voltage when the discharge is blown out by referring to FIG. 16, before specific descriptions on operations of the tenth device. FIG. 16 is a time chart illustrating an example of transitions of discharge voltage when the discharge is blown out. FIG. 16 illustrates simplified forms of actual waveforms of respective values for the sake of convenience. In addition, scales of the vertical axis and the horizontal axis in FIG. 16 are arbitrarily enlarged or reduced for convenience.

In the example illustrated in this time chart, a discharge is started at the time t1. In this example, the inductive discharge is started at the time to which is after a predetermined time has passed since the time t1, and then the inductive discharge starts to generate the discharge AD between the center electrode 41*a* and the earth electrode 41*b* as illustrated in the partial view A in FIG. 16. After that, the form of the path of the discharge changes due to the flux of the air-fuel mixture near the discharge AD as time passes, and the discharge voltage Vig increases as a result (for example, see the partial view B regarding the form of the discharge at the time tb).

The degree of the flux of the air-fuel mixture in this example is larger compared with the case that the discharge ends without being blown out (for example, the example illustrated in the time chart in FIG. 4). As a result, the discharge AD is cut because of the interception with the air-fuel mixture flowed due to the flux, on which mixture the insulation breakdown does not occur, at the time tc, which is after a predetermined time has passed since the time tb, as illustrated in the partial view C in FIG. 16. In other words, the discharge is "blown out."

All of the supplied energy has not yet expended at the time tc at which the discharge is blown out. As a result, in this example, a discharge re-starts so as to pass through the air-fuel mixture existed around the center electrode 41*a* and the earth electrode 41*b* and on which mixture the insulation breakdown occurs right after the time tc, due to the energy that is not used for the above discharge (that is, the remaining energy among the electromagnetic energy charged in the secondary coil 42*b*). The discharge voltage Vig once increases and then decreases thereafter when the discharge is blown out and the new discharge restarts, as illustrated in FIG. 16.

In addition, the restart of the discharge and the blowing out of the discharge are repeated until all of the supplied energy has expended in this example. After that, the discharge ends at the time t2 at which all the supplied energy has expended.

As described above, the discharge may end before all energy supplied to the spark plug 41 has not expended in the case that the degree of the flux of the air-fuel mixture is large.

<Method for Determination on Re-discharge>

The tenth device employs "the discharge voltage itself within the first period" as the first parameter and "a discharge voltage at a time before the discharge is blown out" as the second parameter.

The determination on re-discharge is made based on the above parameters. The following is an example in which the method for determination on re-discharge of the tenth device is applied to "the second device" for convenience (in which device the determination on re-discharge is made based on the both of the first parameter and the second parameter).

In particular, the tenth device determines that the ignitability of the air-fuel mixture is not sufficient and then allows the another discharge (re-discharge) in the case that the discharge voltage Vig(k1) at the predetermined time k1 within the first period is larger than the predetermined threshold voltage Vigth1 and the discharge voltage Vig(k2bo) at the time k2bo before the discharge is blown out is smaller than a predetermined threshold voltage Vigth2bo. On the other hand, the tenth device does not allow the re-discharge in the case other than the above case.

The above is the method for determination on re-discharge regarding the tenth device.

<Actual Operation>

An actual operation of the tenth device will be described below.

Figure 17:
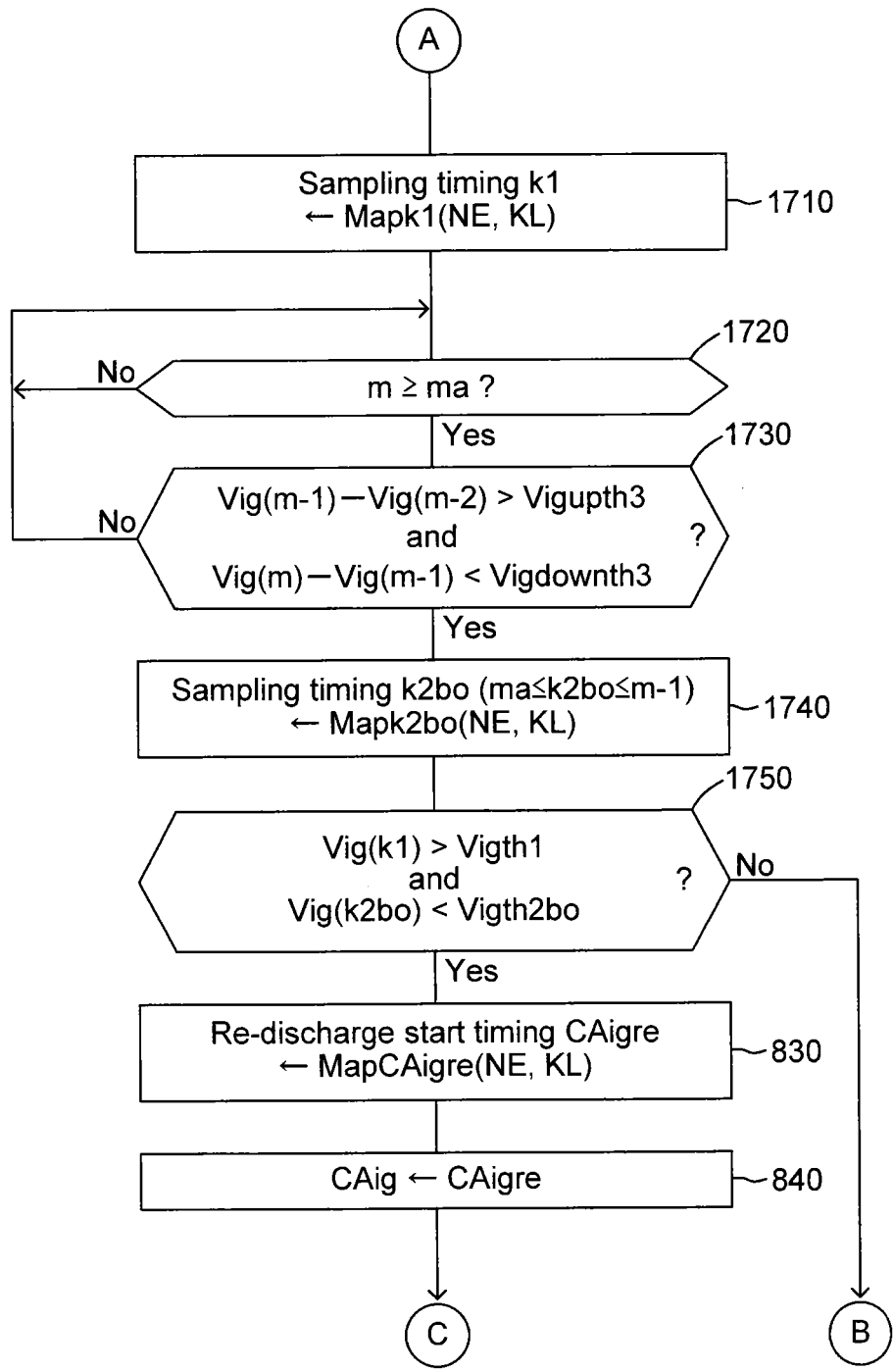
FIG. 17 is a flowchart illustrating a routine executed by a CPU of an ignition control device according to the tenth embodiment of the invention.

In the tenth device, the CPU 91 executes the respective routines in FIG. 6 for fuel injection control, FIG. 7 for ignition control, and FIG. 17 for determination on re-discharge at every predetermined time.

The tenth device is different from the second device only in that the CPU 91 executes the flowchart in "FIG. 17" in place of that in FIG. 8. The following descriptions will be mainly concerned this difference.

The CPU 91 repeatedly executes the routine in FIG. 6 every predetermined time to determine the target value Qtgt of the fuel injection amount, and to inject fuel into the cylinder in the amount of the target value Qtgt, as same as the second device. Furthermore, the CPU 91 repeatedly executes the routine in FIG. 7 every predetermined time to determine the discharge start timing CAig, and to start to generate a discharge at the discharge start timing CAig, as same as the second device.

When starting to generate a discharge (step 740) in FIG. 7, the CPU 91 proceeds to step 750 through the connection mark A to execute "the routine in FIG. 17". By this routine in FIG. 17, the CPU 91 determines whether or not the re-discharge is needed in consideration of the ignitability of the air-fuel mixture.

The routine in FIG. 17 is different from that in FIG. 8 only in that step 810 and step 820 are replaced with step 1710 to step 1750. The other steps in FIG. 17 for executing the same processing as those steps in FIG. 8 are attached with the same step-numbers as those steps in FIG. 8. Detailed description is omitted regarding these steps.

The CPU 91 starts a process at the connection mark A in FIG. 17 and then proceeds to step 1710. The CPU 91 determines the sampling timing k1 based on the table Mapk1(NE, KL) for defining the sampling timing, which table is the same table used in the second device.

Next, the CPU 91 proceeds to step 1720. The CPU 91 determines at step 1720 whether or not the present time (the time m) is at or after the predetermined time (the time ma), which is the time that corresponds to the boundary of the first period and the second period. The CPU 91 hence determines at step 1720 whether or not the present time is within the second period.

When the present time (the time m) is before the above predetermined time (for example, within the period from the time at which the sampling timing k1 is obtained at step 1710 to the time ma), the CPU 91 determines as "No" at step 1720. After that, the CPU 91 repeatedly executes the processes of step 1720 until the present time becomes the above predetermined time (the time m).

After that, when the present time (the time m) becomes a time after the above predetermined time, the CPU 91 determines as "Yes" at step 1720 to proceeds to step 1730. At step 1730, the CPU 91 obtains the time (the time m−1) at which the discharge is blown out within the second period.

In particular, the CPU 91 continuously stores the discharge voltage Vig associating with time t in the RAM 93 from the predetermined time (the time ma) to the present time (the time m). The CPU 91 then determines whether or not the discharge voltages Vig(m−2), Vig(m−1) and Vig(m) at the present time (the time m) and the points (the time m−1 and the time m−2) right before the present time satisfy both of the following conditions (m) and (n). In the following conditions (m) and (n), Vigupth3 represents the threshold value (positive value) when the discharge voltage rises, and Vigdownth3 represents the threshold value (negative value) when the discharge voltage drops.

$$Vig(m-1)-Vig(m-2) > Vigupth3 \quad (m)$$

$$Vig(m)-Vig(m-1) < Vigdownth3 \quad (n)$$

Regarding the conditions (m) and (n), the threshold values Vigupth3 is set to be an appropriate values so that it is determined that the discharge voltage rises sharply, and the threshold voltage Vigdownth3 is set to be an appropriate values so that it is determined that the discharge voltage drops sharply. When the both of the conditions (m) and (n) are satisfied, it is then determined that the discharge voltage became the local maximum value at or around the time m−1 and then right thereafter the discharge voltage dropped sharply. That is, it is determined that "the discharge was blown out" at or around the time m−1.

When the both of the conditions (m) and (n) are satisfied at this moment, the CPU 91 determines as "Yes" at step 1730 to proceeds to step 1740. The CPU 91 determines the sampling timing k1bo at step 1740. The sampling timing k1bo is within the period from the predetermined time (the time ma) to the time (the time m−1) at which the discharge is blown out, and is determined by applying an engine rotational speed NE and the loading rate KL at this moment to a table Mapk2bo(Ga, KL) for defining the sampling timing, which table defines "the relationship between the engine rotation speed NE, the loading rate KL, and the sampling timing k2bo" in advance.

Regarding this table Mapk2bo(Ga, KL) for defining the sampling timing, the sampling timing k2bo is determined to be an appropriate value in view of measuring the ignitability of the air-fuel mixture within the period (ma≤k2m≤m−1) before the discharge is blown out.

On the other hand, when at least one of the conditions (m) and (n) is not satisfied at this moment, the CPU 91 determines as "No" at step 1730. After that, the CPU 91 repeatedly executes the processes of step 1720 and step 1730 until the both conditions (m) and (n) is satisfied.

After the sampling timing k2bo is determined at step 1740, the CPU 91 proceeds to step 1750. The CPU 91 determines at step 1750 whether or not the re-discharge is needed based on the values of the discharge voltage at the sampling timing k1 and the sampling timing k2bo.

In particular, the CPU 91 determines whether or not the discharge voltage Vig(k1) at the sampling timing k1 and "the discharge voltage Vig(k2bo) at the sampling timing k2bo" among discharge voltages, stored in the RAM 93, satisfy both of the following conditions (o) and (p). In the following conditions (o) and (p), Vigth1 and Vigth2bo each represent predetermined threshold values.

$$Vig(k1) > Vigth1 \quad (o)$$

$$Vig(k2bo) < Vigth2bo \quad (p)$$

Regarding the conditions (o) and (p), the threshold voltage Vigth1 is set in the same manner as the second device. Furthermore, the threshold voltage Vigth2bo is set to be an appropriate value so that it is determined that "when the discharge voltage Vig is smaller than the threshold voltage Vigth2bo, the released energy from the discharge is not equal to or larger than the minimum ignition energy of the air-fuel mixture." When the both of the conditions (o) and (p) are satisfied, it is determined that the ignitability of the air-fuel mixture is not sufficient. In other words, it is determined that the re-discharge is needed.

When the both of the conditions (o) and (p) are satisfied at this moment, the CPU 91 determines as "Yes" at step 1750. After that, the CPU 91 returns to the routine in FIG. 7 through step 830, step 840 and the connection mark C to start the re-discharge at the discharge start timing CAig (see step 730 and step 740).

On the other hand, when at least one of the conditions (o) and (p) is not satisfied at this moment, the CPU 91 determines as "No" at step 1750 in FIG. 17. After that, the CPU 91 returns to the routine in FIG. 7 through the connection mark B to end this routine once (see step 795).

As described above, the tenth device obtains the first parameter (the discharge voltage Vig(k1)) at a time within the first period and the second parameter (the discharge voltage Vig(k2bo)) at a time before the discharge is blown out. The tenth device then measures the ignitability of the air-fuel mixture based on the both of the parameters.

Furthermore, the tenth device employs "a time before the discharge is blown out" as the sampling timing k2bo. However, the sampling timing k2bo may be "the time at which the discharge is blown out" or "a time just before the discharge is blown out."

The above is the descriptions regarding the tenth device.
(Eleventh Embodiment)

Next, the ignition control device according to the eleventh embodiment (hereinafter referred to as "eleventh device") will be described.

The eleventh device is different from the second device or the third device only in that "the average value of discharge voltages within the second period obtained over multiple cycles."
<Method for Determination on Re-discharge>

The eleventh device employs "the discharge voltage within the first period" as the first parameter and "the discharge voltage within the second period, which voltage is determined based on the average value of discharge voltages within the second period obtained over multiple cycles" as the second parameter. In particular, the discharge voltage at "the time at which the discharge is blown out" determined based on the average value is employed as the second parameter.

The determination on re-discharge is made based on the above parameters. The following is an example in which the method for determination on re-discharge of the eleventh device is applied to "the second device" for convenience (in which device the determination on re-discharge is made based on the both of the first parameter and the second parameter).

In particular, the eleventh device obtains an average value of discharge voltages over multiple (N times) cycles and determines the time k2ave at which the discharge is blown out based on the average value. The eleventh device determines that the ignitability of the air-fuel mixture is not sufficient and then allows the another discharge (re-discharge) in the case that the discharge voltage Vig(k1) at the predetermined time k1 within the first period is larger than the predetermined threshold voltage Vigth1 and the discharge voltage Vig (k2ave) at the time k2ave at which the discharge is blown out is smaller than a predetermined threshold voltage Vigth2bo. On the other hand, the eleventh device does not allow the re-discharge in the case other than the above case.

The above is the method for determination on re-discharge regarding the eleventh device.

<Actual Operation>

An actual operation of the eleventh device will be described below.

Figure 18:
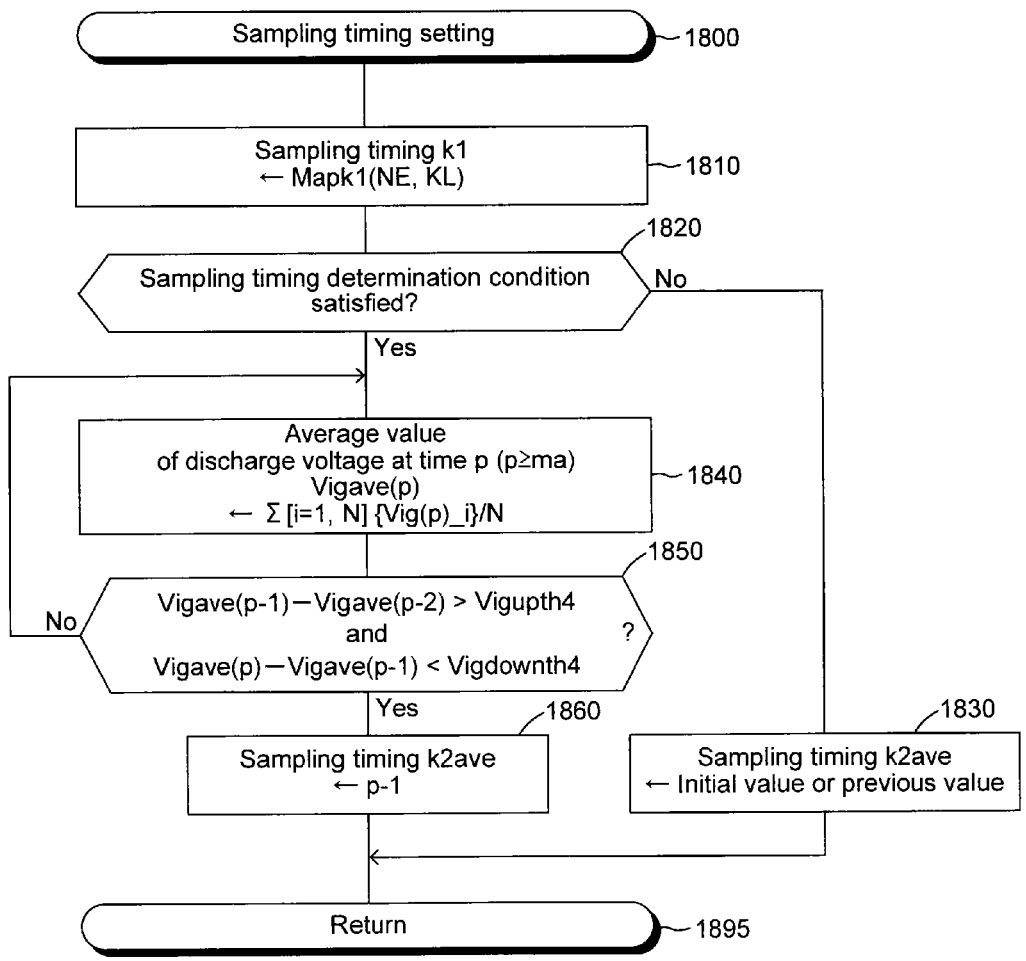
FIG. 18 is a flowchart illustrating a routine executed by a CPU of an ignition control device according to the eleventh embodiment of the invention.
Figure 19:
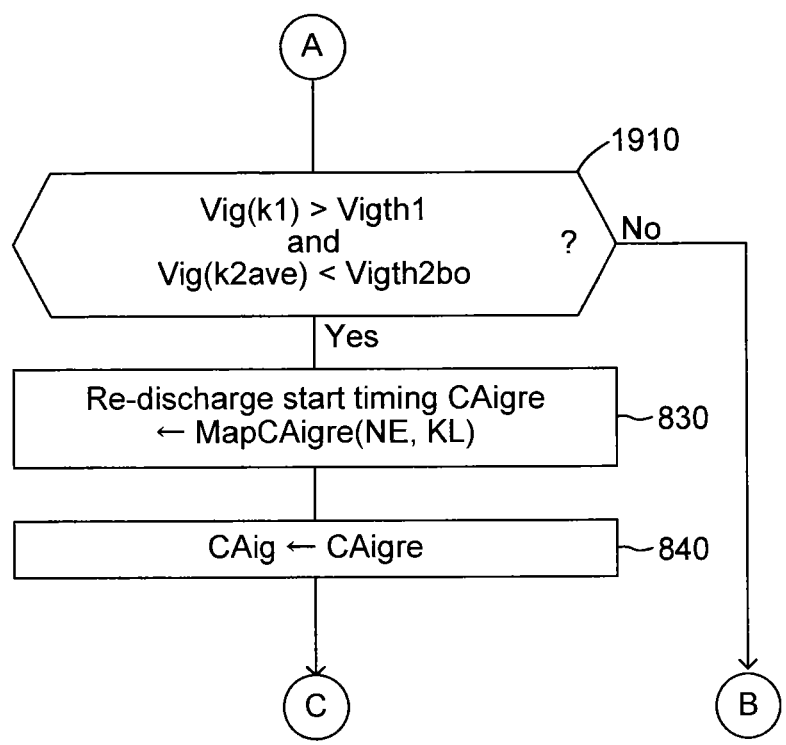
FIG. 19 is a flowchart illustrating a routine executed by a CPU of an ignition control device according to the eleventh embodiment of the invention.

In the eleventh device, the CPU 91 executes the respective routines in FIG. 6 for fuel injection control, FIG. 7 for ignition control, FIG. 18 for determination of sampling timing, and FIG. 19 for determination on re-discharge at every predetermined time.

The eleventh device is different from the second device only in that the CPU 91 executes the flowchart in "FIG. 18", and the flowchart in "FIG. 19" in place of that in FIG. 8. The following descriptions will be mainly concerned this difference.

The CPU 91 repeatedly executes the routine in FIG. 6 every predetermined time to determine the target value Qtgt of the fuel injection amount, and to inject fuel into the cylinder in the amount of the target value Qtgt, as same as the second device.

Furthermore, the CPU 91 repeatedly executes the "sampling timing setting routine", which is indicated by the flowchart in FIG. 18, every time the crank angle of arbitrary cylinder becomes equal to a predetermined crank angle θh before the intake stroke (for example, the crank angle of 45 degrees before the exhaust top dead center). By this routine, the CPU 91 determines the sampling timings k1 and k2ave.

In particular, the CPU 91 starts a process at step 1800 in FIG. 8 and then proceeds to step 1810. The CPU 91 determines the sampling timing k1 at step 1810 based on the table Mapk1(NE, KL) for defining the sampling timing, which table is the same used in the second device.

Next, the CPU 91 proceeds to step 1820. The CPU 91 determines at step 1820 whether or not the condition in order to determine the sampling timing k2ave within the second period (the condition for determining sampling timing) is satisfied. The condition for determining sampling timing is satisfied when the engine 10 is steadily operated and a predetermined time has passed since the time at which the sampling timing k2ave was previously determined.

When the condition for determining sampling timing is not satisfied at this moment, the CPU 91 determines as "No" at step 1820 to proceeds to step 1830. The CPU 91 stores a predetermined initial value or the previous sampling timing k2ave into the sampling timing k2ave. For example, the initial value is determined based on parameters such as the engine rotational speed NE and the loading rate KL. After that, the CPU 91 proceeds to step 1895 to end this routine once.

On the other hand, when the condition for determining sampling timing is satisfied at this moment, the CPU 91 determines as "Yes" at step 1820 to proceeds to step 1840. The CPU 91 obtains the average value of discharge voltages at the time p according to the following formula (1) at step 1840. In the following formula (1), the right side of the formula represents the value calculated by accumulating discharge voltage Vig(p)_i at each time p in the i-th cycle over the multiple (N-times) cycles and then dividing the accumulated value by the number of the cycles (N). The number of the cycles (N) is set to be an appropriate number in consideration of the reasonability as an average value and the time required for obtaining the average value. The time p is a time before the time ma (the time corresponding to the boundary of the first period and the second period).

$$Vigave(p)=\Sigma[i=1,N]\{Vig(p)\_i\}/N \qquad (1)$$

Next, the CPU 91 proceeds to step 1850. At step 1850, the CPU 91 obtains the time (the time p−1) at which the discharge is blown out within the second period.

In particular, the CPU 91 continuously stores the discharge voltage Vigave associating with time p in the RAM 93 (for example, Vigave (ma), Vigave (ma+1), . . . , Vigave (p−2), Vigave (p−1), Vigave (p), . . . is associated with time t=ma, ma+1, . . . , p−2, p−1, p, . . . ) from the predetermined time (the time ma) to the present time (the time p). The CPU 91 then determines whether or not the discharge voltages Vigave(p), Vigave(p−2) and Vigave(p−1) at the present time (the time p) and the points (the time p−1 and the time p−2) right before the present time satisfy both of the following conditions (m) and (n). In the following conditions (q) and (r), Vigupth4 represents the threshold value (positive value) when the discharge voltage rises, and Vigdownth4 represents the threshold value (negative value) when the discharge voltage drops.

$$Vigave(p-1)-Vigave(p-2)>Vigupth4 \qquad (q)$$

$$Vigave(q)-Vigave(p-1)<Vigdownth4 \qquad (r)$$

Regarding the conditions (q) and (r), the threshold values Vigupth4 and Vigdownth4 are set to be an appropriate values so that it is determined t at the time p−1 hat "the blowing out of the discharge occurred in at least one of the multiple cycles in which the average value of discharge voltages are obtained within the second period obtained over multiple cycles." When the both of the conditions (q) and (r) are satisfied, it is then determined that "the discharge was blown out" at or around the time p−1.

When the both of the conditions (q) and (r) are satisfied at this moment, the CPU 91 determines as "Yes" at step 1850 to proceeds to step 1860. The CPU 91 stores the time p−1 into the sampling timing K2ave. After that, the CPU 91 proceeds to step 1895 to end this routine once.

On the other hand, when at least one of the conditions (q) and (r) is satisfied at this moment, the CPU 91 determines as "No" at step 1850. After that, the CPU 91 repeatedly executes the processes of step 1840 and step 1850 until the both conditions (q) and (r) is satisfied.

Next, the CPU 91 repeatedly executes the routine in FIG. 7 every predetermined time to determine the discharge start timing CAig, and to start to generate a discharge at the discharge start timing CAig, as same as the second device.

When starting to generate a discharge (step 740) in FIG. 7, the CPU 91 proceeds to step 750 through the connection mark A to execute "the routine in FIG. 19". By this routine in FIG. 19, the CPU 91 determines whether or not the re-discharge is needed in consideration of the ignitability of the air-fuel mixture.

The routine in FIG. 19 is different from that in FIG. 8 only in that step 810 is deleted, and step 820 is replaced with step 1910. The other steps in FIG. 19 for executing the same processing as those steps in FIG. 8 are attached with the same step-numbers as those steps in FIG. 8. Detailed description is omitted regarding these steps.

In particular, the CPU 91 starts a process at the connection mark A in FIG. 19 and then proceeds to step 1910. The CPU 91 determines whether or not the re-discharge is needed based on the values of the discharge voltage at the sampling timing k1 and the sampling timing k2ave.

That is, the CPU 91 determines at step 1910 whether or not the discharge voltage Vig(k1) at the sampling timing k1 and the discharge voltage Vig(k2ave) at the sampling timing k2ave satisfies both of the following conditions (s) and (t). In the following conditions (s) and (t), Vigth1 and Vigth2bo each represent predetermined threshold values.

$$Vig(k1) > Vigth1 \quad (s)$$

$$Vig(k2ave) < Vigth2bo \quad (t)$$

When the both of the conditions (s) and (t) are satisfied at this moment, the CPU 91 determines as "Yes" at step 1910. After that, the CPU 91 returns to the routine in FIG. 7 through step 830, step 840 and the connection mark C to start the re-discharge at the discharge start timing CAig (see step 730 and step 740).

On the other hand, when at least one of the conditions (s) and (t) is not satisfied at this moment, the CPU 91 determines as "No" at step 1910 in FIG. 19. After that, the CPU 91 returns to the routine in FIG. 7 through the connection mark B to end this routine once (see step 795).

As described above, the eleventh device obtains the first parameter (the discharge voltage Vig(k1)) at a time within the first period and the second parameter (the discharge voltage Vig(k2ave)) at a time determined based on the average value of discharge voltages within the second period. The eleventh device then measures the ignitability of the air-fuel mixture based on the both of the parameters.

The above is the descriptions regarding the eleventh device.

(Twelfth Embodiment)

Next, the ignition control device according to the twelfth embodiment (hereinafter referred to as "twelfth device") will be described.

The eleventh device is different from the second device or the third device only in that the engine 10 has two ignition coils, the energy for the another discharge (the re-discharge) is began to be charged into the other coil before the start of the discharge (the first discharge) by using the energy charged in the one coil of the two coils, the energy charged in the other coil is supplied to the ignition means in the case that it is determined that the another discharge should be started within the ignition period, and the energy charged in the other coil is supplied to the ignition means after the ignition period in the case that it is not determined that the another discharge should be started within the ignition period.

Figure 20:
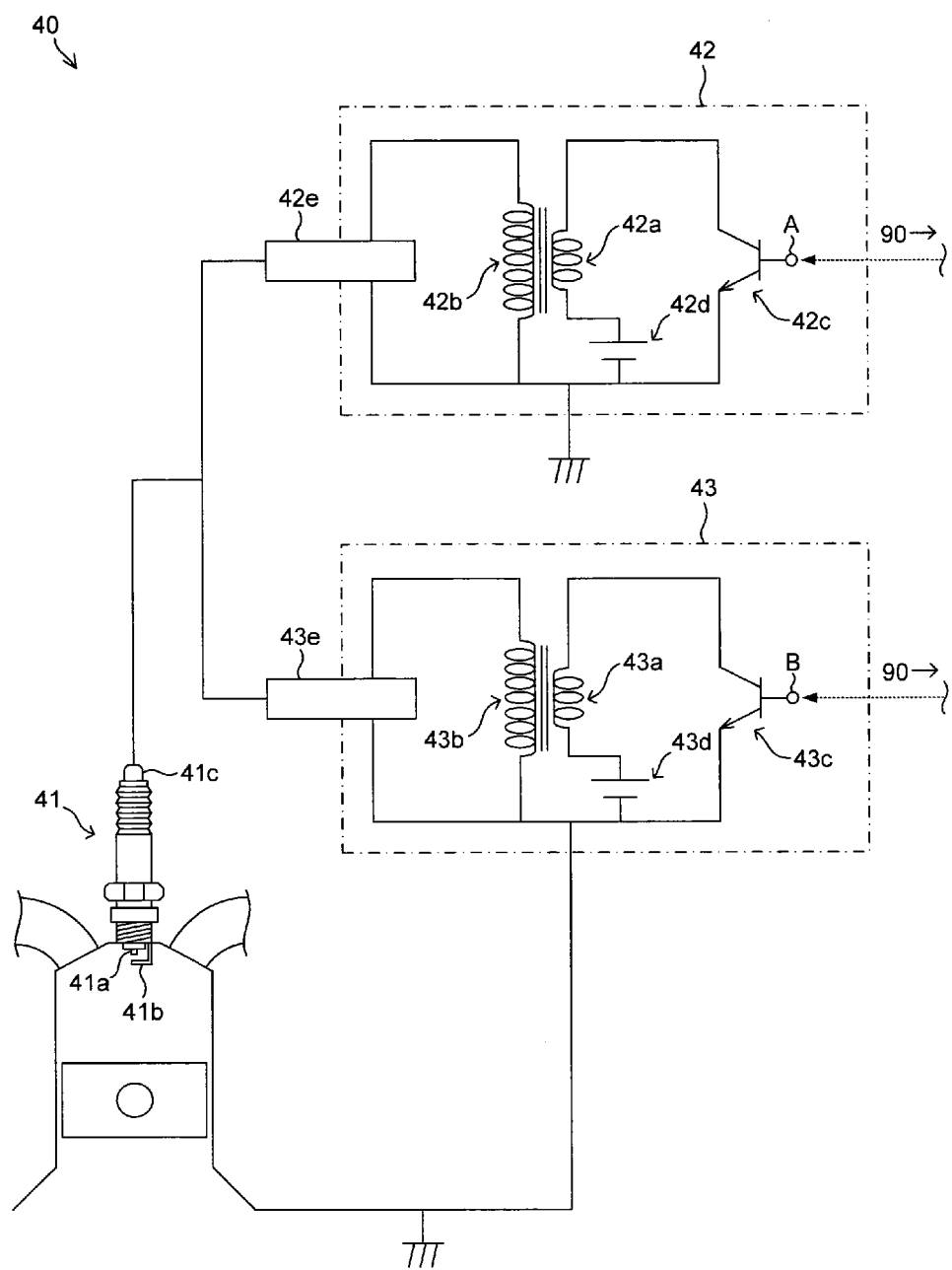
FIG. 20 is a conceptual diagram illustrating a configuration of an igniter that is connected to a spark plug.

In particular, FIG. 20 illustrates a schematic configuration of the ignition control system 40 in which the twelfth device is applied to an internal combustion engine (hereinafter referred to as "engine 10"). As illustrated in FIG. 20, the ignition control system 40 includes first igniter 42 and second igniter 43 connected to a spark plug 41. The first igniter 42 and the second igniter 43 are connected to the spark plug 41. The engine to which the twelfth device is employed has the same configurations as the engine to which the second device is employed other than the ignition control system 40.

The igniter 42 includes, on a conceptual basis, a primary coil 42a, a secondary coil 42b, a transistor 42c, a power source 42d, and an output part 42e, as same as in the engine to which the second device is applied. The igniter 42 transforms the voltage input to the side of the primary coil 42a (the voltage of the power source 42d) depending on the turn ratio of the primary coil 42a and the secondary coil 42b, and outputs the transformed voltage from the side of the secondary coil 42b via the output part 42e.

In particular, when the base electrode A receives an instruction signal from the electronic control device 90 to allow to flow the current from the emitter to the collector, the charging of the energy for discharging is started at the side of the primary coil 42a. After that, when the base electrode A receives an instruction signal from the electronic control device 90 to stop the current, the energy for discharging is supplied to the spark plug 41.

The igniter 43 includes, on a conceptual basis, a primary coil 43a, a secondary coil 43b, a transistor 43c, a power source 43d, and an output part 43e, as same as in the igniter 42. The igniter 43 transforms the voltage input to the side of the primary coil 43a (the voltage of the power source 43d) depending on the turn ratio of the primary coil 43a and the secondary coil 43b, and outputs the transformed voltage from the side of the secondary coil 43b via the output part 43e.

Regarding the igniter 43, as same as the above, the energy for discharging is charged and the energy is supplied to the spark plug 41 depending on the instruction signals from the electronic control device 90 to the base electrode B to switch the current from the emitter to the collector on and off.

Furthermore, the igniter 43 is configured so that the turn ratio of the igniter 43 is larger than that of the igniter 42. Hence, the voltage output from the igniter 42 is larger than that output from the igniter 43. In other words, the igniter 43 is configured so that the amount of energy supplied to the spark plug 41 from the igniter 42 is larger than that from the igniter 43.

In addition, the power source 42d of the igniter 42 and the power source 43d of the igniter 43 are illustrated as the separate members in FIG. 20. However, the power source 42d and the power source 43d are not necessarily separate members, but single power source may be shared by the igniter 42 and the igniter 43.

<Method for Determination on Re-Discharge>

The method for determination on re-discharge regarding the twelfth device is the same as in the second device. Detailed description for the method for determination on re-discharge regarding the twelfth device is hence omitted.

<Actual Operation>

An actual operation of the twelfth device will be described below.

Figure 21:
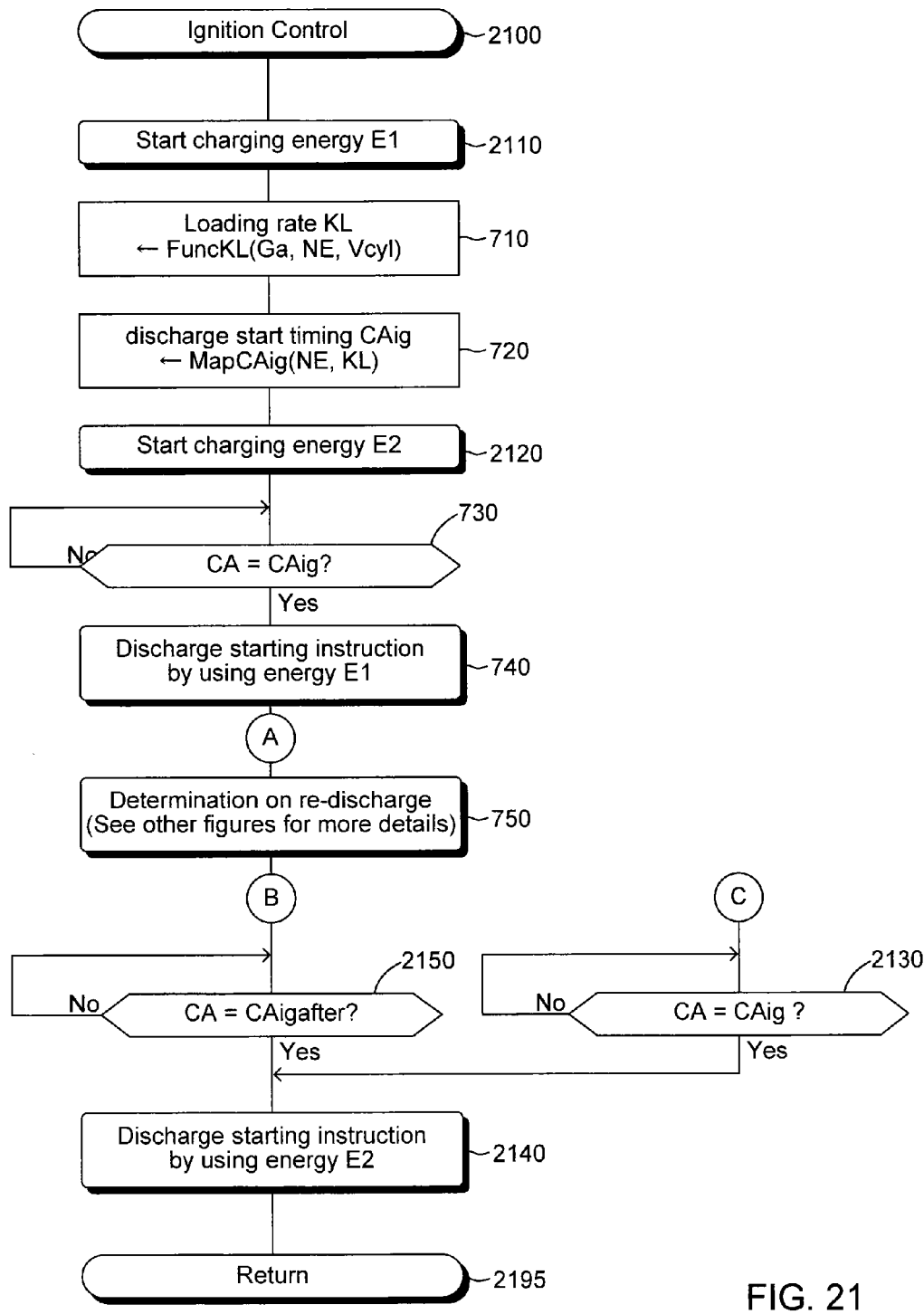
FIG. 21 is a flowchart illustrating a routine executed by a CPU of an ignition control device according to the twelfth embodiment of the invention.

In the twelfth device, the CPU 91 executes the respective routines in FIG. 6 for fuel injection control, FIG. 21 for ignition control, and FIG. 8 for determination on re-discharge at every predetermined time.

The twelfth device is different from the second device only in that the CPU 91 executes the flowchart in "FIG. 21" in place of that in FIG. 8. The following descriptions will be mainly concerned this difference.

The CPU 91 repeatedly executes the routine in FIG. 6 every predetermined time to determine the target value Qtgt of the fuel injection amount, and to inject fuel into the cylinder in the amount of the target value Qtgt, as same as the second device.

Furthermore, the CPU 91 repeatedly executes the "fuel injection control routine", which is indicated by the flowchart in FIG. 21, every time the crank angle of arbitrary cylinder becomes equal to a predetermined crank angle θg before the intake stroke (for example, the crank angle of 45 degrees before the exhaust top dead center). By this routine, the CPU 91 sends instructions to charge the energy for discharging into each of the igniter 42 and the igniter 43, and to supply the energy toward the spark plug 41 from those igniters at predetermined timings.

The routine in FIG. 21 is different from that in FIG. 7 only in that step 2110 to step 2150 are added. The other steps in FIG. 21 for executing the same processing as those steps in FIG. 8 are attached with the same step-numbers as those steps in FIG. 21. Detailed description is omitted regarding these steps.

In particular, the CPU 91 starts a process at step 2100 in FIG. 21 and then proceeds to step 2110 at a predetermined time. At step 2110, the CPU 91 sends an instruction signal to the base electrode A of the igniter 42 so that the energy E1 for discharging is started to be charged to the igniter 42. The energy E1 is thereby started to be charged into the igniter 42.

Next, the CPU 91 executes the processes in step 710 and step 720 to determine the discharge start timing CAig, in the same manner as the second device.

Next, the CPU 91 proceeds to step 2120. At step 2120, the CPU 91 sends an instruction signal to the base electrode B of the igniter 43 so that the energy E2 for discharging is started to be charged into the igniter 43. The energy E2 is thereby started to be charged into the igniter 43. As described below, the process (step 740) to start the first discharge by using the energy E1 is executed before executing step 2120. In other words, the energy E2 for re-discharging is started to be charged before starting the first discharge.

After that, when the crank angle CA reaches to the discharge start timing CAig, the CPU 91 determines as "Yes" at step 730, and proceed to step 740 to send an instruction to the base electrode A so that the energy E1 is supplied to the spark plug 41 from the igniter 42. The spark plug 41 thereby starts generating a discharge (the first discharge) by using the energy E1.

Next, the CPU 91 proceeds to step 750 through the connection mark A. The CPU 91 executes "the routine in FIG. 8" at step 750 to determine whether or not the re-discharge is needed. After that, in the case that it is determined that the re-discharge is needed, the CPU 91 returns to the routine in FIG. 21 through the connection mark C in FIG. 8.

When returning to the routine in FIG. 21, the CPU 91 proceeds to step 2130. The CPU 91 determines at step 2130 whether or not the crank angle CA at this moment matches to the discharge start timing CAig (actually, the re-discharge start timing CAigre). When the crank angle CA matches to the discharge start timing CAig, the CPU 91 determines as "Yes" at step 2130 to proceeds to step 2140.

At step 2140, the CPU 91 sends an instruction to the base electrode B so that the energy E2 is supplied to the spark plug 41 from the igniter 43. The spark plug 41 thereby starts generating a discharge (the re-discharge) by using the energy E2.

On the other hand, in the case that it is determined that the re-discharge is not needed with the routine in FIG. 8, the CPU 91 returns to the routine in FIG. 21 through the connection mark C in FIG. 8 to proceeds to step 2150. The CPU 91 determines at step 2130 whether or not the crank angle CA at this moment matches to the predetermined post-ignition discharge start timing CAigafter. For example, the post-ignition discharge start timing CAigafter is set as the crank angle of 60 degrees after the compression top dead center.

When the crank angle CA matches to the post-ignition discharge start timing CAigafter, the CPU 91 determines as "Yes" at step 2150 to proceeds to step 2140. When the CPU 91 executes the process in step 2140, the spark plug 41 thereby starts generating a discharge by using the energy E2 at a time after the fuel has been ignited. After that, the CPU 91 proceeds to step 2195 to end this routine once.

As described above, in the twelfth device, the energy for the another discharge (the re-discharge) is began to be charged into the ignition coil before the start of the discharge (the first discharge). The another discharge is started after the fuel has been ignited in the case that the another discharge is not needed.

In addition, in the twelfth device, the amount of energy supplied to the spark plug 41 from the igniter 42 is larger than that from the igniter 43. However, the twelfth device may be configured so that the amounts of these energies are equal.

The above is the descriptions regarding the twelfth device.

<General Overview of Embodiments>

As described referring to FIG. 1 to FIG. 21, the ignition control device according to the embodiments of the present invention (the first device to the twelfth device) are applied to an internal combustion engine 10 that comprises at least one ignition means (spark plug) 41 for igniting gas (air-fuel mixture) in a combustion chamber 25 of the engine 10 by generating discharge in the gas and is configured to generate one or more discharges within an ignition period for igniting the gas (the period including the discharge start timing CAig and re-discharge start timing CAigre).

A discharge generated with the at least one ignition means 41 continues for a period from a discharge start timing (for example, the time t1 in FIG. 4) to a discharge end timing (for example, the time t2 in FIG. 4). The discharge start timing is a timing to start the discharge, and the discharge end timing is a timing to end the discharge for the first time after the discharge start timing.

When referring to the first parameter relevant to discharge voltage and the second parameter relevant to discharge voltage, in which reference the first parameter is a discharge voltage Vig within first period or an amount of fuel Cg included in the gas, the second parameter is a discharge voltage Vig within second period or a flow rate FRg of the gas near the discharge, the discharge voltage Vig is an difference in electric potential between both ends of the discharge, the first period is from the discharge start timing t1 to an intermediate timing (for example, the time ta in FIG. 4) after and near the discharge start timing t1, the second period is from the intermediate timing ta to the discharge end timing t2, it is determined whether to start another discharge (re-discharge) following the discharge within the ignition period based on at least the second parameter among the first parameter and the second parameter (see the routine in FIG. 5).

After that, the another discharge is started with the at least one ignition means 41 (for example, step 730 executed after the connection mark A in FIG. 7) in the case of determining to start the another discharge within the ignition period (for example, when determining as "Yes" at step 820 in FIG. 8).

The amount of fuel Cg included in the gas may be a value obtained based on the discharge voltage Vig within the first period (see step 1010 in FIG. 10), or a value independently obtained from the discharge voltage Vig within the first period (see step 1110 in FIG. 11).

The flow rate FRg of the gas near the discharge may be a value obtained based on the discharge voltage Vig within the second period (see step 1020 in FIG. 10), or a value independently obtained from the discharge voltage Vig within the second period (see step 1120 in FIG. 11).

The first parameter may be the discharge voltage Vig at a time before an absolute value of the discharge voltage Vig is the maximum value Vigmax1 within the first period (see step 1230 in FIG. 12). Furthermore, the second parameter may be the discharge voltage Vig at a time before an absolute value of the discharge voltage Vig is the maximum value Vigmax2 within the second period (see step 1260 in FIG. 12).

Furthermore, the first parameter may be the discharge voltage Vig at a time when an absolute value of the discharge voltage Vig is the maximum value Vigmax1 within the first period (see step 1310 in FIG. 13).

Furthermore, the second parameter may be the discharge voltage Vig at a time when an absolute value of the discharge voltage Vig is the maximum value Vigmax2 within the second period (see step 1320 in FIG. 13).

A time to start the another discharge may be set to be an earlier time with increasing degree of rise of a change rate of the discharge voltage Vig (the flow rate FRg of the gas) within the second period, when the change rate increases within the second period (see step 1420 in FIG. 14). Furthermore, a time to start the another discharge may be set to be a later time with decreasing degree of drop of a change rate of the discharge voltage Vig within the second period, when the change rate decreases within the second period (see step 1420 in FIG. 14).

The second parameter may be the discharge voltage Vig at a time set to be an earlier time with increasing amount of engine rotation speed NE the is a number of the cycles executed per unit time (see step 1510 in FIG. 15).

The second parameter may be the discharge voltage Vig at a time before the discharge end timing (see step 1740 in FIG. 17), when the discharge is started at the discharge start timing by starting a supply of a predetermined amount of energy to the at least one ignition means 41, and the discharge is ended at the discharge end timing for the first time before all of the energy is used for the discharge (that is, in the case that the discharge is blown out).

The second parameter may be the discharge voltage Vig at a time determined based on an average value Vigave of the discharge voltages within the second period in a plurality of the cycles (see step 1840 to step 1860 in FIG. 18).

The first period may be a period in which the discharge voltage Vig changes at least due to the amount of fuel Cg included in the gas, and the second period may be a period in which the discharge voltage Vig changes at least due to the amount of fuel Cg included in the gas and the flow rate FRg of the gas near the discharge (see FIG. 4).

In the case that the ignition means 41 is an ignition means 41 enable to generate the capacitive discharge and the inductive discharge (the capacitive discharge is a discharge due to electrostatic energy with the ignition coil, the inductive discharge is a discharge due to electromagnetic energy with the ignition coil), the first period may be a period to generate the capacitive discharge with the ignition means 41, and the second period may be a period to generate the inductive discharge with the ignition means 41 (see FIG. 4).

In the case that the another discharge should be started within the ignition period, the another discharge may be generated with the ignition means 41 at which the discharge is started among the at least one ignition means (see step FIG. 1, FIG. 2 and FIG. 20)

When the engine 10 comprises a plurality of ignition coils, a charge of energy for the another discharge may be began, before starting the discharge generated by a supply of energy charged in one ignition coil (the igniter 42) among the plurality of ignition coils to at least one ignition means 41, so as to charge the energy to other ignition coil (the igniter 43) different from the one ignition coil (see step 2120 in FIG. 21), the energy charged in the other ignition coil 43 may be supplied to the at least one ignition means 41 within the ignition period when being determined to start the another discharge within the ignition period (see step 2140 executed via the connection mark C in FIG. 21), and the energy charged in the other ignition coil 43 may be supplied to the at least one ignition means 41 after the ignition period when not being determined to start the another discharge within the ignition period (see step 2140 executed via the connection mark B in FIG. 21).

In the above case, an amount of energy supplied to the at least one ignition means 41 from the other ignition coil 43 may be larger than an amount of energy supplied to the at least one ignition means 41 from the one ignition coil 42.

<Other Embodiments>

The present invention is not limited within the above specific embodiments, various modifications corrections may be made without departing from the scope of the invention.

For example, the method for determination on re-discharges employed in "one embodiment" among the above multiple embodiments (the first embodiment to the twelfth embodiment) may be applied in "one or more of the other multiple embodiments." In other words, one embodiment among the above multiple embodiments may be combined with one or more of the other multiple embodiments.

In particular, for example, the fourth device to the twelfth device are configured to determine the ignitability of air-fuel mixture based on the both of the first parameter relevant to discharge voltage and the second parameter relevant to voltage for discharging. However, the fourth device to the twelfth device may be configured to determine the ignitability of air-fuel mixture based on only the second parameter, as the third device. That is, the method for determination on re-discharge applied in one of the fourth device to the twelfth device may be combined with the third device.

Furthermore, a "part(s)" of the method for determination on re-discharge applied in one embodiment among the above multiple embodiments may be applied in a "part(s)" of one or more of the other multiple embodiments." In other words, a part(s) of one embodiment among the above multiple embodiments may be combined with a part(s) of one or more of the other multiple embodiments.

In particular, for example, the fourth device and the fifth device apply "the concentration Cg of the air-fuel mixture" as the first parameter and "the flow rate FRg of the air-fuel mixture" as the second parameter. However, the fourth device and the fifth device may be configured to apply "the concentration Cg of the air-fuel mixture" as the first parameter and "the discharge voltage Vig within the second period" as the second parameter. Furthermore, the fourth device and the fifth device may be configured to apply "the discharge voltage within the first period" as the first parameter and "the flow rate FRg of the air-fuel mixture" as the second parameter. That is, a part of the method for determination on re-discharge applied in the fourth device and the fifth device may be combined with a part of the method for determination on re-discharge applied in the second device.

Furthermore, the first device to the twelfth device are applied to the engine 10 having one spark plug 41 in every combustion chambers 25. However, the ignition control device of the present invention may be applied to an engine having multiple spark plugs 41 in every combustion chambers 25. Furthermore, the first device to the twelfth device may be applied to an engine having a spark plug (so-called ring-shaped electrode spark plug) that has a part(s) to generate multiple discharges arranged in a circular pattern.

Furthermore, in the case of an engine having multiple spark plugs in every combustion chamber, the re-discharge (other discharge) may be generated at a spark plug with which a discharge (the discharge for determining the ignitability of gas) was generated or at other spark plug.

Furthermore, the first device to the twelfth device are configured to start the other discharge after the discharge (the discharge for determining the ignitability of gas) ended. However, when it is predicted (estimated) that the ignitability of a discharge is not sufficient, before the end of the discharge, the ignition control device of the present invention may start the other discharge before the discharge ends, in the case that the device is applied to an engine having multiple ignition means.

Furthermore, the first device to the twelfth device are applied to the engine 10 designed so that the electric potential of the center electrode 41*a* is "positive" in reference to the electric potential of the earth electrode 41*b* (zero). However, the ignition control device of the present invention may be employed to an engine designed so that the electric potential of the center electrode is "negative."

Additionally, in the first device to the twelfth device, so-called coil ignition system is employed as a system to supply energy for discharging (see FIG. 2). However, in the ignition control device of the present invention, the system to supply energy for discharging to the ignition means is not limited to the coil ignition system. For example, as the system to supply the energy, a known system such as the CDI (Capacitor Discharge Ignition) system and the magneto system may be employed. In addition, an ignition coil(s) is used to generate energy for discharging in each of the CDI system and the magneto system.

The invention claimed is:

1. An ignition control device applied to an internal combustion engine,
the internal combustion engine comprising at least one spark plug for igniting gas in a combustion chamber of the internal combustion engine by generating discharge in the gas and being configured to generate one or more discharges within an ignition period for igniting the gas, the ignition control device comprising a configuration:
to refer first parameter relevant to discharge voltage and second parameter relevant to discharge voltage, upon a discharge generated with the at least one spark plug continuing for a period from a discharge start timing to a discharge end timing, the discharge start timing being a timing to start the discharge, the discharge end timing being a timing to end the discharge for the first time after the discharge start timing, the first parameter being a discharge voltage within first period or an amount of fuel included in the gas, the second parameter being a discharge voltage within second period or a flow rate of the gas near the discharge, the discharge voltage being an difference in electric potential between both ends of the discharge, the first period being from the discharge start timing to an intermediate timing after and near the discharge start timing, the second period being from the intermediate timing to the discharge end timing;
to determine whether to start another discharge following the discharge within the ignition period based on both of the first parameter and the second parameter; and
to start the another discharge with the at least one spark plug in the case of determining to start the another discharge within the ignition period.

2. The ignition control device according to claim 1,
the amount of fuel included in the gas being a value obtained based on the discharge voltage within the first period, or a value independently obtained from the discharge voltage within the first period.

3. The ignition control device according to claim 1,
the flow rate of the gas near the discharge being a value obtained based on the discharge voltage within the second period, or a value independently obtained from the discharge voltage within the second period.

4. The ignition control device according to claim 1,
the first parameter being the discharge voltage at a time before an absolute value of the discharge voltage being the maximum value within the first period, and
the second parameter being the discharge voltage at a time before an absolute value of the discharge voltage being the maximum value within the second period.

5. The ignition control device according to claim 1,
the first parameter being the discharge voltage at a time upon an absolute value of the discharge voltage being the maximum value within the first period.

6. The ignition control device according to claim 1,
the second parameter being the discharge voltage at a time upon an absolute value of the discharge voltage being the maximum value within the second period.

7. The ignition control device according to claim 1,
a time to start the another discharge being set to be an earlier time with increasing degree of rise of a change rate of the discharge voltage within the second period, upon the change rate increasing within the second period, and
a time to start the another discharge being set to be a later time with decreasing degree of drop of a change rate of the discharge voltage within the second period, upon the change rate decreasing within the second period.

8. The ignition control device according to claim 1,
the engine repeatedly executing cycle including the ignition period, and
the second parameter being the discharge voltage at a time set to be an earlier time with increasing amount of engine rotation speed, the engine rotation speed being a number of the cycles executed per unit time.

9. The ignition control device according to claim 1,
the second parameter being the discharge voltage at a time before the discharge end timing, upon the discharge being started at the discharge start timing by starting a supply of a predetermined amount of energy to the at least one spark plug, and the discharge being ended at the discharge end timing for the first time before all of the energy being used for the discharge.

10. The ignition control device according to claim 1,
the engine repeatedly executing cycle including the ignition period, and
the second parameter being the discharge voltage at a time determined based on an average value of the discharge voltages within the second period in a plurality of the cycles.

11. The ignition control device according to claim 1,
the first period being a period upon the discharge voltage changing at least due to the amount of fuel included in the gas, and
the second period being a period upon the discharge voltage changing at least due to the amount of fuel included in the gas and the flow rate of the gas near the discharge.

12. The ignition control device according to claim 1,
the engine further comprising an ignition coil,
the spark plug being an spark plug enable to generate capacitive discharge and inductive discharge, the capacitive discharge being a discharge due to electrostatic energy with the ignition coil, the inductive discharge being a discharge due to electromagnetic energy with the ignition coil,
the first period being a period to generate the capacitive discharge with the spark plug, and
the second period being a period to generate the inductive discharge with the spark plug.

13. The ignition control device according to claim 1,
the engine comprising a plurality of ignition coils,
a charge of energy for the another discharge being began,
before starting the discharge generated by a supply of energy charged in one ignition coil among the plurality of ignition coils to at least one spark plug, so as to charge the energy to other ignition coil different from the one ignition coil,
the energy charged in the other ignition coil being supplied to the at least one spark plug within the ignition period upon being determined to start the another discharge within the ignition period,
the energy charged in the other ignition coil being supplied to the at least one spark plug after the ignition period upon not being determined to start the another discharge within the ignition period.

14. The ignition control device according to claim 1,
the engine comprising a plurality of ignition coils,
upon the discharge being started by a supply of energy from one ignition coil among the plurality of ignition coils to at least one spark plug and the another discharge being started by a supply of energy from other ignition coil different from the one ignition coil to at least one spark plug, an amount of energy supplied to the at least one spark plug from the other ignition coil being larger than an amount of energy supplied to the at least one spark plug from the one ignition coil.

* * * * *